(12) United States Patent
Kumar

(10) Patent No.: US 9,094,253 B2
(45) Date of Patent: *Jul. 28, 2015

(54) SYSTEMS AND METHODS FOR ADAPTIVE BLIND MODE EQUALIZATION

(71) Applicant: Rajendra Kumar, Cerritos, CA (US)

(72) Inventor: Rajendra Kumar, Cerritos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/084,503

(22) Filed: Nov. 19, 2013

(65) Prior Publication Data

US 2014/0140387 A1 May 22, 2014

Related U.S. Application Data

(62) Division of application No. 13/434,498, filed on Mar. 29, 2012, now Pat. No. 8,711,919.

(51) Int. Cl.
H04B 1/10 (2006.01)
H04L 25/03 (2006.01)
H04L 27/34 (2006.01)
H04L 27/38 (2006.01)
H04L 25/02 (2006.01)

(52) U.S. Cl.
CPC ........ *H04L 25/03885* (2013.01); *H04B 1/1081* (2013.01); *H04L 25/0307* (2013.01); *H04L 25/03292* (2013.01); *H04L 27/3416* (2013.01); *H04L 27/3845* (2013.01); *H04L 25/0204* (2013.01)

(58) Field of Classification Search
None
See application file for complete search history.

(56) References Cited

U.S. PATENT DOCUMENTS

| 5,918,161 | A | 6/1999 | Kumar et al. | |
|---|---|---|---|---|
| 6,690,747 | B2* | 2/2004 | Petrus et al. | 375/324 |
| 7,050,419 | B2* | 5/2006 | Azenkot et al. | 370/347 |
| 7,421,019 | B2* | 9/2008 | Liao et al. | 375/232 |
| 2002/0024995 | A1* | 2/2002 | Kim | 375/231 |
| 2008/0260017 | A1 | 10/2008 | Tsuie et al. | |

OTHER PUBLICATIONS

R. Kumar and S. Jalali, "Super Fast and Efficient Channel Equalizer Architecture Based on Neural Network," IEEE International Conference on Aerospace Engineering, Big Sky, Montana, Mar. 2012, pp. 1-11.

S. Abrar, A. Zerguine and M. Deriche "Self-Orthogonalizing Soft Constraint Satisfaction Multi Modulus Blind Equalization Algorithms," Proc. IEEE International Conference on Acoustics Speech and Signal Processing, 2004, pp. II-853-II-856.

R. R. Lopes and J.R. Barry, "Blind Iterative Channel Identification and Equalization," International Conference on Communication, Helsinki, Jun. 2001, pp. 2256-2260.

(Continued)

Primary Examiner — Adolf Dsouza
(74) Attorney, Agent, or Firm — Fulwider Patton LLP

(57) ABSTRACT

A blind mode adaptive equalizer system to recover the in general complex valued data symbols from the signal transmitted over time-varying dispersive wireless channels is disclosed comprising an adaptive communication receiver for the demodulation and detection of digitally modulated signals received over wireless communication channels exhibiting multipath and fading, the receiver comprising an RF front end, an RF to complex baseband converter, a band limiting matched filter, a channel gain normalizer, a blind mode adaptive equalizer with hierarchical structure, an initial data segment recovery circuit, a differential decoder, a complex baseband to data bit mapper, and an error correction code decoder and de-interleaver.

4 Claims, 17 Drawing Sheets

(56) References Cited

OTHER PUBLICATIONS

W. Chung and J.P. LeBlanc, "The Local Minima of Fractionally Spaced CMA Blind Equalizer Cost Function in the Presence of Channel Noise," Proc. IEEE International Conference on Acoustics Speech and Signal Processing, May 1998, pp. 3345-3348.

H.H. Zeng and L. Tong, "Blind Equalization Using the Constant Modulus Algorithm," Proceedings of ICSP, 96, pp. 400-403.

R. Kumar, "Adaptive Algorithms for Antenna Array Signal Processing," Proceedings of the 31st Annual Conference on Information Sciences and Systems, John Hopkins University Baltimore, MD, Mar. 19-21, 1995, pp. 379-386.

R. Kumar, "Adaptive Algorithms for Antenna Array Signal Processing," U.S. Air Force Summer Research Program, 1993, Final Reports, pp. 5.1-5.31, Also on the website: http://www.dtic.mil/dtic/tr/fulltext/u2/a278695.pdf.

R.H. Lambert and C.L. Nikias, "Forward/Inverse Blind Equalization," 1994 Conference Record of the 28th Asilomar Conference on Signals, Systems and Computers, vol. 2, 1995.

R. Kumar, "Multi Element Array Signal Reconstruction with Adaptive Least-Squares Algorithm," International Journal of Adaptive Control and Signal Processing, vol. 6, Dec. 1992, pp. 561-588.

R. Kumar, "Convergence of Decision Directed Adaptive Equalizer," Proceedings of 22nd IEEE Conference on Decision and Control, San Antonio, Texas, Dec. 1983, pp. 1319 1324.

R. Kumar and J. B. Moore, "Adaptive Equalization via Fast Quantized State Methods," IEEE Transactions on Communications, vol. 29, Oct. 1981, pp. 1492 1501.

R. Kumar and J. B. Moore, "Detection Techniques in Least Squares Identification," Automatica, vol. 17, Nov. 1981, pp. 805 819.

R. Kumar and J. B. Moore, "State Inverse and Decorrelated State Stochastic Approximation, "Automatica, vol. 16, May 1980, pp. 259 311.

D. N. Godard, "Self Recovering Equalization and carrier Tracking in Two-Dimensional Data Communication Systems," IEEE Trans. on Communications, vol. com-28, Nov. 1980, pp. 1867-1875.

W. J. Weber, "Differential Encoding for Multiple Amplitude and Phase Shift Keying," IEEE Trans. on Communications, vol. com-26, Mar. 1978, pp. 385-391.

Y. Sato, "A Method for Self-Recovering Equalization for Multilevel Amplitude Modulation Systems," IEEE Trans. on Communications, vol. com-23, Jun. 1975, pp. 679-682.

http://ens.ewi.tudelft.nl/Education/courses/et4147/sheets/cma_leus.pdf Constant Modulus Algorithm, T U Delft University, pp. 1-12.

\* cited by examiner

Signal constellation diagram of 16 QAM signal

Correction signal generator for decision feedback equalizer

BMAEHS with orthogonalizer

SYSTEMS AND METHODS FOR ADAPTIVE BLIND MODE EQUALIZATION

CROSS-REFERENCES TO RELATED APPLICATIONS

This divisional application claims priority from U.S. application Ser. No. 13/434,498, filed Mar. 29, 2012 incorporated by reference in its entirety.

BACKGROUND

Broadband wireless systems are currently in a rapid evolutionary phase in terms of development of various technologies, development of various applications, deployment of various services and generation of many important standards in the field. The increasing demand on various services justifies the need for the transmission of data on various communication channels at the highest possible data rates. The multipath and fading characteristics of the wireless channels result in various distortions, the most important of those being the inter-symbol interference (ISI) especially at relatively high data rates. Adaptive equalizers are employed to mitigate the ISI introduced by the time varying dispersive channels and possibly arising from other sources. In one class of adaptive equalizers, a training sequence known to the receiver is transmitted that is used by adaptive equalizer for adjusting the equalizer parameter vector to a value that results in a relatively small residual ISI. After the training sequence, the data is transmitted during which period the equalizer continues to adapt to slow channel variations using decision directed method.

Among the various algorithms to adapt the equalizer parameter vector are the recursive least squares (RLS) algorithm, weighted Kaman filter, LMS algorithm, and the quantized state (QS) algorithm, the last one taught by Kumar et. al. in "Adaptive Equalization Via Fast Quantized-State Methods," IEEE Transactions on Communications, Vol. COM-29, No. 10, October 1981. Kumar at. al. teach orthogonalization process to arrive at fast and computationally efficient identification algorithms in, "State Inverse and Decorrelated State Stochastic Approximation," Automatica, Vol. 16, May 1980. The training approach, however, is not desirable in many communication applications such as those involving video conference type of applications that will require a training sequence every time a different speaker talks. Moreover, the need for training sequence results in a significant reduction in capacity as for example, in GSM standard, a very significant part of each frame is used for the equalizer training sequence. Also, if during the decision-directed mode the equalizer deviates significantly due to burst of noise or interference, all the subsequent data will be erroneously received by the receiver until the loss of equalization is detected and the training sequence is retransmitted and so on.

There are many other applications where the equalizers are applied as in antenna beam forming, adaptive antenna focusing of the antenna, radio astronomy, navigation, etc. For example, Kumar et. al. teach in Method and Apparatus for Reducing Multipath Signal Error Using Deconvolution, U.S. Pat. No. 5,918,161, June 1999, an equalizer approach for a very different problem of precise elimination of the multipath error in the range measurement in GPS receiver. In all of the various applications of equalizers and due to various considerations such as the logistics and efficiency of systems, it has been of great interest to have the equalizer adapt without the need for a training sequence. Such equalizers are the termed the "blind mode" equalizers.

Among some of the approaches to blind mode equalization are the Sato's algorithm and Goddard's algorithm that are similar to the LMS and RLS algorithms, respectively, except that these may not have any training period. Kumar, in "Convergence of A Decision-Directed Adaptive Equalizer," Proceedings of the 22nd IEEE Conference on Decision and Control, 1983, Vol. 22, teaches a technique wherein an intentional noise with relatively high variance is injected into the decision-directed adaptive algorithm with the noise variance reduced as the convergence progressed and shows that the domain of convergence of the blind mode equalizer was considerably increased with the increase in the noise variance at the start of the algorithm. The technique taught by Kumar is analogous to the annealing in the steel process industry and in fact the term simulated annealing was coined after the introduction by Kumar. Lambert et. al., teach the estimation of the channel impulse response from the detected data in, "Forward/Inverse Blind Equalization," 1995 Conference Record of the 28th Asilomar Conference on Signals, Systems and Computers, Vol. 2, 1995. Another blind mode equalization method applicable to the case where the modulated data symbols have a constant envelope and known as constant modulus algorithm (CMA) taught by Goddard in "Self-recovering Equalization and Carrier Tracking in Two-Dimensional Data Communication System," IEEE Transactions on Communications, vol. 28, No. 11, pp. 1867-1875, November, 1980, is based on minimization of the difference between the magnitude square of the estimate of the estimate of the data symbol and a constant that may be selected to be 1.

The prior blind mode equalizers have a relatively long convergence period and are not universally applicable in terms of the channels to be equalized and in some cases methods such as the one based on polyspectra analysis are computationally very expensive. The CMA method is limited to only constant envelope modulation schemes such as M-phase shift keying (MPSK) and thus are not applicable to modulation schemes such as M-quadrature amplitude modulation (MQAM) and M-amplitude shift keying (MASK) modulation that are extensively used in wireless communication systems due to their desirable characteristics. Tsuie et. al. in, Selective Slicing Equalizer, Pub. No. US 2008/0260017 A1, Oct. 23, 2008, taught a selective slicing equalizer wherein in a decision feedback equalizer configuration, the input to the feedback path may be selected either from the combiner output or the output of the slicer depending upon the combiner output.

The prior blind mode equalization techniques may involve local minima to which the algorithm may converge resulting in high residual ISI. Thus it is desirable to have blind mode adaptive equalizers that are robust and not converging to any local minima, have wide applicability without, for example, restriction of constant modulus signals, are relatively fast in convergence, and are computationally efficient. The equalizers of this invention possess these and various other benefits.

Various embodiments described herein are directed to methods and systems for blind mode adaptive equalizer system to recover the in general complex valued data symbols from a signal transmitted over time-varying dispersive wireless channels. For example, various embodiments may utilize an architecture comprised of a channel gain normalizer comprised of a channel signal power estimator, a channel gain estimator and a parameter $\alpha$ estimator for providing nearly constant average power output and for adjusting the dominant tap of the normalized channel to close to 1, a blind mode equalizer with hierarchical structure (BMAEHS) comprised of a level 1 adaptive system and a level 2 adaptive system for the equalization of the normalized channel output, and an initial data recovery for recovery of the data symbols received during the initial convergence period of the BMAEHS and pre appending the recovered symbols to the output of the BMAEHS providing a continuous stream of all the equalized symbols.

The level 1 adaptive system of the BMAEHS is further comprised of an equalizer filter providing the linear estimate of the data symbol, the decision device providing the detected data symbol, an adaptation block generating the equalizer parameter vector on the basis of a first correction signal generated within the adaptation block and a second correction signal inputted from the level 2 adaptive system. The cascade of the equalizer filter and the decision device is referred to as the equalizer. The first correction vector is based on the error between the input and output of the decision device. However, in the blind mode of adaptation, the first error may converge to a relatively small value resulting in a false convergence or convergence to one of the local minima that are implicitly present due to the nature of the manner of generation of the first error. To eliminate this possibility, the level 2 adaptive system estimates a modeling error incurred by the equalizer. The modeling error is generated by first obtaining an independent estimate of the channel impulse response based on the output of the decision device and the channel output and determining the modeling error as the deviation of the impulse response of the composite system comprised of the equalizer filter and the estimate of the channel impulse response from the ideal impulse comprised of all but one of its elements equal to 0. In case the equalizer tends to converge to a false minimum, the magnitude of the modeling error gets large and the level 2 adaptive system generates the second correction signal to keep the modeling error small and thereby avoiding convergence to a false or local minimum.

In the invented architecture, the channel gain estimator is to normalize the output of the channel so as to match the level of the normalized signal with the levels of the slicers present in the decision device, thereby resulting in increased convergence rate during the initial convergence phase of the algorithm. This is particularly important when the modulated signal contains at least part of the information encoded in the amplitude of the signal as, for example, is the case with the MQAM and MASK modulation schemes.

In another one of the various architectures of the invention for blind mode adaptive equalizer system, the BMAEHS is additionally comprised of an orthogonalizer, wherein the two correction signals generated in level 1 and level 2 adaptive systems are first normalized to have an equal mean squared norms and wherein the orthogonalizer provides a composite orthogonalized correction signal vector to the equalizer. The process of orthogonalization results in introducing certain independence among the sequence of correction signal vectors. The orthogonalization may result in fast convergence speeds in blind mode similar to those in the equalizers with training sequence.

In another one of the various architectures of the invention for blind mode adaptive equalizer system, the BMAEHS is replaced by a cascade of multiple equalizer stages with multiplicity m greater than 1 and with each equalizer stage selected to be one of the BMAEHS or the simpler blind mode adaptive equalizer (BMAE). In the architecture, the input to the ith equalizer stage is the linear estimate of data symbol generated by the (i−1)th equalizer stage, and the detected data symbol from the (i−1)th equalizer stage provides the training sequence to the ith equalizer stage during the initial convergence period of the ith equalizer stage for i=2, . . . , m. In one of the embodiments of the architecture, m=2, with the first equalizer stage selected to be a BMAEHS and the second equalizer stage selected to be a BMAE. In the cascaded architecture, the BMAEHS ensures convergence bringing the residual ISI to a relatively small error such that the next equalizer stage may employ a relatively simple LMS algorithm, for example. The equivalent length of the cascade equalizer is the sum of the lengths of the m stages, and the mean squared error in the estimation of the data symbol depends upon the total length of the equalizer, the cascaded architecture has the advantage or reduced computational requirements without a significant loss in convergence speed, as the computational requirement may vary more than linearly with the length of the equalizer, Various architectures of the invention use a linear equalizer or a decision feedback equalizer in the level 1 adaptive system. In one of the various architectures of the invention, FFT implementation is used for the generation of the second correction signal resulting in a further significant reduction in the computational requirements.

In various embodiments of the invention, an adaptive communication receiver for the demodulation and detection of digitally modulated signals received over wireless communication channels exhibiting multipath and fading is described with the receiver comprised of an RF front end, an RF to complex baseband converter, a band limiting matched filter, a channel gain normalizer, a blind mode adaptive equalizer with hierarchical structure, an initial data segment recovery circuit, a differential decoder, a complex baseband to data bit mapper, and an error correction code decoder and de-interleaver providing the information data at the output of the receiver without the requirements of any training sequence.

The differential decoder in the adaptive receiver performs the function that is inverse to that of the encoder in the transmitter. The differential encoder is for providing protection against phase ambiguity with the number of phase ambiguities equal to the order of rotational symmetry of the signal constellation of the baseband symbols. The phase ambiguities may be introduced due to the blind mode of the equalization. The number of phase ambiguities for the MQAM signal is 4 for any M equal to N2 with N equal to any integer power of 2, for example M=16 or 64. The architecture for the differential encoder is comprised of a phase threshold device for providing the reference phase for the sector to which the baseband symbol belongs, a differential phase encoder, an adder to modify the output of the differential phase encoder by a difference phase, a complex exponential function block, and a multiplier to modulate the amplitude of the baseband symbol onto the output of the complex exponential function block, and applies to various modulation schemes. The architecture presented for the decoder is similar to that of the differential encoder and is for performing the function that is inverse to that of the encoder.

In various embodiments of the invention, an adaptive beam former system is described with the system comprised of an antenna array, a bank of RF front ends receiving signals from the antenna array elements and a bank of RF to baseband converters with their outputs inputted to the adaptive digital beam former that is further comprised of an adaptive combiner, a combiner gain normalizer, a decision device, and a multilevel adaptation block for receiving data symbols transmitted form a source in a blind mode without the need for any training sequence and without the restriction of a constant modulus on the transmitted data.

BRIEF DESCRIPTION OF THE DRAWINGS

Various embodiments of the present invention are described here by way of example in conjunction with the following figures, wherein.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide systems and methods for blind mode equalization of signals received over time varying dispersive channels, and for recovering the data symbols transmitted from a source in blind mode with adaptive beamformers.

Figure 1:
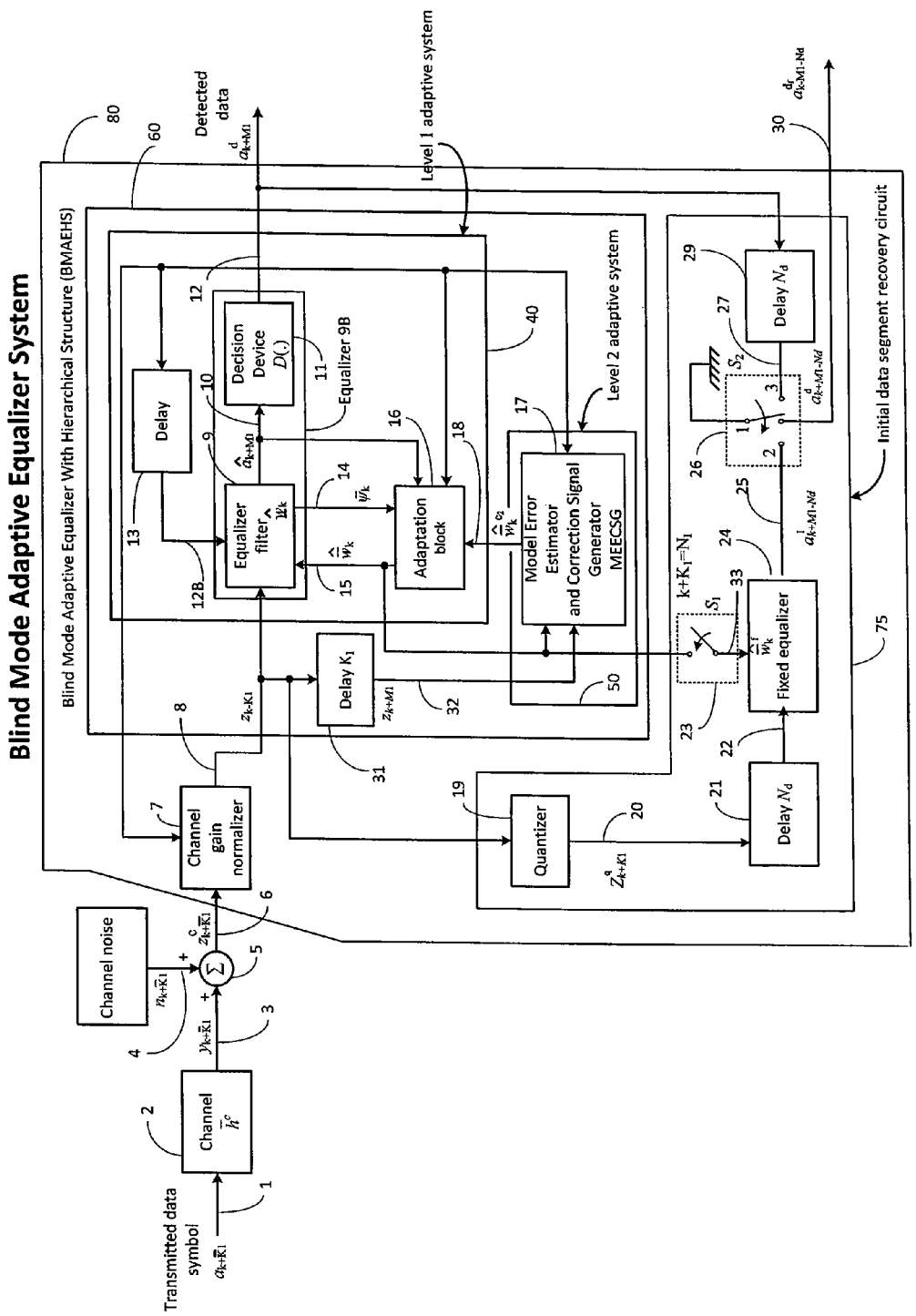
FIG. 1 shows a block diagram of one embodiments of blind mode adaptive equalizer system.

FIG. 1 shows a block diagram for one of the various embodiments of the invention. Referring to FIG. 1, the transmitted data symbol $a_{k+\bar{K}_1}$, $k+\bar{K}_1=0, 1, \ldots$ is in general a complex valued sequence of data symbols taking values from a set of M possible values with $\bar{K}_1$ denoting some reference positive integer. For example, for the case of the QPSK modulation in digital communication systems, $a_k = a_{I,k} + j\, a_{Q,k}$, with $j=\sqrt{-1}$, and with $a_{I,k}$ and $a_{Q,k}$ denoting the real and imaginary components of $a_k$ taking possible values $+A_0$ and $-A_0$ for some constant $A_0 > 0$. For the case of MQAM modulation with the number of points M in the signal constellation equal to $N^2$ for some positive integer N that is normally selected to be an integer power of 2, each of $a_{I,k}$ and $a_{Q,k}$ may take possible values from the set of N values given by $\{\pm 1, \pm 3, \ldots, \pm(N-1)\}A_0$. Similarly for the MPSK modulation, $a_k$ takes possible values from the set of M values given by $\{A_0 \exp(j$ $((2m-1)\pi/M)$; $m=1, 2, \ldots, M\}$. Referring to FIG. 1, the sequence of data symbols 1 $a_{k+\bar{K}_1}$ is input to the discrete-time channel where the impulse response $\bar{h}^{cT}$ of the discrete-time channel 2 is represented by a vector of length $M=2M_1+1$ given by $$\bar{h}^{cT} = [h_{-M_1}^c \ldots h_{-1}^c h_0^c h_1^c \ldots h_{M_1}^c] \tag{1}$$

In (1) T denotes matrix transpose. The output of the discrete-time channel is given by the convolution of the input data symbol sequence $a_k$ with the channel impulse response $\bar{h}^{cT}$ given in (2a). The output 3 of the discrete-time channel is modified in the adder 5 by the channel noise 4 $n_{k+\bar{K}_1}^c$ of variance $2\sigma_n^2$ generating the signal $z_{k+\bar{K}_1}^c$. The noisy channel output signal 6 $z_{k+\bar{K}_1}^c$, given by (2b) is input to the blind mode adaptive equalizer system 80.

$$y_{k_0} = \sum_{i=-M_1}^{M_1} h_i^{c*} a_{k_0-i} = \bar{h}^{cH} \bar{x}; \tag{2a}$$

$$\bar{x}_{k_0} = [a_{k_0+M_1}, \ldots, a_{k_0}, \ldots, a_{k_0-M_1}]^T$$

$$z_{k_0} = y_{k_0} + n_{k_0}^c; \tag{2b}$$

$$k_0 = k + \bar{K}_1;$$

$$k_0 = 0, 1, \ldots$$

In (2a), H denotes the matrix conjugate transpose operation and * denotes the complex conjugate operation.

Referring to FIG. 1, the noisy channel output signal 6 $z_{k+\bar{K}_1}^c$ is input to the channel gain normalizer block 7. The channel gain normalizer estimates the average signal power at the output of the discrete-time channel and normalizes the noisy channel output signal 6 such that the signal power at the output of the channel gain normalize 7 remains equal to some desired value even in the presence of the time-varying impulse response of the discrete-time channel as is the case with the fading dispersive channels in digital communication systems. The output 8 of the channel gain normalize 7 is given by $$z_{k+K_1} = \sum_{i=-M_1}^{M_1} h_i^* a_{k+K_1-i} + n_{k+K_1}; k+K_1 = 0, 1, 2, \ldots \tag{3}$$

In (3) $K_1 = \bar{K}_1 - N_p$ with $N_p$ denoting the delay incurred in channel gain normalizer block 7 and $\{h_i, i=M_1, \ldots 0, \ldots M_1\}$ denotes the normalized channel impulse response. Equation (3) may alternatively be written in the form of (4).

$$z_{k_0} = \bar{h}^H \bar{x}_{k_0} + n_{k_0}; \bar{h}^H = [h_{-M_1} \ldots h_{-1} h_0 h_1 \ldots h_{M_1}]^*; k_0 = k + K_1 \tag{4}$$

In (4) $\bar{x}_{k_0}$ is the channel state vector given by (2a).

Referring to FIG. 1, the output 8 of the channel gain normalize block 7 $z_{k+K_1}$ is input to the level 1 adaptive system 40, of the blind mode adaptive equalizer with hierarchical structure (BMAEHS) 60, that provides the detected data symbols 12 $a_{k+M_1}^d$ at time $k=-M_1, -M_1+1, \ldots$ with $N_1 = K_1 - M_1$ denoting the equalizer delay. The level 1 adaptive system 40 is comprised of an equalizer filter 9 with a time varying equalizer parameter vector $\bar{w}_k$ of length $N = N_1 + N_2 + 1$ for some positive integers $N_1$ and $N_2$ where $N_1$ and $N_2$ may be selected to be equal, an adaptation block 16 that adjusts the equalizer parameter vector 15 $\bar{w}_k$, and the decision device 11 that detects the data symbol from the input signal 10 present at the input of the decision device 11 based on the decision function $\Delta( )$. In various embodiments of the invention, the equalizer filter 9 may be a linear or a decision feedback filter, or a more general nonlinear equalizer filter characterized by a time varying parameter vector 15 $\overline{w}_k$. In one of the various embodiments of the invention with the decision feedback equalizer, the detected symbol 12 $a_{k+M_1}^d$ is fed back to the equalizer filter 9 via the delay block 13 that introduces a delay of one sample as shown in FIG. 1. The output 12b of the delay 13 is inputted to the equalizer filter 9. In one of the various embodiments of the invention with the linear equalizer, the equalizer state vector 14 $\overline{\psi}_k$ is comprised of the equalizer input $z_{k+K_1}$ and the various delayed versions of $z_{k+K_1}$ and is given by $$\overline{\psi}_k = [z_{k+K_1}, \ldots, z_{k+M_1}, \ldots, z_{k+M_1-N_2}]^T; N_2 = N_1 \quad (5)$$

In an alternative embodiment of the invention with the case of the decision feedback equalizer filter, the equalizer state vector 14 $\overline{\psi}_k$ is also comprised of the various delayed versions of detected symbol 12 $a_{k+M_1}^d$. Referring to FIG. 1, the gain normalizer output also referred to as the normalized channel output 8 $z_{k+K_1}$, is input to the delay 31 that introduces a delay of $K_1$ samples in the input 38 and provides the delayed version 32 $z_k$ to the model error estimator and the correction signal generator (MEECGS) block 17 of the level 2 adaptive system 50. Referring to FIG. 1, the detected data symbol 12 at the output of the decision device 11, and the equalizer parameter vector 15 $\overline{w}_k$ are input to (MEECGS) block 17. The MEECGS block 17 estimates the channel impulse response vector $\overline{h}^T$ from the detected symbol 12 $a_{k+M_1}^d$ and the delayed normalized channel output 32 $z_k$, determines any modeling error made by the level 1 adaptive system 40 and generates the correction signal 18 $\overline{w}_k^{c2}$ to mitigate such a modeling error.

In the process of the blind mode equalization by the BMAEHS, the estimate of the data symbols 12 $a_{k+M_1}$ during the initial period of convergence of the BMAEHS of length $N_d$ has relatively high probability of error. The initial period of convergence $N_d$ is the time taken by the BMAEHS 60 to achieve some relatively small mean squared equalizer error measured after the first $N_1+1$ samples at the output 8 of the channel gain normalize 7 are inputted to the BMAEHS 60 and may be selected to be about 100-200 samples. The data symbols during the initial convergence period are recovered by the initial data recovery block 75 of FIG. 1.

Referring to FIG. 1, the output 8 of the channel gain normalize 7 $z_{k+K_1}$ is inputted to the quantizer block 19. The quantizer 19 may quantize the input samples to $(n_q+1)$ bits with $n_q$ denoting the number of magnitude bits at the quantizer output, so as to minimize the memory requirements for storing the initial segment of the channel gain normalizer output. The number of quantizer bits may be selected on the basis of the signal to noise power ratio expected at the noisy channel output signal 6 so that the variance of the quantization noise is relatively small compared to the variance of the channel noise. The signal to quantization noise power ratio is given approximately by $6(n_q+1)$ dB and a value of $n_q$ equal to 3 may be adequate. In various other embodiments of the invention, the quantizer may be eliminated and the channel gain normalizer output 8 $z_{k+K_1}$ may be directly inputted to the delay 21.

Referring to FIG. 1, the output of the quantizer 20 $z_{k+K_1}^q$ is inputted to the delay 21 that introduces a delay of $N_d$ samples. The output of the delay 21 is inputted to the fixed equalizer 24. The fixed equalizer is comprised of the cascade of the equalizer filter and the decision device blocks similar to the equalizer filter 9 and the decision device 11 blocks respectively of the BMAEHS 60. As shown in FIG. 1, initially the switch $S_1$ is in open position and the fixed equalizer parameter vector 33 $\overline{w}_k^f$ remains fixed at $\overline{\delta}_{N_1,N_1} = [0 \ldots 0 1 0 \ldots 0]$ until the switch $S_1$ is closed. At $k+K_1 = N_f \equiv N_d + N_1$, the switch $S_1$ is closed and the fixed equalizer parameter vector 33 $\overline{w}_k^f$ is set equal to the equalizer parameter vector 15 $\overline{w}_k$ at the time of closing the switch and remains fixed for $k+K_1 > N_f$. The output of the fixed equalizer 25 $a_{k+M_1 N_d}^I$,
$M_1 = K_1 - N_1$, is connected to the position 2 of the switch $S_2$ 26. Referring to FIG. 1, the detected symbol 12 $a_{k+M_1}^d$ is input to the delay 29 that introduces a delay of $N_d$ samples. The output 27 of the delay 29 equal to $a_{k+M_1-N_d}^d$ is connected to the position 3 of the switch $S_2$ 26. The position 1 of the switch $S_2$ 26 is connected to the ground. For $k+K_1 < N_f$, the switch $S_2$ 26 remains in position 1 and the output of the switch $S_2$ 26 is equal to 0 during this period. During the period $N_f \leq k+K_1 < N_f+N_d$, the switch $S_2$ 26 is connected to position 2 and the final detected data 30 $a_{k+M_1-N_d}^{df}$ is taken from the output of the fixed equalizer 24. During the period $k+K_1 \geq N_f+N_d$, the output of the switch $S_2$ 26 is taken from the output of the BMAEHS 60. The output of the switch $S_2$ 26 constitutes the final detected data symbol 30 $a_{k+M_1-N_d}^{df}$. In various other embodiments of the invention, the recovery of the initial data segment may not be required and the initial data segment recovery block of FIG. 1 may not be present. In such alternative embodiments the final detected symbol output is taken directly from the output of the BMAEHS. As shown in FIG. 1, the detected symbol 12 $a_{k+M_1}^d$ may be inputted to the channel gain normalizer block 7.

Figure 2:
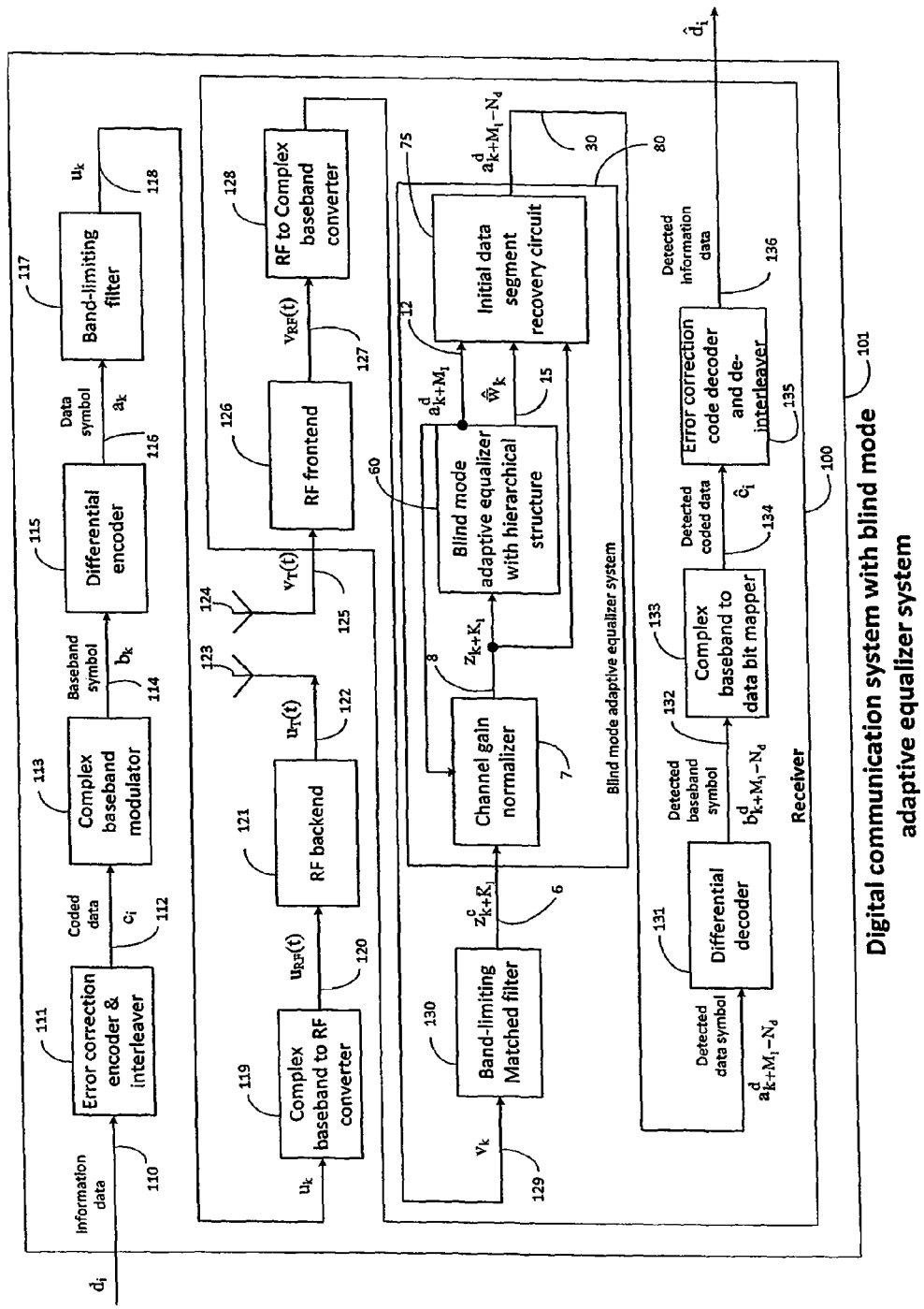
FIG. 2 shows one embodiment of the digital communication system with blind mode adaptive equalizer system.

FIG. 2 shows the block diagram of a digital communication system 101 embodying the blind mode adaptive equalizer system 80 of FIG. 1. Referring to FIG. 2, the information data sequence 110 $d_i$ possibly taking binary values 0 and 1 is input to the error correction code encoder and the interleaver block 111. The error correction coding and the interleaving operations on the information data are performed to protect the information data 110 $d_i$ from the possible errors caused due to various channel noise, disturbances, and interference. The coded data bits sequence $c_i$ at the output 112 of the error correction code encoder and the interleaver block 111 may also be taking binary values. The coded data 112 $c_i$ is input to the complex baseband modulator 113 that groups a number m of coded data bits and maps the group into 1 out of $M = 2^m$ possible complex values representing points in the signal constellation generating the sequence of the complex valued baseband symbols $b_k$ at the output 114 of the complex baseband modulator 113. For example, for the case of QPSK modulation corresponding to $M=4$, $b_k = b_{I,k} + j b_{Q,k}$; $j = \sqrt{-1}$, with $b_{I,k}$ and $b_{Q,k}$ each taking possible values $A_0$ and $-A_0$ for some positive constant $A_0$.

Referring to FIG. 2, the sequence of baseband symbols 114 $b_k$ is input to the differential encoder block 115. The differential encoder block 115 transforms the sequence of baseband symbols 114 $b_k$ into another complex valued sequence of data symbols 116 $a_k$ wherein the signal constellation of $a_k$ is same as that of the sequence $b_k$. For example, for the case of the QPSK modulation with $a_k = a_{I,k} + j a_{Q,k}$, both $a_{I,k}$ and $a_{Q,k}$ may take possible values $A_0$ and $-A_0$. The differential encoder 115 protects the information data 110 against possible phase ambiguity introduced at the receiver. The phase ambiguity may arise, for example, in the generation of the reference carrier signal, not shown, using nonlinear processing of the received signal as by the use of a fourth power nonlinearity in the case of QPSK modulation. The phase ambiguity may also occur in the use of the blind mode adaptive equalizer and may have a value of $2\pi n/M$ with $n=0, 1, \ldots, (M-1)$ for the case of MPSK modulation with $M=4$ for the QPSK modulation. More generally the number of phase ambiguities arising due to the blind mode equalizer may be equal to the number of distinct phase rotations of the signal constellation diagram that leaves the signal constellation diagram invariant.

Referring to FIG. 2 the sequence of the data symbols 116 $a_k$ at the output of the differential encoder 115 is inputted to the band limiting filter 117. The band limiting filter 117 may be a square root raised cosine filter used to minimize the bandwidth required for the transmission of the modulated RF signal. With the use of the square root raised cosine filter the absolute bandwidth of the filtered signal $u_k$ at the output 118 of the band limiting filter is reduced to $R_s(1+r)/2$ where $R_s$ is the symbol rate of the data symbols $a_k$ and r with $0<r\leq 1$ denotes the filter roll off factor as compared to a zero crossing bandwidth of the input data symbol sequence $a_k$ equal to $R_s$. The band limited symbol sequence 118 $u_k$ is inputted to the complex baseband to RF converter block 119 that shifts the center frequency of the spectrum of the signal 118 $u_k$ to the RF or possibly an intermediate (IF) frequency. The complex baseband to RF converter block 119 may in general have several stages including the conversion to the RF or some intermediate frequency (IF), and digital to analog conversion. The RF signal 120 $u_{RF}(t)$ at the output of the complex baseband to RF converter block 119 is inputted to the RF back end block 121 that is comprised of the RF band pass filter, the power amplifier, and possibly conversion from IF to RF frequency. The amplified signal 122 $u_T(t)$ is connected to the transmit antenna 123 for transmission of the RF signal into the wireless channel that may exhibit multipath propagation and fading resulting in the introduction of the inter symbol interference (ISI) in the transmitted signal.

Referring to FIG. 2 the RF signal at the output of the wireless channel is received by the receive antenna 124 providing the received RF signal 125 $v_R(t)$ to the input of the RF front end block 126 of receiver 100. The RF front end block may be comprised of a low noise amplifier (LNA), RF band pass filter, other amplifier stages, and possibly conversion from RF to IF and provides the amplified RF signal 127 $v_{RF}(t)$ at the output of the RF front end block. The receive antenna 124 and the RF front end block 126 may introduce additive noise including the thermal noise into the signal RF signal in the process of receiving and amplifying the RF signal at the output of the wireless channel. Referring to FIG. 2, the amplified RF signal 127 is inputted to the RF to complex baseband converter block 128 that down converts the RF signal to the complex baseband signal 129. The RF to complex baseband converter block 128 may be comprised of a RF to IF down converter, the IF to complex baseband converter and an analog to digital converter. The complex baseband signal 129 $v_k$ at the output of the RF to complex baseband converter block 128 is inputted to band limiting matched filter block 130 that may be comprised of a band limiting filter that is matched to the band limiting filter used at the transmitter and a down sampler. For the case of square root raised cosine filter used as the band limiting filter 117 at the transmitter, the band limiting filter 130 at the receiver is also the same square root raised cosine filter 117 at the transmitter. The design of the band limiting matched filter block 130 and various other preceding blocks both in the transmitter and receiver are well known to those skilled in the art of the field of this invention.

Referring to FIG. 2 the output 6 $z_{k+\overline{K}_1}^c$, with $\overline{K}_1$ denoting some reference positive integer, of the band limiting matched filter block 130 is inputted to the blind mode adaptive equalizer system 80. The blind mode adaptive equalizer system is comprised of the channel gain normalizer 7, the blind mode adaptive equalizer with hierarchical structure (BMAEHS) 60 and the initial data segment recovery circuit 75. The details of the blind mode adaptive equalizer system 80 are shown in FIG. 1. The cascade of the various blocks comprised of the band limiting filter 117, complex baseband to RF converter 119, the RF back end 121 and the transmit antenna 123, at the transmitter, wireless communication channel, and the receive antenna 124, the RF front end 126, RF to complex baseband converter 128 and the band limiting matched filter 130 at the receiver may be modeled by the cascade comprised of an equivalent discrete time channel 2 with input symbols $a_{k+\overline{K}_1}$ with $\overline{K}_1$ denoting some positive reference integer wherein a channel noise 4 $n_{k+\overline{K}_1}$ is added to the output of the channel 2 as shown in FIG. 1. The equivalent discrete time channel may have some unknown impulse response $\overline{h}^c$ that models the combined response of all the blocks in the said cascade.

Referring to FIG. 2, the channel gain normalizer 7 estimates the average signal power at the output of the equivalent discrete-time channel and normalizes the noisy channel output such that the signal power at the output of the channel gain normalizer remains equal to some desired value even in the presence of the time-varying impulse response of the discrete-time channel as is the case with the fading dispersive channels in the digital communication system of the FIG. 2. The BMAEHS 60 mitigates the impact of the inter symbol interference that may be caused by the multipath propagation in the wireless channel without requiring any knowledge of the channel impulse response or the need of any training sequence. The detected symbols during the initial convergence time of the BMAEHS may have relatively large distortion. The initial data segment recovery block 70 of FIG. 2 reconstructs the detected symbols during the initial convergence time based on the converged parameters of the BMAEHS and pre appends to the detected symbols at the output of the BMAEHS after the initial convergence time thereby mitigating the ISI from the initial data segment as well. The sequence of the final detected data symbols 30 $a_{k+M_1-N_d}^{df}$ with $N_d$ denoting the initial convergence time for the BMAEHS and $M_1$ a positive integer, the output of the blind mode adaptive equalizer system are inputted to the differential decoder block 131. The differential decoder block 131 performs an inverse operation to that performed in the differential encoder block 115 at the transmitter generating the sequence of the detected baseband symbols 132 $b_{k+M_1-N_d}$ at the output.

Figure 3A:
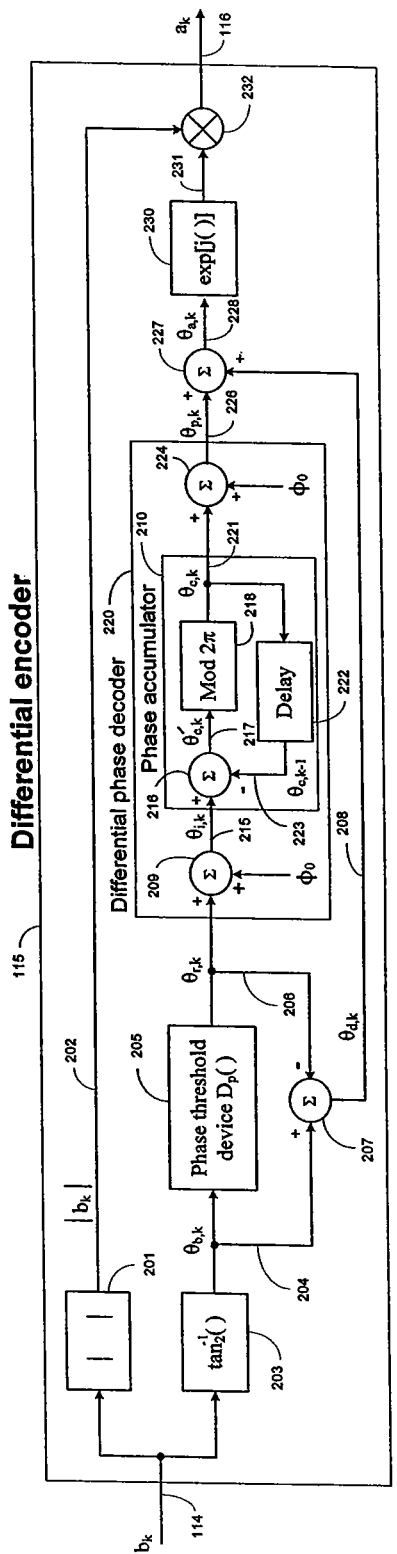
FIG. 3A shows a block diagram one embodiment of differential encoder.

FIG. 3A shows the block diagram of the differential encoder 115 unit of FIG. 2 for the modulated signal such as QAM, MPSK or ASK. As shown in FIG. 3A, the baseband symbol $b_k$ is inputted to the $\tan_2^{-1}(\ )$ block 203 that provides the four quadrant phase $\theta_{b,k}$ of the input $b_k$ at the output with taking values between 0 and $2\pi$. The phase $\theta_{b,k}$ is inputted to the phase threshold device 205 that provides the output 206 $\theta_{r,k}$ according to the decision function $D_p(\ )$ given by equation (6).

$$\theta_{r,k}=D_p(\theta_{b,k})=\phi_i; \phi_{t_i}\leq \theta_{b,k}<\phi_{t_{i+1}}; i=0,1,\ldots,S-1 \quad (6)$$

In (6) S denotes the order of rotational symmetry of the signal constellation diagram of the baseband signal $b_k$ equal to the number of distinct phase rotations of the signal constellation diagram that leave the signal constellation unchanged and is equal to the number of phase ambiguities that may be introduced by the blind mode equalizer. In (6) $\phi_{t_i}$; i=0, 1, . . . , S−1 are the S threshold levels of the phase threshold device 205.

Figure 3B:
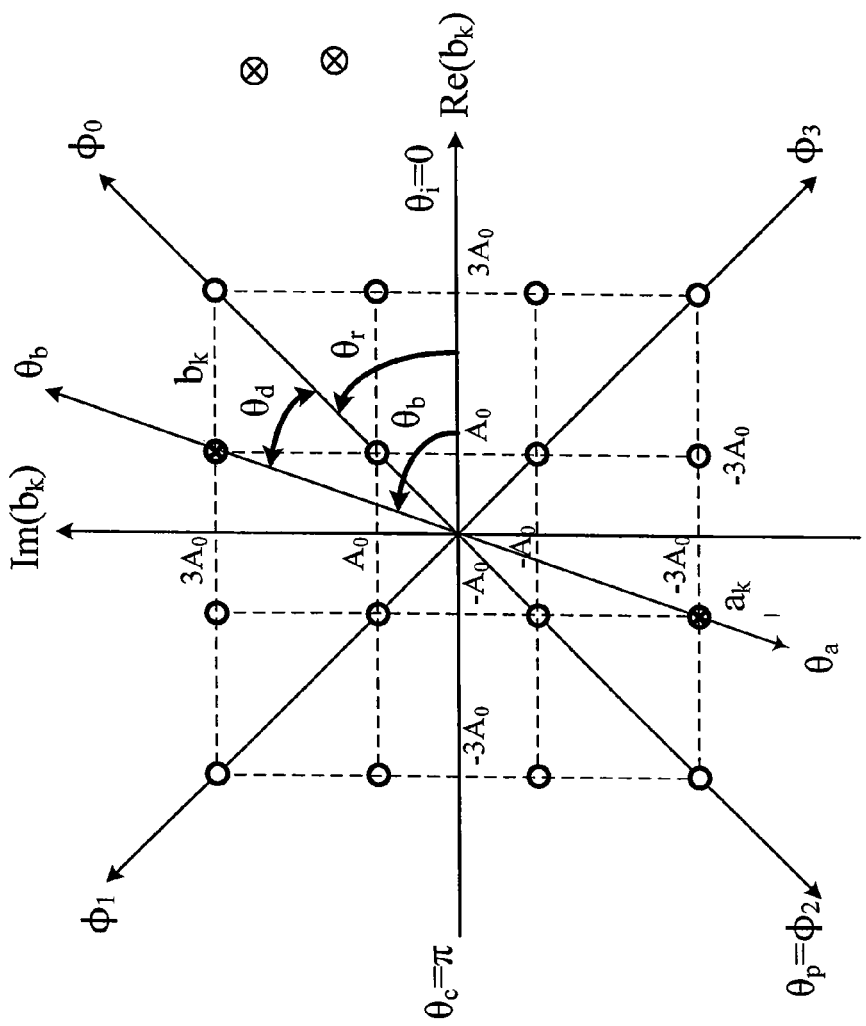
FIG. 3B shows the signal constellation diagram of 16QAM signal.

For illustration, FIG. 3B shows the signal constellation diagram of the 16 QAM signal that has order of rotational symmetry S equal to 4 with the possible phase ambiguities equal to 0, $\pi/2$, $\pi$, $3\pi/2$ as the rotation of the signal constellation diagram by any of the four values 0, $\pi/2$, $\pi$, $3\pi/2$ leaves the signal constellation unchanged. The threshold levels for the 16 QAM signal are given by. $\phi_{t_0}=0, =\pi/2, \phi_{t_2}=\pi, \phi_{t_3}=3\pi/2$. The range of the phase given by $\phi_{t_i} \leq \theta_{b,k} < \phi_{t_{i+1}}$ defines the $i^{th}$ sector of the signal constellation diagram equal to the $i^{th}$ quadrant of the signal constellation diagram in FIG. 3B for i=0, 1, 2, 3. Referring to FIG. 3A the output of the phase threshold device 205 is equal to the reference phase $\phi_i$ for the $i^{th}$ sector if $\theta_b$ lies in the $i^{th}$ sector or quadrant. The output of the phase threshold device 205 base phase 206 $\theta_{r,k}$ is equal to one of the S possible values Referring to FIG. 3A, the minimum reference phase $\phi_0$ is subtracted from the base phase 206 $\theta_{r,k}$ by the adder 209. The output 215 $\theta_a$ of the adder 209 is inputted to the phase accumulator 210 comprised of the adder 216, mod $2\pi$ block 218 and delay 222, provides the output 221 $\theta_{c,k}$ according to equation (2b).

$$\theta_{c,k} = \operatorname*{mod}_{2\pi}(\theta_{i,k} + \theta_{c,k-1}); \quad (7)$$

$$k = 0, 1, \ldots;$$

$$\theta_{c,-1} = 0$$

In (7) the mod $2\pi$ operation is defined as $$\operatorname*{mod}_{2\pi}(x) = x - \left\lfloor \frac{x}{2\pi} \right\rfloor 2\pi \quad (8)$$

In (8) $\lfloor x \rfloor$ denotes the highest integer that is smaller than x for any real x. The use of mod $2\pi$ block 218 in FIG. 3A is to avoid possible numerical build up of the accumulator output phase 221 by keeping the accumulator output 221 within the range 0 to $2\pi$ for all values of time k.

Referring to FIG. 3A, the phase accumulator output 221 is inputted to the adder 224 that adds the phase $\phi_0$ providing the output 226 $\theta_{p,k}$ to the adder 227. Referring to FIG. 3B for the case of 16QAM constellation, $\phi_0=\pi/4$ and $\phi_{i,k}$ takes possible values 0, $\pi/2$, $\pi$, $3\pi/2$. The output 221 $\theta_{c,k}$ of the phase accumulator can also have 0, $\pi/2$, $\pi$, $3\pi/2$ as the only possible values. The output 226 $\theta_{p,k}$ of the differential phase encoder 220 has $\pi/4$, $3\pi/4$, $5\pi/4$, $7\pi/4$ as the only possible values.

Referring to FIG. 3A, the signal 206 $\theta_{r,k}$ is subtracted from the signal 204 $\theta_{b,k}$ by the adder 207 providing the output 208 $\theta_{d,k}$ to the adder 227 that adds 208 $\theta_{d,k}$ to the differential phase encoder output 226 $\theta_{p,k}$ providing the phase of the encoded signal 228 $\theta_{a,k}$ at the output. The phase 228 $\theta_{a,k}$ is inputted to the block 231 providing the output 231 $\exp[j\theta_{a,k}]$; $j=\sqrt{-1}$ to the multiplier 232. Referring to FIG. 3A, the baseband symbol $b_k$ is inputted to the absolute value block 201 that provides the absolute value 202 $|b_k|$ to the multiplier 232. The output 116 $a_k=|b_k|\exp(j\theta_{a,k})$; $j=\sqrt{-1}$ of the multiplier 232 is the differentially encoded data symbol $a_k$. The process of differential encoding leaves the magnitude of the symbol unchanged with $|a_k|=|b_k|$ and with only the symbol phase modified.

As an example of the differential encoding process, FIG. 3B illustrates the encoding for the 16QAM signal. In FIG. 3B, the subscript k on various symbols has been dropped for clarity. Referring to FIG. 3B, the signal point $b_k=(A_0+j2A_0)$; $j=\sqrt{-1}$, marked by the symbol $\otimes$ in FIG. 3B, is encoded into the signal point $a_k=(A_0-j2A_0)$; $j=\sqrt{-1}$ marked by the symbol $\otimes$ in the figure. Referring to FIG. 3B, the phase $\theta_r$ is equal to $\phi_0=\pi/4$, with the corresponding phase 215 $\theta_i$ equal to 0. In the illustration of FIG. 3B, $\phi_{c,k-1}$ is equal to $\pi$ resulting in phase $\theta_{c,k}$ equal to $\pi$. Addition of $\phi_0=\pi/4$ to $\theta_{c,k}$ results in the phase 226 $\theta_p$ equal to $5\pi/4$ that is equal to $\phi_2$. Addition of phase 208 $\theta_d$ equal to $\tan_2^{-1}(3/1)-\pi/4 \cong 0.15\pi$ to the phase $\theta_p=5\pi/4$ results in $\theta_a=1.4\pi$ as shown in FIG. 3B. With the magnitude of $a_k$ given by $|a_k|=A_0\sqrt{10}$, the encoded data symbol $a_k=A_0\sqrt{10}\exp(j1.4\pi)$; $j=\sqrt{-1}$ is obtained as shown in FIG. 3B by the symbol $\otimes$. For the case of the PSK signals, the phase threshold device 205 $D_p()$ is bypassed with the output 206 $\theta_{r,k}$ equal to the phase 204 $\theta_{b,k}$ and with the phase 208 $\theta_{d,k}$ equal to 0.

Figure 4:
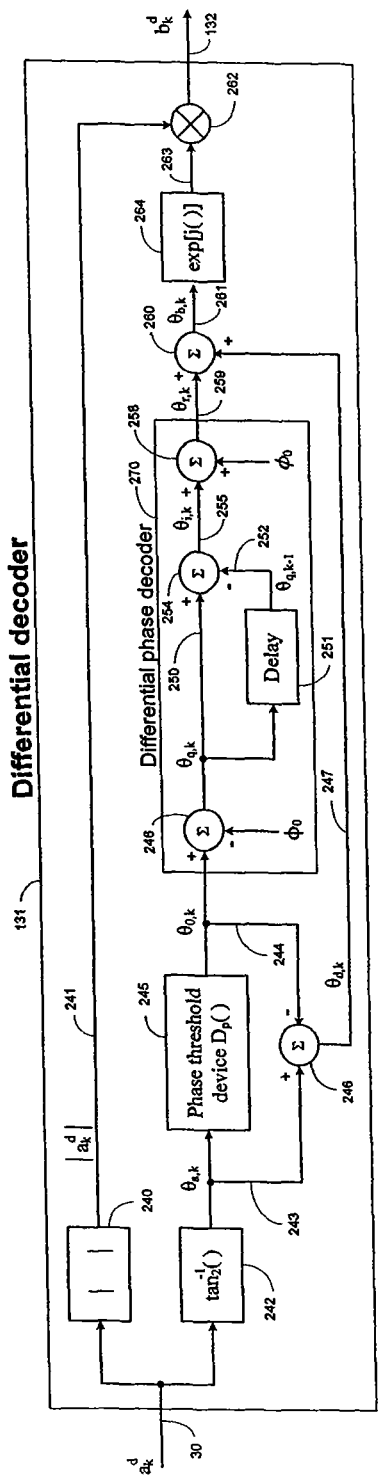
FIG. 4 shows a block diagram of one embodiment of differential decoder.

FIG. 4 shows the block diagram of the differential decoder 131 unit of FIG. 2. Referring to FIG. 4 the detected data symbol $a_k^d$, is inputted to the $\tan_2^{-1}()$ block 242 providing the phase $\theta_{a,k}$ of $a_k^d$ at the output 243. The phase 243 $\theta_{a,k}$ is inputted to the phase threshold device 245 that provides the output phase 244 $\theta_{o,k}$ computed according to the decision function $D_p()$ given by equation (6). The output of the phase threshold device 245 is inputted to the differential phase decoder 270 providing the phase $\theta_{r,k}$ at the output 259. Referring to FIG. 4, the phase 244 $\theta_{o,k}$ is inputted to the adder 246 that subtracts $\phi_0$ from $\theta_{r,k}$ with the output 250 $\theta_{q,k}=\theta_{o,k}-\phi_0$. The phase $\theta_{q,k}$ is inputted to the delay 251 providing the delayed phase 252 $\theta_{q,k-1}$ to the adder 254 that subtracts $\theta_{q,k-1}$ from $\theta_{q,k}$ providing the output 255 $\theta_{i,k}=\theta_{q,k}-\theta_{q,k-1}$ to the adder 258 that adds $\phi_0$ to the input 255 $\phi_{i,k}$ providing the output 259 $\theta_{r,k}$ to the adder 260. Referring to FIG. 4, the phase 243 $\theta_{a,k}$ and 244 $\theta_{o,k}$ are inputted to the adder 246 providing the phase difference 247 $\theta_{d,k}=\phi_{a,k}-\theta_{o,k}$ to the input of the adder 260 that adds $\theta_{d,k}$ to the phase 259 $\theta_{r,k}$ providing the phase 261 $\theta_{b,k}$ that is the phase of the differentially decoded signal $b_k^d$.

Referring to FIG. 4, the detected data symbol 30 $a_k^d$ is inputted to the absolute value block 240 providing the absolute value 241 $|a_k^d|$ to the multiplier 262. The output 261 $\theta_{b,k}$ is inputted to the block 264 providing the output 263 $\exp[j\theta_{b,k}]$; $j=\sqrt{-1}$ to the multiplier 262. The multiplier 262 provides the data detected symbol 132 $b_k^d=|a_k^d|\exp(j\theta_{b,k})$; $j=\sqrt{-1}$ at the multiplier 262 output.

Referring to FIG. 2, the detected baseband symbols 132 are input to the complex baseband to data bit mapper 133 that maps the complex baseband symbols 132 into groups of m binary bits each based on the mapping used in the complex baseband modulator block 113 at the transmitter. The sequence of the detected coded data bits 134 $\hat{c}_i$ at the output of the complex baseband to data bit mapper block 133 is inputted to the error correction code decoder and deinterleaver block 135 that performs inverse operations to those performed in the error correction code encoder and interleaver block 111 at the transmitter and provides the detected information data sequence 136 $\hat{d}_i$ at the output. In some communication systems, the band limiting filter may intentionally introduce some ISI caused by selecting the symbol rate to be higher than the Nyquist rate so as to increase the channel capacity. The blind mode adaptive equalizer system 80 of FIG. 1, 2 will also mitigate the ISI arising both due to the intentionally introduced ISI and that arising from the wireless channel.

Figure 5:
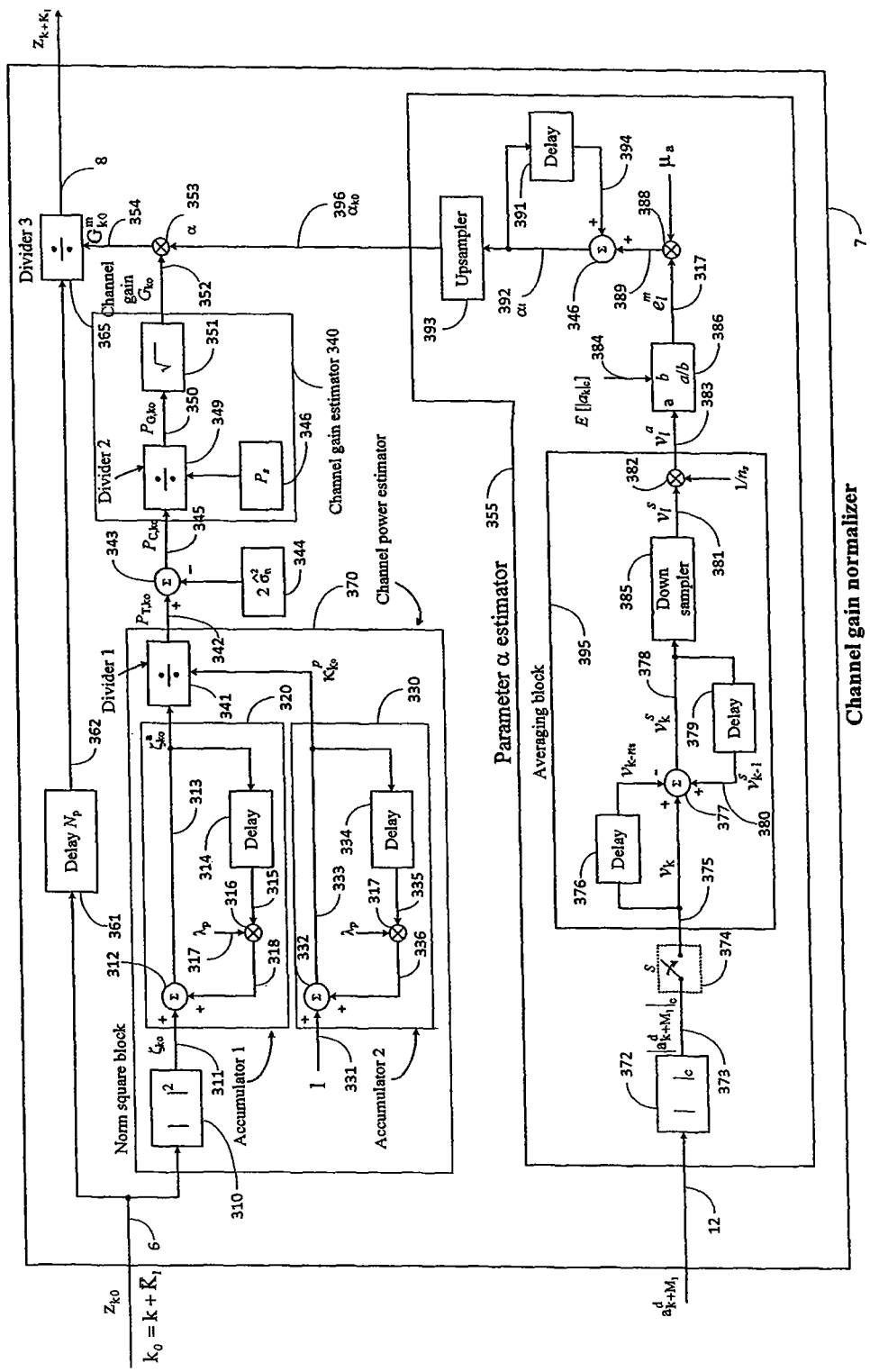
FIG. 5 shows a block diagram of one embodiment of channel gain normalizer.

FIG. 5 shows the block diagram of the channel gain normalizer 7. Referring to FIG. 5, the noisy channel output 6 $z_{k_0}^c$, $k_0=k+\overline{K}_1$, with $\overline{K}_1$ equal to a reference positive integer, is input to the channel power estimator block 370 that estimates the average power present at the noisy channel output 6. The noisy channel output 6 is input to the norm square block 310 that provides $\zeta_{k_0}=|z_{k_0}^c|^2$ at the output 311. The output of the norm square block 310 is inputted to the accumulator 1 320 that accumulates the input 311 $\zeta_{k_0}$ over a period of time with an exponential data weighting providing the accumulated value 313 $\zeta_{k_0}^a$ at the output with $$\zeta_{k_0}^a = \lambda_p \zeta_{k_0-1}^a + \zeta_{k_0}; k_0 = 0, 1, \ldots \quad (9)$$

In (9) the initial value of the accumulator output $\zeta_{-1}^a$ is set equal to 0, and $\lambda_P$, $0<\lambda_p\leq 1$, is a constant that determines the effective period of accumulation in the limit as $k_0\to\infty$ and is approximately equal to $1/(1-\lambda_p)$, for example, $\lambda_P$ may be selected equal to 0.998. Referring to FIG. 1, a constant 1 is input to the accumulator 2 block 330 that provides at its output 330 $\kappa_{k_0}^p$ given by $$\kappa_{k_0}^p = \lambda_p \kappa_{k_0-1}^p + 1; \kappa_{-1}^p = 0; k_0 = 0, 1, \ldots \quad (10)$$

From (10), the value of $\kappa_{k_0}^p$ is given by $\kappa_{k_0}^p = (1-\lambda\lambda_p^{k_0+1})/(1-\lambda_p)$; $k_0=0, 1, \ldots$. The outputs of the accumulators 1 and 2 blocks 320 and 330 are inputted to divider 341 that divides the output 313 $\zeta_{k_0}^a$ of the accumulator 320 by the output 333 $\kappa_{k_0}^p$ of the accumulator 330 providing the average power estimate 342 $P_{T,k_0} = \zeta_{k_0}^a/\kappa_{k_0}^p$ at the output of the divider 341.

Referring to FIG. 5, the average power estimate 342 $P_{T,k_0}$ is input to the adder 343 that subtracts the estimate of the noise variance 344 $2\hat{\sigma}_n^2$ from 342 $P_{T,k_0}$ resulting in the estimate 345 $P_{c,k_0}$ of the signal power at the discrete-time channel 2 output. The noise variance estimate 344 may be some a-priori estimate of the channel noise variance or may be set equal to 0. The signal power estimate 345 $P_{c,k_0}$ is input to the divider 349 that has its other input made equal to the desired signal power 346 $P_s = E[|a_k|^2]$ with E denoting the expected value operator. The desired signal power may be normalized by an arbitrary positive constant, for example by $A_0^2$ with $A_0$ simultaneously normalizing the threshold levels in (23)-(24) of the decision device 11 and the expected value $E[|a_k|_c]$ in (14), (15). The divider 349 block divides the signal power estimate 345 $P_{c,k_0}$ by 346 $P_s$ and outputs the result 350 $P_{G,k_0} = P_{c,k_0}/P_s$. The divider 349 output 350 $P_{G,k_0}$ representing the discrete-time channel power gain is input to the square root block 351 that provides the channel gain 352 $G_{k_0} = \sqrt{P_{G,k_0}}$ at the output of the square root block. The channel gain $G_{k_0}$ is made available to the multiplier 353. The initial convergence rate of the BMAEHS 60 may be increased by adjusting the channel gain $G_k$ by a factor $\alpha_k$ that is derived on the basis of the statistics of the detected symbol $a_k^d$ at the output 12 of the BMAEHS. The adjustment factor $\alpha_k$ is derived such that the expected value of the magnitude of the real and imaginary components of $a_k^d = a_{I,k}^d + ja_{Q,k}^d$; $j=\sqrt{-1}$ approach $E[|a_{I,k}|]$ and $[|a_{Q,k}|]$; $a_k = a_{I,k} + ja_{Q,k}$, respectively with convergence, where E denotes the expected value operation. Referring to FIG. 5, the detected symbol $a_{k+M_1}$ is inputted to the absolute value $\|\cdot\|_c$ block 372. where in the operation of the absolute value block 372 for any complex valued argument z is defined by $$|z|_c = |z_r| + j|z_i|; z = z_r + jz_i; j = \sqrt{-1}; z_r, z_i \text{ real} \quad (11)$$

Referring to FIG. 5, the output 373

$$|a_{k+M_1}^d|_c$$

of the absolute value block 372 is inputted to the switch S 374 that is closed at $k+M_1=N_p+N_1+1$ and remains closed thereon where $N_1$ is the delay introduced by the BMAEHS block 60. The output 374 $v_k$ 374 of the switch S is inputted to the averaging block 395 that averages the input $v_k$ over consecutive periods of $n_s$ samples. The averaging period $n_s$ may be selected to be equal to 10. The averaging block is comprised of the delay 376, adder 377, delay 379, down sampler 385, and multiplier 382. Referring to FIG. 5, the output of switch S is inputted to the adder 377 and to the delay 376 that provides the delayed version $v_{k-n_s}$ to the adder 377. The output of the adder 377 $v_k^s$ is input to the delay 379 providing output 380 $v_{k-1}^s$ to the input of the adder 377. The output of the adder 377 may be written as $$v_k^s = v_{k-1}^s + v_k - v_{k-n_s}; \quad (12)$$

$$v_0^s = 0;$$

$$v_k^s = \sum_{j=k-n_s+1}^{k} v_j$$

The output $v_k^s$ of the adder 377 is inputted to the down sampler 385 that samples the input 378 at intervals of $n_s$ samples with the output 381 $v_l^s$ inputted to the multiplier 382. The multiplier 382 normalizes the input $v_l^s$ by $n_s$ providing the average output $v_l^a$ given by $$v_l^a = \frac{1}{n_s} \sum_{i=(l-1)n_s+1}^{ln_s} v_i; \quad (13)$$

$$l = 1, 2, \ldots$$

The output $v_l^a$ of the averaging block 395 is inputted to the divider block 386 that divides $v_l^a$ by input 384 $E[|a_k|_c]$ given by $$E[|a_k|_c] = E[|a_{I,k}|] + jE[|a_{Q,k}|]; a_k = a_{I,k} + ja_{Q,k}; j = \sqrt{-1} \quad (14)$$

For example, when both $a_{I,k}$ and $a_{Q,k}$ take possible values $\pm A_0$ and $\pm 3A_0$ with equiprobable distribution, then $$E[|a_k|_c] = 2A_0 + j2A_0; j = \sqrt{-1} \quad (15)$$

Referring to FIG. 5, the output of the divider 386 $e_l^m = v_l^a \{E[|a_k|_c]\}^{-1}$ may measure the deviation of the magnitude of the real and imaginary components of the BMAEHS 60 output from the expected values $E[|a_{I,k}|]$ and $E[|a_{Q,k}|]$ respectively. The magnitude error $e_l^m$ is inputted to the multiplier 388 that multiplies $e_l^m$ by a relatively small positive number $\mu_a$ providing the output 389 equal to $\mu_a e_l^m$ the input of the adder 392. The output of the adder $\alpha_l$ is inputted to the delay 391. The output 394 $\alpha_{l-1}$ of the delay 391 is inputted to the adder 390 that provides the output 392 $\alpha_l$ according to $$\alpha_l = \alpha_{l-1} + \mu_a e_l^m; l=1,2,\ldots; \alpha_0=1 \quad (16)$$

The output 392 $\alpha_l$ of the adder 390 is inputted to the up sampler block 393 that increases the sampling rate by a factor $n_s$ using sample hold. The output 396 $\alpha_{k_0}$ of the sampler block 393 is inputted to the multiplier 353 that adjusts the channel gain estimate $G_{k_0}$ by $\alpha_{k_0}$ providing the output 354 $G_{k_0}^m$ to the divider 365.

Referring to FIG. 5, the noisy channel output 6 $z_{k_0}^c$ is input to delay block 361 that introduces a delay of $N_p$ samples that is the number of samples required to provide a good initial estimate of $G_{k_0}^m$ and may be selected equal to 50. The output of the delay block 361 is input to the divider 365 that normalizes the delay block output 362 by the modified channel gain 354 $G_{k_0}^m$ providing the normalized channel output 8 $z_{k+K_1}$; $k+K_1=0, 1, \ldots$, with $K_1=\overline{K}_1-N_p$.

The parameter $\alpha_k$ matches the amplitude of the real and imaginary components of the normalized channel output to the threshold levels of the slicers in the decision device, thereby also making the probability distribution of the detected data symbols $a_k^d$ equal to the probability distribution of the data symbols $a_k$. This can also be achieved in an alternative embodiment of the invention by making the dominant center element $h_0$ of the normalized channel impulse response $\bar{h}$ equal to 1. For the case when both the data symbols and the channel impulse response vector are real valued, the parameter $\alpha_k$ may be estimated in terms of the channel dispersion defined as $$d = \left\{ 1 - \frac{|h_0|^2}{\|\bar{h}\|^2} \right\}^{1/2} \quad (17)$$

Thus for the normalized channel with $\|\bar{h}\|=1$, the estimate of the magnitude of $\alpha_k$ in terms of the channel dispersion d is given by $$\alpha_k = \sqrt{(1-d^2)} \quad (18)$$

For the case of weakly dispersive channels wherein d is much smaller compared to 1, $\alpha_k$ may be estimated to be 1. For the case of data symbols having constant amplitude as is the case, for example, with MPSK modulation the parameter $\alpha_k$ may also be set to 1. In the more general case of the complex valued data symbols with non constant amplitude, in alternative embodiments of the invention, the parameter may be estimated adaptively so as to make the dominant element of the normalized channel impulse response approach 1. An algorithm that minimizes the difference between the dominant element $h_0$ and 1 is given by $$\alpha_{k+1} = \alpha_k + \mu_a \frac{\hat{h}_{0,k}}{\alpha_k} (1 - \alpha_k \hat{h}_{0,k})^*; \quad (19)$$

$$k = 0, 1, \ldots$$

In equation (19) $\mu_a$ is some small positive constant and $\alpha_0$ may be set to 1.

In various embodiments of the invention, the equalizer filter in the equalizer filter block may be a linear, a decision feedback or a more general nonlinear equalizer filter based on the equalizer parameter vector $\bar{w}_k$ that provides the linear estimate of the data symbol on the basis of the normalized channel output $z_{k+K_1}$.

Figure 6:
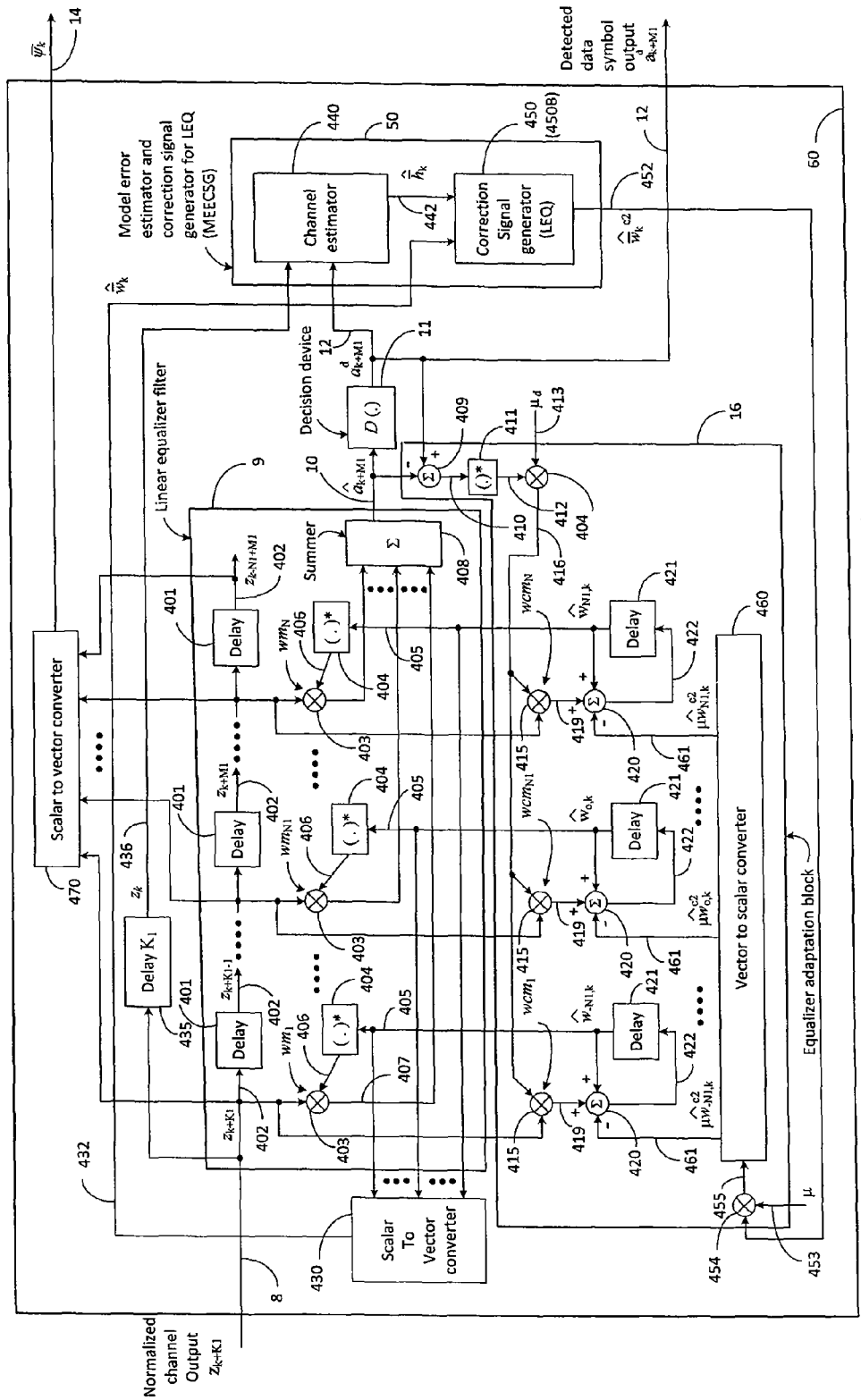
FIG. 6 shows a block diagram of one embodiment of blind mode adaptive equalizer with hierarchical structure (BMAEHS) with linear equalizer.

FIG. 6 shows the block diagram of the BMAEHS 60 of FIG. 1 in one of the various embodiments of the invention. Referring to FIG. 6, the equalizer filter 9 is a linear equalizer filter. Referring to FIG. 6, the output of the channel gain normalizer block 8 also referred to as the normalized channel output $z_{k+K_1}$ is input to a cascade of $2N_1$ delay elements 401 providing the delayed versions 402 of $z_{k+K_1}$ denoted by $z_{k+K_1-1}, \ldots, z_{k-N_1+M_1}$ at their respective outputs. The normalized channel output and its various delayed versions 402 are input to the N wm multipliers 403 $wm_1, \ldots, wm_N$. The N wm multipliers 403 are inputted by the conjugates 406 of the components 405 of the equalizer parameter vector $\hat{w}_{-N_1,k}, \ldots, \hat{w}_{0,k}, \ldots, \hat{w}_{N_1,k}$. The wm multipliers 403 $wm_1, \ldots, wm_N$ multiply the normalized channel output and its delayed versions 402 by the respective conjugates 406 of the components of the equalizer parameter vector $\bar{w}_k$ generating the respective products 407 at the outputs of the wm multipliers 403. The outputs of the wm multipliers 407 are inputted to the summer 408 providing a linear estimate 10 $\hat{a}_{k+M_1}$ of the data symbol at the output of the summer 408. The linear estimate 10 $\hat{a}_{k+M_1}$ is input to the decision device 11 that generates the detected symbol 12 $a_{k+M_1}^d$ at the output of the decision device 11 based on the decision function $\Delta(\ )$.

The selection of the decision function $\Delta(\ )$ depends upon the probability distribution of the data symbols $a_k = a_{I,k} + j\, a_{Q,k}$, with $j = \sqrt{-1}$, and with $a_{I,k}$ and $a_{Q,k}$ denoting the real and imaginary components of $a_k$. For example, for the case of the discrete type of the probability distribution of the data symbols $a_k$ with both the real and imaginary components $a_{I,k}$ and $a_{Q,k}$ of $a_k$ taking possible values from the finite sets $\Sigma_I$ and $\Sigma_Q$ respectively and where the components $a_{I,k}$ and $a_{Q,k}$ are statistically independent as is the case, for example, for the MQAM modulated signals, the decision function may be given by (20).

$$D(\hat{a}_{I,k} + j\hat{a}_{Q,k}) = D_I(\hat{a}_{I,k}) + jD_Q(\hat{a}_{Q,k}) \quad (20)$$

In (20) the functions $\Delta_I(\ )$ and $\Delta_Q(\ )$ may be the slicer functions. For the specific case when both the sets $\Sigma_I$ and $\Sigma_Q$ are equal to the set $\{\pm 1, \pm 3, \ldots, \pm(N-1)\} A_0$ for some integer N and positive real number $A_0$, the two slicer functions $\Delta_I(x)$ and $\Delta_Q(x)$ with x real, are identical and are given by (21).

$$D_I(x) = D_I(x) = D_m(|x|)\text{sgn}(x) \quad (21)$$

In (21), sgn(x) is the signum function given by $$\text{sgn}(x) = \begin{cases} +1; x > 0 \\ -1; x \leq 0 \end{cases} \quad (22)$$

And the function $D_m(|x|)$ is given by $$D_m(|x|) = iA_0; V_{t_{i-1}} \leq |x| < V_{t_i}; i=1,2,\ldots,N/2 \quad (23)$$

In (23), $V_{t_i}$ for $i=0, 1, \ldots, N/2$ are the threshold levels given by $$V_{t_i} = \begin{cases} 0; i = 0 \\ 2iA_0; 0 < i < N/2 \\ \infty; i = N/2 \end{cases} \quad (24)$$

The decision function described by (20) (24), for example, applies to the case where $a_k$ is obtained as a result of MQAM modulation in the digital communication system of FIG. 2, with the number of points in the signal constellation $M = N^2$. For other modulation schemes and different probability distributions of the data symbol, other appropriate decision functions may be employed. For the specific case of M=4 corresponding to the QPSK modulation, the decision function in (20) reduces to $$D(\hat{a}_{I,k} + j\hat{a}_{Q,k}) = \text{sgn}(\hat{a}_{I,k}) + j\text{sgn}(\hat{a}_{Q,k}) \quad (25)$$

For the case of MPSK modulation with M>4, the decision device may comprise of a normalizer that normalizes the complex data symbol by its magnitude with the normalized data symbol operated by the decision function in (20)-(24).

Referring to FIG. 6, the linear estimate 10 $\hat{a}_{k+M_1}$ is subtracted from 12 $a_{k+M_1}^d$ by the adder 409 providing the error signal 410 $e_k = (a_{k+M_1}^d - \hat{a}_{k+M_1})$. The error signal 410 $e_k$ is input to the conjugate block 411. The output of the conjugate block 412 $e_k^*$ is multiplied by a positive scalar 413 $\mu_d$ in the multiplier 414. The output of the multiplier 414 is input to the N weight correction multipliers 415 $wcm_1, \ldots, wcm_N$ wherein it multiplies the normalized channel output $z_{k+K_1}$ and its various delayed versions 401 $z_{k+K_1-1}, \ldots, z_{k-N_1+M_1}$ generating the N components 419 of $\mu_d \bar{w}_k^{c1}$ with the first correction vector $\bar{w}_k^{c1}$ given by (26).

$$\bar{w}_k^{c1} = \bar{\psi}_k e_k^*; \bar{\psi}_k = [z_{k+K_1}, \ldots, z_{k+M_1}, \ldots, z_{k+M_1-N_1}]^T; \quad (26a)$$

$$e_k = (a_{k+M_1}^d - \hat{a}_{k+M_1}); k=0,1,\ldots \quad (26b)$$

Referring to FIG. 6, the second parameter correction vector 452 $\overline{w}_k$ generated by the MEECGS for LEQ block 50 is multiplied by a positive scalar 453 µ by the multiplier 454. The multiplier output 455 is connected to the vector to scalar converter 460 that provides the N components 461 of the vector $\mu \overline{w}_k^{c2}$ given by $\mu w_{-N_1,k}^{c2}, \ldots, \mu w_{0,k}^{c2}, \ldots, \mu w_{N_1,k}^{c2}$ at the output of the vector to scalar converter 460. The outputs 419 of the $wcm_1, \ldots, wcm_N$ multipliers 415 and the N components 461 of the vector $\mu \overline{w}_k^{c2}$ are both input to N adders 420 $wca_1, \ldots, wca_N$. Referring to FIG. 6, the equalizer parameter components, $\hat{w}_{-N_1,k}, \ldots, \hat{w}_{0,k}, \ldots, \hat{w}_{N_1,k}$ at the outputs of the N delay elements 421 are input to the wca adders 420. The wca adders 420 add the equalizer parameter components 422 $\hat{w}_{-N_1,k}, \ldots, \hat{w}_{0,k}, \ldots, \hat{w}_{N_1,k}$ to the outputs 419 of the $wcm_1, \ldots, wcm_N$ multipliers and subtract the N components 461 of the vector $\mu \overline{w}_k^{c2}$ from the results of the addition providing the updated version of the N components 422 of the equalizer parameter vector $\overline{w}_{k\pm1}$ at the outputs of the N wca adders 420. The output 422 of the N wca adders 420 are connected to the N delay elements 421. The outputs 405 of the N delay elements 421 are equal to the equalizer parameter vector components 405 $\hat{w}_{-N_1,k}, \ldots, \hat{w}_{0,k}, \ldots, \hat{w}_{N_1,k}$ that are inputted to the N conjugate blocks 404.

Referring to FIG. 6, the detected symbol 12 $a_{k+M_1}^d$ is inputted to the channel estimator 440. The normalized channel output 8 $z_{k+K_1}$ is input to the delay block 435 that introduces a delay of $K_1$ samples providing the delayed version 436 $z_k$ to the input of the channel estimator 440. The channel estimator 440 provides the estimate of the channel impulse response vector 442 $\hat{h}_k$ at the output of the channel estimator. The equalizer parameters 405, $\hat{w}_{-N_1,k}, \ldots, \hat{w}_{0,k}, \ldots, \hat{w}_{N_1,k}$ are input to the scalar to vector converter 430 that provides the equalizer vector 432 $\overline{w}_k$ to the correction signal generator for LEQ 450. The estimate of the channel impulse response vector 442 $\hat{h}_k$ is input to the correction signal generator 450 that provides the second correction signal vector 452 $\overline{w}_k^{c2}$ to the multiplier 454. The correction signal generator 450 convolves the estimate of the channel impulse response vector 442 $\hat{h}_k^T$ with the equalizer parameter vector 432 $\overline{w}_k$ to obtain the convolved vector $\overline{g}_k^T$. The difference between the vector $\overline{g}_k^T$ obtained by convolving the estimate of the channel impulse response vector $\hat{h}_k^T$ with the equalizer parameter vector $\overline{w}_k^T$, and the ideal impulse response vector $$\overline{\delta}_{K_1,K_1}^T = \left[ \underbrace{00 \ldots 0}_{K_1} \quad 1 \quad \underbrace{00 \ldots 0}_{K_1} \right]$$

may provide a measure of the modeling error incurred by the equalizer 9. A large deviation of the convolved response $\overline{g}_k^T$ from the ideal impulse response implies a relatively large modeling error. The correction signal generator block generates a correction signal 452 $\overline{w}_k^{c2}$ on the basis of the modeling error vector $[\overline{\delta}_{K_1,K_1} - \overline{g}_k]$ and inputs the correction signal 452 $\overline{w}_k^{c2}$ to the adaptation block 16 for adjusting the equalizer parameter vector $\overline{w}_{k+1}$ at time k+1.

The equalizer parameter update algorithm implemented in FIG. 6 may be described by (27a, b)

$$\overline{w}_{k+1} = \overline{w}_k + \mu_d \overline{w}_k^{c1} - \mu \overline{w}_k^{c2}; \tag{27a}$$

$$\overline{w}_k^{c1} = \overline{\psi}_k (a_{k+M_1}^d - \overline{w}_k^H \overline{\psi}_k)^*; k=0,1,\ldots \tag{27b}$$

The first correction signal vector $\overline{w}_k^{c1}$ may be based on the minimization of the stochastic function $|a_{k+M_1}^d - \overline{w}^H \overline{\psi}_k|^2$ with respect to the parameter vector $\overline{w}$ and is equal to 0.5 times the negative of the gradient of the stochastic function with respect to $\overline{w}$. In the absence of the second correction signal vector, the update algorithm in (27a) reduces to the decision directed version of the LMS algorithm.

In various other embodiments of the invention, the first correction signal vector may be derived on the basis of the optimization of the objective function in (28)

$$J_k^d = \sum_{n=0}^{k} \lambda_{k-n}^d |\overline{w}^H \overline{\psi}_n - a_{n+M_1}^d|^2; \tag{28}$$

$$\overline{\psi}_n = [z_{n+K_1}, \ldots, z_{n+M_1}, \ldots, z_{n+M_1-N_1}]^T$$

with respect to the equalizer parameter vector $\overline{w}$ and results in the RLS algorithm in (29a, b).

$$\overline{w}_{k+1} = \overline{w}_k + \mu_d R_k \overline{\psi}_k (a_{k+M_1}^d - \overline{w}_k^H \overline{\psi}_k)^*; \tag{29a}$$

$$R_k = \lambda^{-1} [R_{k-1} - R_{k-1} \overline{\psi}_k (\overline{\psi}_k^H R_{k-1} \overline{\psi}_k + \lambda)^{-1} \overline{\psi}_k^H R_{k-1}]; k=1,2,\ldots \tag{29b}$$

In (29b) the matrix $R_k$ at time k=0 may be initialized by a diagonal matrix $\epsilon_R I_N$ for some small positive scalar $\epsilon_R$ with $I_N$ denoting the (N×N) identity matrix. Based on the optimization of the function $J_k^d$, the first correction signal vector $\overline{w}_k^{c1}$ in (27b) may be modified to arrive at the alternative equalizer parameter vector update algorithm in (30)

$$\overline{w}_{k+1} = \overline{w}_k + \mu_d \overline{w}_k^{c1} - \mu \overline{w}_k^{c2} \tag{30a}$$

$$\overline{w}_k^{c1} = R_k \overline{\psi}_k (a_{k+M_1}^d - \overline{w}_k^H \overline{\psi}_k)^*; k=0,1,\ldots \tag{30b}$$

With $R_k$ in (30b) updated according to (29b). The algorithm in (30) may result in a faster convergence compared to that in (27).

In various other embodiments of the invention the first correction signal vector $\overline{w}_k^{c1}$ may be based on the one of the quantized state algorithms such as the QS1 algorithm given by $$\overline{w}_k^{c1} = R_k \overline{\psi}_k^q (a_{k+M_1}^d - \overline{w}_k^H \overline{\psi}_k)^* \tag{31a}$$

$$R_k^q = \lambda^{-1} [R_{k-1}^q - R_{k-1} \overline{\psi}_k^q (\overline{\psi}_k^{qH} R_{k-1} \overline{\psi}_k^q + \lambda)^{-1} \overline{\psi}_k^H R_{k-1}^q]; k=0,1,\ldots \tag{31b}$$

The vector $\overline{\psi}_k^q$ is obtained by replacing both the real and imaginary components of the various components of the vector $\overline{\psi}_k$ with the 1 bit quantized versions. The $i^{th}$ component of $\overline{\psi}_k^q$ is given by (31c).

$$\psi_{k,i}^q = \text{sgn}(\text{Re}(\psi_{k,i})) + j\text{sgn}(\text{Im}(\psi_{k,i})); j=\sqrt{-1};$$
$$i=-N_1,\ldots,0,\ldots,N_1 \tag{31c}$$

In (31c) sgn(x) for x real is the signum function defined in (22), and Re(z) and Im(z) denote the real and imaginary components of z for any complex variable z.

Referring to FIG. 1, the output $z_k$, for any integer k, of the channel gain normalizer block 7 in FIG. 1 may be expressed as $$z_k = y_k + n_k; \tag{32a}$$

$$y_k = \sum_{i=-M_1}^{M_1} h_i^* a_{k-i}; \tag{32b}$$

$$k = 0, 1, \ldots$$

where $h_i$, $-M_1, \ldots, 0, \ldots, M_1$, are the components of the channel impulse response vector $\overline{h}$ related to the vector $\overline{h}^c$ via the channel gain $G_k^m$ shown in FIG. 5. From (32a,b) an exponentially data weighted least squares algorithm for the estimate of the channel impulse response vector $\hat{h}_k$ may be obtained by minimizing the optimization index $\theta_{1,k}$ with respect to $\bar{h}$ where $$J_{1,k} = \sum_{m=0}^{k} \lambda^{k-m}|z_m - \bar{h}^H \bar{x}_m|^2; \qquad (33)$$

$$\bar{x}_m = [a_{m+M_1}, \ldots a_m, \ldots a_{m+M_1}]^T;$$

$$k = 0, 1, \ldots$$

In (33) the exponential data weighting coefficient $\lambda$, is a constant taking values in the interval $0<\lambda\leq 1$. The gradient of $\theta_{1,k}$ with respect to $\bar{h}$ is evaluated as $$\frac{\partial J_{1,k}}{\partial \bar{h}} = \sum_{m=0}^{k} \lambda^{k-m} \bar{x}_m z_m - \sum_{m=0}^{k} \lambda^{k-m} \bar{h}^H \bar{x}_m \bar{x}_m^H \qquad (34)$$

The exponential data weighted least squares (LS) algorithm is obtained by setting the gradient in (34) equal to zero and is given by $$\hat{\bar{h}}_k = P_k \left( \sum_{m=0}^{k} \lambda^{k-m} \bar{x}_m z_m^* \right) \qquad (35a)$$

$$P_k = \left[ P_{k-1}^{-1} + \sum_{m=0}^{k} \lambda^{k-m} \bar{x}_m \bar{x}_m^H \right]^{-1} \qquad (35b)$$

In (35b) $P_{-1}^{-1}=\epsilon I$ for some small positive scalar $\epsilon$ and with I denoting the identity matrix. Alternatively, the use of the matrix inversion lemma yields the following recursive least squares (RLS) algorithm $$\hat{\bar{h}}_k = \hat{\bar{h}}_{k-1} + P_k \bar{x}_k e_k^*; e_k = (z_k - \hat{z}_k); \hat{z}_k = \hat{\bar{h}}_{k-1}^H \bar{x}_k; \qquad (36a)$$

$$P_k = \lambda^{-1}[P_{k-1} - P_{k-1}\bar{x}_k(\lambda+\bar{x}_k^H P_{k-1}\bar{x}_k)^{-1}\bar{x}_k^H P_{k-1}]; \\ k=0,1,\ldots \qquad (36b)$$

In (36) the estimate $\hat{\bar{h}}_{-1}$ may be set to some a-priori estimate, for example, $\hat{\bar{h}}_{-1}=[0 \ldots 010 \ldots 0]^T$ with $P_{-1}$ selected as in (35b). In one of the preferred embodiment of the invention the RLS algorithm (36) is used for the estimation of $\bar{h}$.

In an alternative embodiment of the invention, an exponentially data weighted Kaman filter algorithm may be used. The Kaman filter minimizes the conditional error variance in the estimate of the channel impulse response given by $E[\|\bar{h}-\hat{\bar{h}}\|^2/z_0, z_1, \ldots, z_k]$, where E denotes the expected value operator. The exponentially data weighted Kaman filter algorithm is given by $$\hat{\bar{h}}_k = \hat{\bar{h}}_{k-1} + K_k(z_k - \hat{\bar{h}}_{k-1}^H \bar{x}_k)^* \qquad (37a)$$

$$K_k = P_{k-1}\bar{x}_k(\bar{x}_k^H P_{k-1}\bar{x}_k + \lambda r_k)^{-1} \qquad (37b)$$

$$P_k = \lambda^{-1}[P_{k-1} - P_{k-1}\bar{x}_k(\bar{x}_k^H P_{k-1}\bar{x}_k + \lambda r_k)^{-1}\bar{x}_k^H P_{k-1}] \qquad (37c)$$

The equations (37a)-(37c) may be initialized at k=0 with similar initialization as for the RLS algorithm of (36). Equations (37a) and (37b) may be combined into the following equivalent form $$\hat{\bar{h}}_k = \hat{\bar{h}}_{k-1} + P_k r_k^{-1} \bar{x}_k (z_k - \hat{\bar{h}}_{k-1}^H \bar{x}_k)^* \qquad (37d)$$

In equations (37b)-(37d), $r_k r_k = 2\sigma^2$ denotes the variance of the noise $n_k$ in (32a) equal to the noise $n_k^c$ normalized by the modified channel gain $G_k^m$.

In another embodiment of the invention, one of the class of quantized state algorithms may be used for the estimation of $\bar{h}$. The quantized state algorithms possess advantages in terms of the computational requirements. For example, the quantized state QS1 algorithm is given by $$\hat{\bar{h}}_k = \hat{\bar{h}}_{k-1} + P_k^q \bar{x}_k^q (z_k - \hat{\bar{h}}_{k-1}^H \bar{x}_k)^* \qquad (38a)$$

$$P_k^q = \lambda^{-1}[P_{k-1}^q - P_{k-1}^q \bar{x}_k^q (\bar{x}_k^H P_{k-1}^q \bar{x}_k^q + \lambda)^{-1} \\ \bar{x}_k^H P_{k-1}^q]; k=0,1,\ldots \qquad (38b)$$

where in (38) $\bar{x}^q$ is obtained from $\bar{x}$ by replacing both the real and imaginary components of each component of $\bar{x}$ by their respective signs taking values +1 or −1. Multiplication of $\bar{x}^q$ by the matrix $P^q$ in (38b) requires only additions instead of both additions and multiplications, thus significantly reducing the computational requirements.

Referring to FIG. 1, in the blind mode equalizer system 80, the channel input $a_k$ appearing in the state vector $\bar{x}_k$ in (34)-(38) is replaced by the detected symbol $a_k^d$. The state vector $\bar{x}_k$ in the equations (34)-(38) is replaced by its estimate given by $$\hat{\bar{x}}_k = [a_{k+M_1}^d, \ldots, a_k^d, \ldots, a_{k-M_1}^d]^T \qquad (39)$$

The resulting modified RLS algorithm is given by $$\hat{\bar{h}}_k = \hat{\bar{h}}_{k-1} + P_k \hat{\bar{x}}_k (z_k - \hat{\bar{h}}_{k-1}^H \hat{\bar{x}}_k)^* \qquad (40a)$$

$$P_k = \lambda^{-1}[P^{k-1} - P_{k-1}\hat{\bar{x}}_k(\lambda+\hat{\bar{x}}_k^H P_{k-1}\hat{\bar{x}}_k)^{-1}\hat{\bar{x}}_k^H P_{k-1}]; \\ k=0,1,\ldots \qquad (40b)$$

In one of the various preferred embodiments of the invention, the modified RLS algorithm (40a)-(40b) is used for the estimation of the channel impulse response $\bar{h}$. In various alternative embodiments the Kaman filter algorithms in (37) or the quantized state algorithm in (38) with the state vector $\bar{x}_k$ replaced with the estimate $\hat{\bar{x}}_k$ may be used for the estimation of the channel impulse response $\bar{h}$.

Figure 7:
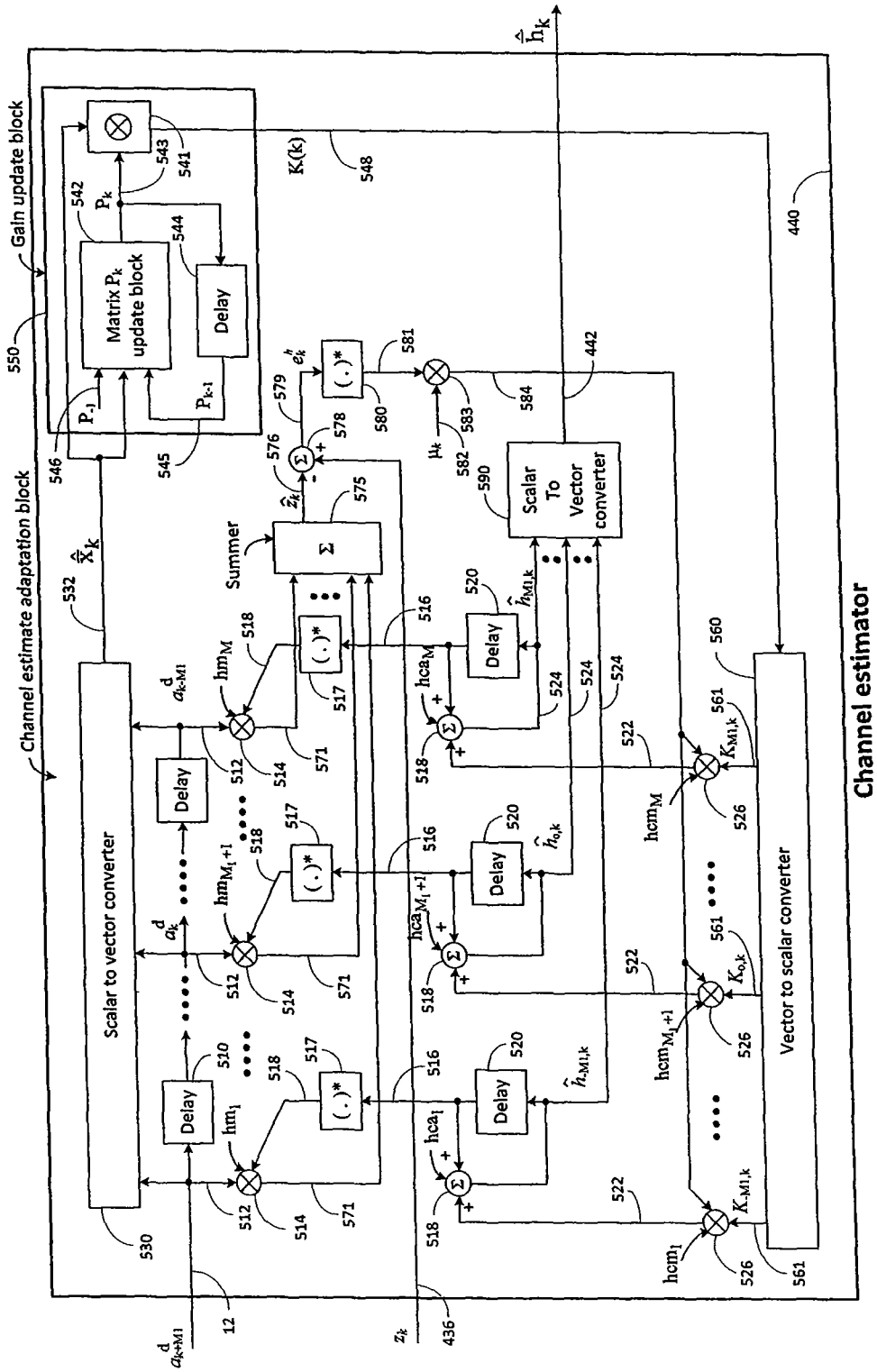
FIG. 7 shows a block diagram of one embodiment of channel estimator.

FIG. 7 shows the block diagram of the channel estimator block 440 of FIG. 6. Referring to FIG. 7, the detected symbol 12 $a_{k+M_1}^d$ from the output of the decision device 11 is input to a cascade of $2M_1$ delay elements 510 generating the $2M_1$ delayed versions 512 $a_{k+M_1-1}^d, \ldots, a_{k-M_1}^d$ at the outputs of the delay elements. The detected symbol $a_{k+M_1}$ and its $2M_1$ delayed versions 512 $a_{k+M_1-1}, \ldots, a_{k-M_1}$ are input to the $M=2M_1+1$ hm multipliers 514 $hm_1, \ldots, hm_M$. The M hm multipliers 514 are inputted with the conjugates 518 of the M components 516 $\hat{h}_{-M_1,k-1}, \ldots, \hat{h}_{0,k-1}, \ldots, \hat{h}_{M_1,k-1}$ of the channel impulse response vector $\hat{\bar{h}}_{k-1}$ provided by the conjugate blocks 517. The M hm multipliers 514 multiply the detected symbols $a_{k+M_1}^d, \ldots, a_{k-M_1}^d$ by the respective components $\hat{h}_{-M_1,k-1}, \ldots, \hat{h}_{0,k-1}, \ldots, \hat{h}_{M_1,k-1}$ of the channel impulse response vector $\hat{\bar{h}}_{k-1}$. The outputs of the M hm multipliers 514 are inputted to the summer 575 that provides the sum of the inputs representing the predicted value 576 $\hat{z}_k$ of the normalized channel output $z_k$ at the summer output 576. The normalized channel output 436 $z_k$ and the predicted value 576 $\hat{z}_k$ are input to the adder 578 that provides the prediction error signal 579 $e_k^h = z_k - \hat{z}_k$ at the output of the adder. The error signal 579 $e_k^h$ is inputted to the conjugate block 580, the output of 581 of the conjugate block 580 is multiplied by a positive scalar $\mu_h$ in the multiplier 583. The output 584 of the multiplier 583 is input to the M weight correction multipliers 526 $hcm_1, \ldots, hcm_N$ wherein $e_k^{h*}$ multiplies the M components $K_{-M_1,k}, \ldots, K_{0,k}, \ldots, K_{M_1,k}$ of the gain vector 548 $K_k$ provided by the vector to scalar converter 560. The outputs of the $hcm_1, \ldots, hcm_M$ multipliers 526 are input to the N hca adders 518 $hca_1, \ldots, hca_M$.

Referring to FIG. 7, the M hca adders 518 are inputted with the M components $\hat{h}_{-M_1,k-1}, \ldots, \hat{h}_{0,k-1}, \ldots, \hat{h}_{M_1,k-1}$ of the channel impulse response vector $\hat{h}_{k-1}$ at the outputs of the M delay elements 520 and with the outputs 522 of the M hcm multipliers 526. The hca adders 518 add the M channel impulse response vector components $\hat{h}_{-M_1,k-1}, \ldots, \hat{h}_{0,k-1}, \hat{h}_{M_1,k-1}$ to the corresponding M outputs 522 of the $hcm_1, \ldots, hcm_M$ multipliers 526 providing the updated version of the M components of the channel impulse response vector $\hat{h}_k$ at the outputs of the M hca adders 518. The outputs 524 of the M hca adders 518 are connected to the inputs of the M delay elements 520 with the outputs of the delay elements connected to the M conjugate blocks 517. The estimate of the channel impulse response vector may be initialized at k=−1 by the vector $\delta_{M_1,M_1} = [0 \ldots 010 \ldots 0]^T$.

Referring to FIG. 7, the detected symbol 12 $a_{k+M_1}^d$ and its various delayed versions 512 $a_{k+M_1-1}^d, \ldots, a_{k-M_1}^d$ are input to the scalar to vector converter 530 providing the channel state vector 532 $\bar{x}_k = [a_{k+M_1}^d, \ldots, a_k^d \ldots, a_{k-M_1}^d]^T$ at the output of the scalar to vector converter 530. Referring to FIG. 7, the channel state vector 530 $\bar{x}_k$ is input to the gain update block 550 that provides the gain vector 548 K(k) to the vector to scalar converter 560. Referring to FIG. 7, the channel state vector 530 $\bar{x}_k$ and the matrix 545 $P_{k-1}$ are input to the matrix $P_k$ update block 542 that evaluates the updated matrix 543 $P_k$ according to equation (36b) and provides the updated matrix 543 $P_k$ to the delay 544. The output 545 of the delay 544 equal to $P_{k-1}$ is inputted to the matrix $P_k$ update block 542. The matrix $P_k$ update block 542 is initialized with input 546 $P_{-1} = \epsilon I_M$, where $\epsilon$ is some positive number and $I_M$ is the M×M identity matrix. The matrix 543 $P_k$ and the channel state vector 532 $\bar{x}_k$ are input to the matrix multiplier 541 that provides the gain vector 548 $K_k = P_k \bar{x}_k$ at the output. The gain vector 548 $K_k$ is inputted to the vector to scalar converter 560.

With the channel impulse response vector $\bar{h}^T = [h_{-M_1} \ldots h_{-1} h_0 h_1 \ldots h_{M_1}]$ of length $M = 2M_1+1$, and $\bar{w}^T = [w_{-N_1}, \ldots, w_{-1}, w_0, w_1, \ldots, w_{N_1}]$ of length $N = 2N_1+1$, the composite system comprised of the cascade of the channel and the equalizer has an impulse response $\bar{g}^T$ of length $K = N+M-1$ with $K = 2K_1+1$, $K_1 = N_1+M_1-1$ $$\bar{g} = [g_{-K_1} \ldots g_{-1} g_0 g_1 \ldots g_{K_1}]^T \quad (41)$$

The elements of the vector $\bar{g}$ are obtained by the discrete convolution of the sequences $\{h_{-M_1}, \ldots, h_{-1}, h_0, h_1, \ldots, h_{M_1}\}$ and $\{w_{-N_1}, \ldots, w_{-1}, w_0, w_1, \ldots, w_{N_1}\}$. For simplicity of notations, the sequences are also represented as vectors $\bar{h}$ and $\bar{w}$ respectively with the similar notations for the other sequences. The convolution operation can also be expressed in the following matrix vector form $$\bar{g} = H\bar{w} \quad (42)$$

With $N_1 > M_1$ as is usually the case, the K×N matrix H in (42) may be written in the following partitioned form $$H = \begin{bmatrix} H_1 & & O_{M \times (N-M)} \\ & H_3 & \\ O_{M \times (N-M)} & & H_2 \end{bmatrix} \quad (43)$$

In (43) $O_{M \times (N-M)}$ denotes M×(N−M) matrix with all its elements equal to zero and $$H_1 = \begin{bmatrix} h_{-M_1} & 0 & 0 & \ldots & 0 \\ h_{-M_1+1} & h_{-M_1} & 0 & \ldots & 0 \\ & \ldots & \ldots & \ldots & \\ h_{M_1} & \ldots & h_0 & \ldots & h_{-M_1} \end{bmatrix} \quad (44a)$$

$$H_2 = \begin{bmatrix} h_{M_1} & \ldots & \ldots & h_0 & \ldots & h_{-M_1} \\ 0 & h_{M_1} & \ldots & h_0 & \ldots & h_{-M_1+1} \\ & & \ldots & \ldots & \ldots & \\ 0 & 0 & \ldots & \ldots & 0 & h_{M_1} \end{bmatrix} \quad (44b)$$

$$H_3 = \begin{bmatrix} 0 & h_{M_1} & \ldots & h_0 & \ldots & h_{-M_1} & \underbrace{N-M-1}_{00 \ldots 0} \\ 0 & 0 & h_{M_1} & \ldots & h_0 & \ldots & h_{-M_1} & 0 \ldots 0 \\ & & & \ldots & \ldots & & & \\ \underbrace{00 \ldots 0}_{N-M-1} & h_{M_1} & \ldots & h_0 & \ldots & h_{-M_1} & & 0 \end{bmatrix} \quad (44c)$$

$$H = \begin{bmatrix} h_{-M_1} & 0 & \ldots & \ldots & \ldots & \ldots & 0 \\ h_{-M_1+1} & h_{-M_1} & 0 & \ldots & \ldots & \ldots & 0 \\ & & \ldots & \ldots & \ldots & \ldots & \\ \underbrace{00 \ldots 0}_{N_1-M_1} & h_{M_1} & \ldots & h_0 & \ldots & h_{M_1-1} & \underbrace{00 \ldots 0}_{N_1-M_1} \\ & & \ldots & \ldots & \ldots & \ldots & \\ 0 & 0 & \ldots & \ldots & 0 & h_{M_1} & h_{M_1-1} \\ 0 & 0 & \ldots & \ldots & 0 & 0 & h_{M_1} \end{bmatrix} \quad (44d)$$

The matrix H in (44d) can be appropriately modified for the case of $N_1 < M_1$. For the case of known channel impulse response $\bar{h}$, the equalizer parameter vector $\bar{w}$ can be selected so that the impulse response of the composite system $\bar{g}^T$ given by (42) is equal to $\bar{\delta}_{K_1,K_1'}$ which is defined for any pair of positive integers $K_1, K_1'$ as $$\bar{\delta}_{K_1,K_1'}^T = \begin{bmatrix} \underbrace{00 \ldots 0}_{K_1} & 1 & \underbrace{00 \ldots 0}_{K_1'} \end{bmatrix} \quad (45)$$

For the case of non singular matrix H, this can be achieved by the selection of $\bar{w}$ by $$\bar{w} = H^{-1}\bar{\delta}; \bar{\delta} = \bar{\delta}_{K_1,K_1'} \quad (46)$$

However, for the more general case the equalizer parameter vector $\bar{w}$ may be selected so as to minimize some measure of the difference between $\bar{g}$ and the unit vector $\bar{\delta}$. Thus the objective function $J_{L_i}$ to be minimized is given by $$J_{L_i} = \|H\bar{w} - \bar{\delta}\|_{L_i} \quad (47)$$

where $\|\ \|_{L_i}$ denotes the $L_i$ norm. For example, the $L_1$ norm is given by $$\sum_{j=-K_1}^{K_1} |(g_j - \delta_j)|$$

with $\delta_j$ denoting the jth component of the vector $\bar{\delta}$. The $L_\infty$ norm is given by $$\max_j |g_j - \delta_j|.$$

Computationally the Euclidean norm $L_2$ is most convenient and is given by $$= J_2 \quad (48)$$

$$= J_{L_2}$$

$$= \sum_{j=-K_1}^{K_1} |(H\bar{w} - \bar{\delta})_j|^2$$

$$= \sum_{j=-K_1}^{K_1} |(g_j - \delta_j)|^2$$

Equivalently the optimization function in (48) may be expressed in the following equivalent form $$J_2 = (H\bar{w} - \bar{\delta})^H (H\bar{w} - \bar{\delta}) \quad (49)$$

The gradient of $\theta_2$ with respect to the equalizer parameter vector $\bar{w}$ is evaluated as $$\frac{\partial J_2}{\partial \bar{w}} = H^T (H\bar{w} - \bar{\delta})^* \quad (50)$$

An iterative algorithm to minimize the objective function $\theta_2$ is given by $$\bar{w}_{k+1} = \bar{w}_k - \mu H^T (\bar{g}_k - \bar{\delta})^*; \bar{g}_k = H\bar{w}_k; k=0,1,\ldots \quad (51)$$

with an appropriate initialization for $\bar{w}_0$. As an example, $\bar{w}_0$ may be selected equal to the unit vector $\bar{\delta}_{N_1,N_1}$ of length $(2N_1+1)$.

More generally the optimization function may be selected as $$J_2 = \kappa_1 J_{L_2} + \kappa_2 J_{L_4} = \kappa_1 \sum_{j=-K_1}^{K_1} |(g_j - \delta_j)|^2 + \kappa_2 \sum_{j=-K_1}^{K_1} |(g_j - \delta_j)|^4 \quad (52)$$

In (52) $\kappa_1$ and $\kappa_2$ are some positive constants determining the relative weights assigned to $J_{L_2}$ and $J_{L_4}$ respectively. Differentiation of $J_{L_4}$ with respect to the equalizer parameter $w_i$ yields $$\frac{\partial J_{L_4}}{\partial w_i} = 2 \sum_{j=-K_1}^{K_1} |(g_j - \delta_j)|^2 (g_j - \delta_j)^* \frac{\partial g_j}{\partial w_i} \quad (53)$$

$$= 2 \sum_{j=-K_1}^{K_1} H_{ji} |(g_j - \delta_j)|^2 (g_j - \delta_j)^*$$

From (53), the gradient vector of $J_{L_4}$ with respect to the equalizer parameter vector $\bar{w}$ is given by $$\frac{\partial J_{L_4}}{\partial \bar{w}} = 2 H^T \left[ |(\bar{g} - \bar{\delta})|^2 \Box (\bar{g} - \bar{\delta})^* \right] \equiv 2 H^T \bar{g}^c \quad (54)$$

In (54) the $n^{th}$ power of any vector $\bar{x}$ for any real n is defined as taking the component wise $n^{th}$ power of the elements of the vector $\bar{x}$, $|\bar{x}|$ denotes component wise absolute value and $\Box$ denotes component wise multiplication, and thus the result of vector operations in (54) is a vector of the same length as that of $\bar{x}$ for any vector $\bar{x}$. From (54) a more general version of the iterative algorithm to minimize the objective function in (52) is given by $$\bar{w}_{k+1} = \bar{w}_k - \mu H^T [(\bar{g}_k - \bar{\delta})^* + \kappa |(\bar{g}_k - \bar{\delta})|^2 \Box (\bar{g}_k - \bar{\delta})]^*; \bar{g}_k = H\bar{w}_k \quad (55a)$$

$$\bar{w}_{k+1} = \bar{w}_k - \mu H^T \{[\bar{1} + \kappa |(\bar{g}_k - \bar{\delta})|^2] \Box (\bar{g}_k - \bar{\delta})^*\}; \bar{g}_k = H\bar{w}_k; k=0,1,\ldots \quad (55b)$$

In (55b) $\bar{1}$ denotes a vector with all its elements equal to 1 and its length equal to that of $\bar{g}_k$. In (55a,b) $\mu$ and $\kappa$ are some positive constants that are sufficiently small to ensure the convergence of the algorithm in (55).

In one of the various embodiments of the BMAEHS equalizer of the invention, the second correction signal vector $\bar{w}_k^{c2}$ is selected as $$\bar{w}_k^{c2} = H^T \{[\bar{1} + \kappa |(\bar{g}_k - \bar{\delta})^2] \Box (\bar{g}_k - \bar{\delta})^*\}; \bar{g}_k = H\bar{w}_k; k=0,1,\ldots \quad (56)$$

In (56) $\hat{H}_k$ is given by (44d) with $h_i$ replaced by its estimate $\hat{h}_{i,k}$ for $i=M_1,\ldots,0,\ldots,M_1$. In various other embodiments of the invention, the second correction signal vector $\bar{w}_k^{c2}$ may be obtained from the optimization of the $\theta_2$ in (52) and given by $$\bar{w}_k^{c2} = \hat{H}_k^T [(\bar{g}_k - \bar{\delta}) + \kappa |(\bar{g}_k - \bar{\delta})|^2 \Box (\bar{g}_k - \bar{\delta})^*]; \bar{g}_k = \hat{H}_k \bar{w}_k; k=0,1,\ldots \quad (57)$$

Figure 8:
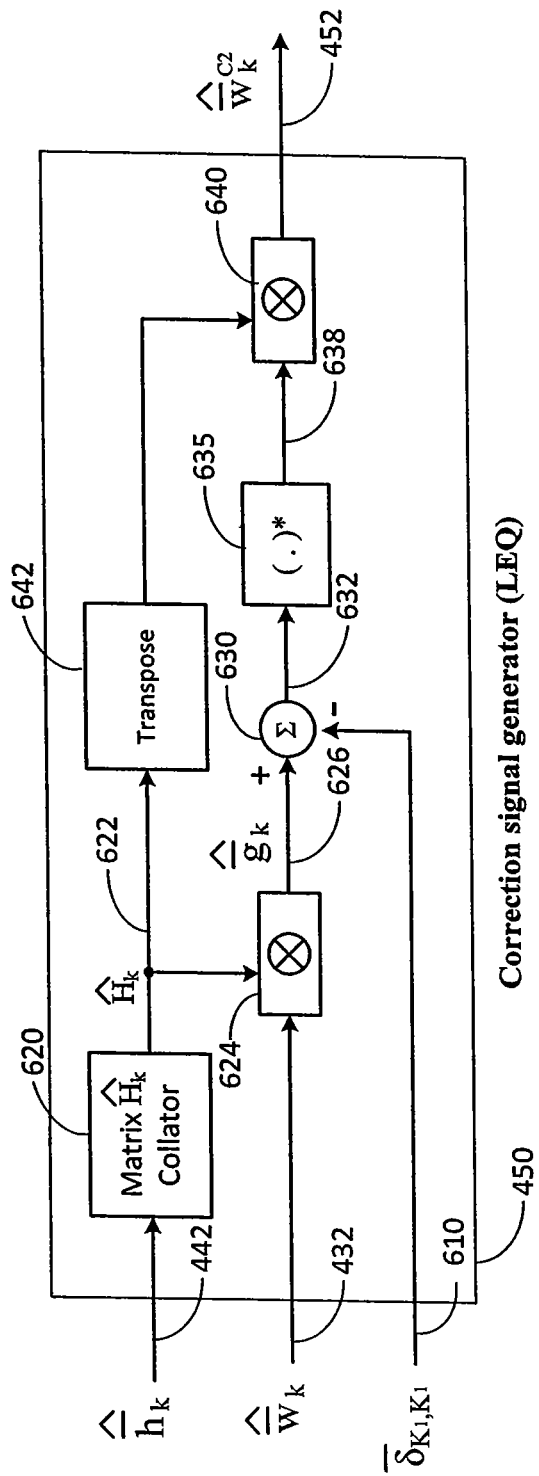
FIG. 8 shows a block diagram of one embodiment of correction signal generator for linear equalizer.

FIG. 8 shows the block diagram of the correction signal generator 450 of FIG. 6 that generates the second correction signal vector 452 $\bar{w}_k^2$ according to (51). Referring to FIG. 8, the estimate of the channel impulse response vector 442 $\hat{h}_k$ is input to the correction signal generator 450. As shown in the FIG. 8, the channel impulse response vector 442 $\hat{h}_k$ is input to the matrix $\hat{H}_k$ collator 620 that forms matrix 622 $\hat{H}_k$ according to equation (44) with $h_i$ replaced by $\hat{h}_i$ for $i=M_1,\ldots 0 \ldots, M_1$. The matrix 622 $\hat{H}_k$ and the equalizer parameter vector 432 $\bar{w}_k$ are input to the matrix multiplier 624 that provides the product $\bar{g}_k = \hat{H}_k \bar{w}_k$ at the matrix multiplier output 626. The product 626 $\bar{g}_k$ and the vector 610 $\bar{\delta}_{K_1,K_1} = [0\ldots010\ldots0]$ are inputted to the adder 630 that provides the difference 632 $(\bar{g}_k - \bar{\delta}_{K_1,K_1})$ to the conjugate block 635. The output 638 of the conjugate block 635 is inputted to the matrix multiplier 640. The matrix 622 $\hat{H}_k$ is input to the transpose block 642 that provides the matrix 644 $\hat{H}_k^T$ at the output. The matrix 644 $\hat{H}_k^T$ is inputted to the matrix multiplier 640 that multiplies the matrix 644 $\hat{H}_k^T$ by 638 $(\bar{g}_k - \bar{\delta}_{K_1,K_1})$ generating the second correction vector 452 $\bar{w}_k^{c2}$ at the matrix multiplier output.

From the definition of the matrix H in (44), the vector $\bar{g}_k$ in (51) and (55) can also be obtained by the convolution of the channel impulse response $\bar{h}$ with the equalizer parameter vector $\bar{w}_k$. Similarly the pre multiplication by $H^T$ in (51) can be evaluated by the convolution of $\bar{h}^I$ with $(\bar{g}_k - \bar{\delta})$ and discarding (2M−2) elements from the resulting vector of size K+M−1=N+2M−2, more specifically (M−1) elements are discarded from each end of the resulting vector, where $\bar{h}^I$ is the vector obtained by reversing the order of the elements in $\bar{h}$, i.e., $$\bar{h}^I = [h_{M_1} \ldots h_1 h_0 h_{-1} \ldots h_{-M_1}]^T \quad (58)$$

An equivalent form for the update of the equalizer parameter vector $\bar{w}_k$ is given by $$\bar{w}_{k+1} = \bar{w}_k - \mu Tr\{\bar{h}^I \otimes [\bar{h} \otimes \bar{w}_k - \bar{\delta}]^*\} \quad (59a)$$

$$\bar{w}_{k+1} = \bar{w}_k - \mu Tr\{\bar{h}^I \otimes \bar{h} \otimes \bar{w}_k\}^* + \mu \bar{h}^{Ie}; k=0,1,\ldots \quad (59b)$$

In (59) the operator Tr denotes the truncation of the vector to length N by deleting (M−1) elements from each side of the vector appearing in its argument. In (59b) $\bar{h}^{Ie}$ is the vector obtained from $\bar{h}^I$ by appending $(N_1 - M_1)$ zeros to each side of $\bar{h}^I$ with $\bar{h}^{Ie} = [0 \ldots 0 \bar{h}^{IT} 0 \ldots 0]^T$. Similarly the convolution version of the algorithm in (55) is given by $$\bar{w}_{k+1} = \bar{w}_k - \mu Tr\{\bar{h}^I \otimes [(\bar{g}_k - \bar{\delta})^* + \kappa \bar{g}^c]\} \quad (60a)$$

$$\bar{g}_k = \bar{h} \otimes \bar{w}_k; \bar{g}_k^c = |(\bar{g}_k - \bar{\delta})|^2 \Box (\bar{g}_k - \bar{\delta})^*; k=0,1,\ldots \quad (60b)$$

In various alternative embodiments of the invention, second correction signal vector $\overline{w}_k^{c2}$ may be generated by (61) as $$\overline{w}_k^{c2} = \text{Tr}\{\hat{\overline{h}}_k^I \otimes [(\overline{g}_k - \delta)^* + \kappa \overline{g}^c]\}; \tag{61a}$$

$$\overline{g}_k = \hat{\overline{h}}_k \otimes \overline{w}_k; \overline{g}^c = |(\overline{g}_k - \delta)|^2 \Box (\overline{g}_k - \delta)^*; k = 0, 1, \ldots \tag{61b}$$

In (61a) $\hat{\overline{h}}_k^I$ is obtained from (58) after replacing $h_i$ with $\hat{h}_{i,k}$ for $i = -M_1, \ldots, 0, M_1$.

In order to minimize the impact of the equalizer on the input noise variance $2\sigma^2$, a term proportional to $\|\overline{w}\|^2$ may be added to the optimization function in (52) with the resulting objective function given by $$J_2 = \kappa_1 \sum_{j=-K_1}^{K_1} |(g_j - \delta_j)|^2 + \kappa_2 \sum_{j=-K_1}^{K_1} |(g_j - \delta_j)|^4 + \kappa_3 2\sigma^2 \|\overline{w}\|^2 \tag{62}$$

In (62) the product $2\sigma^2 \|\overline{w}\|^2$ is the noise variance at the equalizer output and $\kappa_3$ determines the relative weighting given to power of the residual inter symbol interference (ISI) $I_s$. The ISI power is proportional to the summation in the first term on the right hand side of (61) and is given by $$\sigma_I^2 = E[|I_s|^2] = E[|a_k|^2] \sum_{j=-K_1}^{K_1} |(g_j - \delta_j)|^2 \tag{63}$$

The power of the total distortion at the output of the equalizer is given by $$\sigma_t^2 = E[|I_s|^2] + 2\sigma^2 \|\overline{w}\|^2 \tag{64}$$

$$= E[|a_k|^2] \sum_{j=-K_1}^{K_1} |(g_j - \delta_j)|^2 + 2\sigma^2 \|\overline{w}\|^2$$

and to minimize the total distortion $\sigma_t^2$, the constants $\kappa_1$ and $\kappa_3$ are related by $\kappa_1 = E[|a_k|^2]\kappa_3$. With the modified optimization function in (62), the iterative algorithm in (60) is modified to $$\overline{w}_{k+1} = \overline{w}_k - \mu \text{Tr}\{\hat{\overline{h}}^I \otimes [(\overline{g}_k - \delta)^* + \kappa \overline{g}_k^c]\} - \mu_0 \overline{w}_k^* \tag{65a}$$

$$\overline{g}_k = \hat{\overline{h}} \otimes \overline{w}_k; \overline{g}^c = |(\overline{g}_k - \delta)|^2 \Box (\overline{g}_k - \delta)^*; k = 0, 1, \ldots \tag{65b}$$

In (65) the parameter $\mu_0$ with $0 \leq \mu_0 < 1$, is determined by the relative weight $\kappa_3$. In various alternative embodiments of the invention, the second correction signal vector $\overline{w}_k^{c2}$ may be generated by (66) as $$\overline{w}_k^{c2} = \text{Tr}\{\hat{\overline{h}}_k^I \otimes [(\overline{g}_k - \delta)^* + \kappa \overline{g}_g^c]\} + (\mu_0/\mu)\overline{w}_k^* \tag{66}$$

In (66) $\overline{g}_k$ and $\overline{g}_k^c$ are given by (61b).

The convolution operation in the iterative algorithms (59), (60) and (65) can be performed equivalently in terms of the discrete Fourier transform (DFT) or the fast Fourier transform (FFT) operations. The FFT operation results in a circular convolution, hence for proper convolution operation the individual vectors to be convolved are zero padded with an appropriate number of zeros. Also the FFT of $\overline{h}^I$ can be related to the FFT of $\overline{h}$ if a zero is appended at the beginning of the vector $\overline{h}$. Therefore, a vector $\overline{h}^e$ of length (N+M+2) is defined by $$\overline{h}^e = \left[ 0 h_{-M_1} \ldots h_{-1} h_0 h_1 \ldots h_{M_1} \underbrace{00 \ldots 0}_{N+1} \right]^T \tag{67}$$

Similarly a vector $\overline{w}_k^e$ of length (N+M+2) is defined as $$\hat{\overline{w}}_k^e = \left[ \hat{w}_{-N_1} \ldots \hat{w}_{-1} \hat{w}_0 \hat{w}_1 \ldots \hat{w}_{N_1} \underbrace{00 \ldots 0}_{M+2} \right]^T \tag{68}$$

For the sake of notational simplification, the suffix k denoting the time index has been dropped from the elements of the vector $\overline{w}_k^e$. Let $$\overline{h}^{eF} = F(\overline{h}^e); \hat{\overline{w}}_k^{eF} = F(\hat{\overline{w}}_k^e) \tag{69}$$

where in (69), the operator $\Phi$ denotes the (N+M+2) point discrete Fourier transform of its argument. For any vector $\overline{\xi}$ of size N, its DFT is given by $$\overline{\xi}^F = \Gamma_N \overline{\xi} \tag{70a}$$

Where $\Gamma_N$ is the N×N matrix given by $$\Gamma_N = \begin{bmatrix} \gamma_{0,0} & \gamma_{0,1} & \cdots & \gamma_{0,N-1} \\ \gamma_{1,0} & \gamma_{1,1} & \cdots & \gamma_{1,N-1} \\ \cdots & \cdots & \cdots & \cdots \\ \gamma_{N-1,0} & \gamma_{N-1,1} & \cdots & \gamma_{N-1,N-1} \end{bmatrix} \tag{70b}$$

$$\gamma_{m,n} = \exp[-j2\pi mn/N]; \tag{70c}$$
$$j = \sqrt{-1};$$
$$m, n = 0, 1, \ldots, N-1$$

The discrete Fourier transform in (70) can be implemented by the fast Fourier transform algorithm resulting in significant reduction in the number of required arithmetic operations. Defining $$\hat{\overline{g}}_k^{eF} = \overline{h}^{eF} \Box \hat{\overline{w}}_k^{eF} \tag{71}$$

with $\Box$ denoting the component wise multiplication, then the inverse discrete Fourier transform (IDFT) of $\hat{\overline{g}}_k^{eF}$ is given by $$F^{-1}(\hat{\overline{g}}_k^{eF}) = \Gamma_{(K+3)}^* \hat{\overline{g}}_k^{eF} \tag{72}$$

$$= [0 \hat{g}_{-K_1} \ldots \hat{g}_{-1} \hat{g}_0 \hat{g}_1 \ldots \hat{g}_{K_1} 00]^T$$

$$= [0 \hat{\overline{g}}_k 00]^T$$

The inverse DFT of $(\overline{h}^{eF})^*$, where * denotes complex conjugate, is given by $$F^{-1}[(\overline{h}^{eF})^*] = \left[ \underbrace{00 \ldots 0}_{(N+2)} h_{M_1} \ldots h_1 h_0 h_{-1} \ldots h_{-M_1} \right]^H \tag{73}$$

$$= \left[ \underbrace{00 \ldots 0}_{(N+2)} (\overline{h}^I)^H \right]^T$$

From (71)-(73) the IDFT of the product of $\bar{g}_k^{eF}$ and $(\bar{h}^{eF})$ is $$\hat{w}^{pe} \equiv \left[F^{-1}\left\{\bar{h}^{eF} \square \hat{\bar{w}}_k^{eF} \square (\bar{h}^{eF})^*\right\}\right]^* \quad (74)$$

$$= \left[\hat{w}_{-N_1}^p \ldots \hat{w}_{-1}^p \hat{w}_0^p \hat{w}_1^p \ldots \hat{w}_{N_1}^p \underbrace{** \ldots *}_{M+2}\right]^T$$

In (74) the symbol * on the right hand side of the equation denotes the elements that are irrelevant and the remaining elements are the same as the ones obtained by the conjugate of the convolution of $\bar{h}$, $\bar{w}_k$, and $\bar{h}'$ and deleting (M−1) elements from each side of the resulting vector, that is, $$\mathrm{Tr}_1(\bar{h} \otimes \bar{w}_k \otimes \bar{h}')^* = [\hat{w}_{-N_1}^p \ldots \hat{w}_0^p \ldots \hat{w}_{N_1}^p]^T \quad (75)$$

The truncation operation $\mathrm{Tr}_i$ comprised of deleting (M−1) elements from each side of the vector in its argument on the left hand side of (75) is equivalent to deleting the last (M+2) elements from the vector on the right hand side of (74). From (74)-(75), a parameter update algorithm equivalent to (65a) for the case of $\kappa = 0$ is given by $$\hat{\bar{w}}_{k+1} = \hat{\bar{w}}_k - \mu \mathrm{Tr}_2\left\{F^{-1}\left[\hat{\bar{w}}_k^{eF} \square |\bar{h}^{eF}|^2\right]\right\}^* + \mu \bar{h}^{le} - \mu_0 \hat{\bar{w}}_k^* \quad (76)$$

where $$\bar{h}^{le} = \left[\underbrace{00 \ldots 0}_{N_1-M_1} h_{M_1} \ldots h_1 h_0 h_{-1} \ldots h_{-M_1} \underbrace{00 \ldots 0}_{N_1-M_1}\right]^T \quad (77)$$

In (76) the truncation operation $\mathrm{Tr}_2$ is comprised of discarding the last (M+2) elements from the vector in its argument and in (77) $\bar{h}^{le}$ is obtained by appending ($N_1 - M_1$) zeros on both sides of $\bar{h}$. The parameter update in (76) requires 2 FFT and 1 IFFT operations.

For the more general case of $\kappa \neq 0$ the parameter update algorithm is given by $$\hat{\bar{w}}_{k+1} = \hat{\bar{w}}_k - \mu \mathrm{Tr}_2\left\{F^{-1}\left[(\bar{h}^{eF})^* \square \left[\hat{\bar{g}}_k^{eF} - \bar{\delta}^F + \kappa \hat{\bar{g}}_k^{cF}\right]\right]\right\}^* - \mu_0 \hat{\bar{w}}_k^* \quad (78a)$$

where $\hat{\bar{g}}_k^{eF}$ is given by (71) and $\bar{\delta}^F$ is the Fourier transform of $\bar{\delta}_{K_1+1,K_1+3}$ given by $$\bar{\delta}_{K_1+1,K_1+3} = \left[\underbrace{00 \ldots 0}_{K_1+1} 1 \underbrace{00 \ldots 0}_{K_1+3}\right]^T \quad (78b)$$

and is equal to the $(K_1+2)^{th}$ row of the matrix $\Gamma_K$ defined by (70b) with N replaced by (K+3). In (78a) $\hat{\bar{g}}_k^{cF}$ denotes the FFT of $[0\hat{\bar{g}}_k^{cT} 00]^H$. In the FFT based implementation, the second correction signal vector $\bar{w}_k^{c2}$ may be given by $$\hat{\bar{w}}_k^{c2} = \mathrm{Tr}_2\left\{F^{-1}\left[\hat{\bar{w}}^{eF} \square |\hat{\bar{h}}^{eF}|^2\right]\right\}^* - \hat{\bar{h}}^{le} + (\mu_0/\mu)\hat{\bar{w}}_k^* \quad (79)$$

In (79) $\bar{h}^{eF}$ is obtained from (69) after replacing $\bar{h}^e$ by $\hat{\bar{h}}_k^e$, $\hat{\bar{h}}_k^{le}$ is given by (77) after replacing $h_i$ by the estimate $\hat{h}_{i,k}$ for $i = -M_1, \ldots, 0, \ldots, M_1$, and the truncation operation $\mathrm{Tr}_2$ is comprised of discarding the last (M+2) elements from the vector in its argument.

Figure 9:
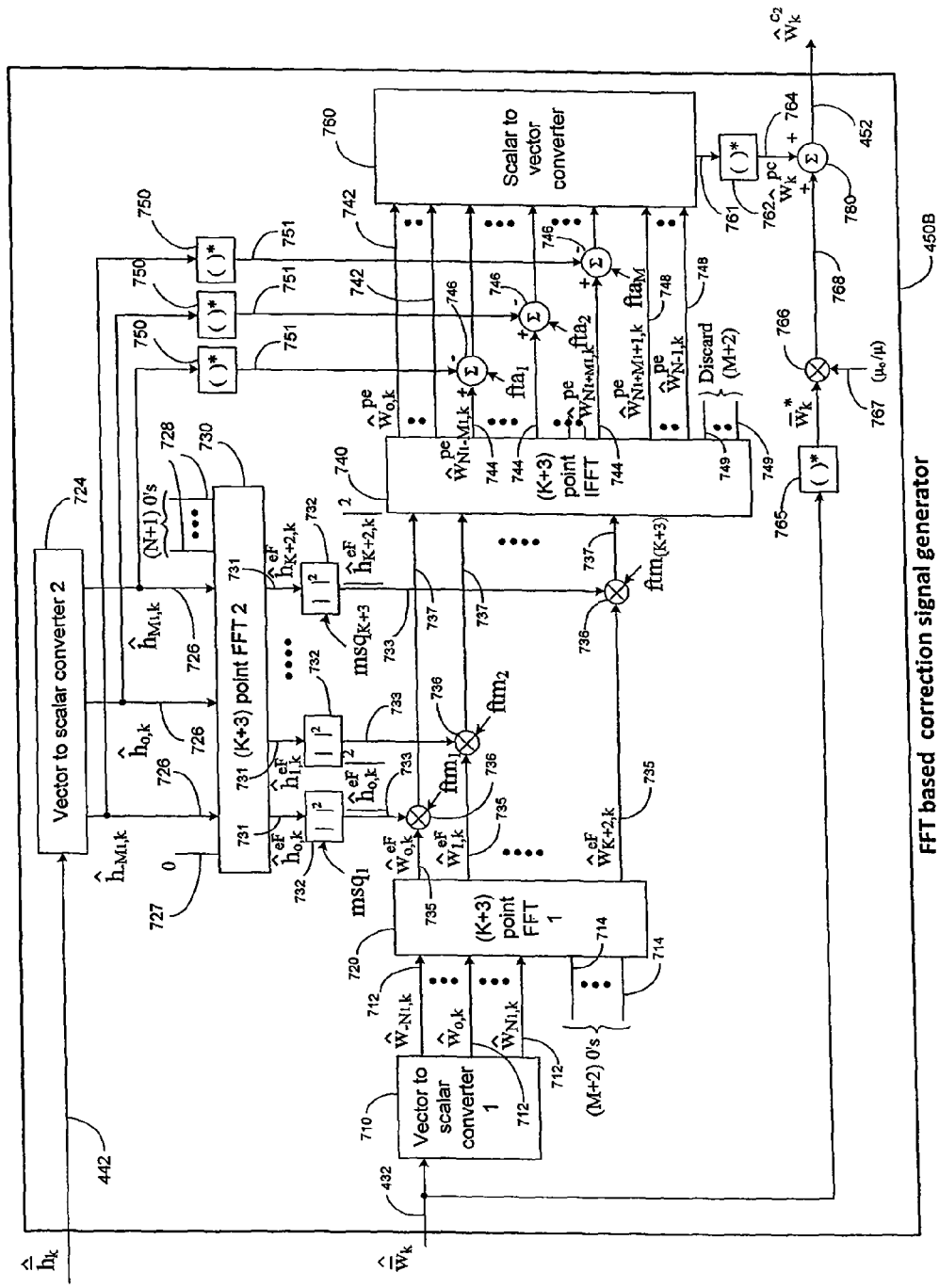
FIG. 9 shows one embodiment of the FFT Implementation of the correction signal generator.

FIG. 9 shows the FFT implementation of the correction signal generator 450B of FIG. 6. Referring to FIG. 9, the equalizer parameter vector 432 $\bar{w}_k$ is input to the vector to scalar converter 710 that provides the N components 712 $\hat{w}_{-N_1,k}, \ldots, \hat{w}_{0,k}, \ldots, \hat{w}_{N_1,k}$ of the vector $\bar{w}_k$ at the output. The N components 712 $\hat{w}_{-N_1,k}, \ldots, \hat{w}_{0,k}, \ldots, \hat{w}_{N_1,k}$ along with (M+2) zeros are input to the (K+3) point FFT1 block 720. The FFT1 block 720 evaluates the (K+3) point FFT transform of the inputs 712, 714 and provides the (K+3) outputs 735 $\hat{w}_{0,k}^{eF}, \ldots, \hat{w}_{K+2,k}^{eF}$ to the multipliers 736 $\mathrm{ftm}_1, \ldots, \mathrm{ftm}_{K+3}$. Referring to FIG. 9, the estimate of the channel impulse response vector 442 $\hat{\bar{h}}_k$ is input to the vector to scalar converter 724 that provides the M outputs 726 to the inputs of the FFT2 block 730. The other (N+2) inputs 727, 728 of the FFT2 block 730 are set equal to 0. The (K+3) outputs 731 of the FFT2 block 730 $\hat{h}_{0,k}^{eF}, \ldots, \hat{h}_{0,K+2}^{eF}$ are input to the (K+3) modulus square blocks 732 $\mathrm{msq}_1, \ldots, \mathrm{msq}_{K+3}$. The outputs 733 of the (K+3) modulus square blocks 732 $\mathrm{msq}_1, \ldots \mathrm{msq}_{K+3}$ are connected to the inputs of the respective (K+3) multipliers 736 $\mathrm{ftm}_1, \ldots, \mathrm{ftm}_{K+3}$. The $(i+1)^{th}$ ftm multiplier $\mathrm{ftm}_i$ multiplies $\hat{w}_{i,k}^{eF}$ and $|\hat{h}_{i,k}^{eF}|^2$ provides the output 737 to the $(i+1)^{th}$ input of the (K+3) point IFFT block 740 for $i = 0, 1, \ldots, (K+2)$. The IFFT block 740 evaluates the (K+3) point IFFT of the (K+3) inputs 737. The last (M+2) outputs 749 of the IFFT block 740 are discarded.

Referring to FIG. 9, the first 742 ($N_1 - M_1$) and the last 748 ($N_1 - M_1$) of the remaining N outputs of the IFFT block 740 denoted by $\hat{w}_{N_1-M_1,k}^{pe}, \ldots, \hat{w}_{N_1-M_1-1,k}^{pe}, \hat{w}_{N_1+M_1+1,k}^{pe}, \ldots \hat{w}_{N-1,k}^{pe}$ are inputted to the respective $2(N_1-M_1)$ inputs of the scalar to vector converter 760. The M components 744 of the IFFT block $\hat{w}_{N_1-M_1,k}, \ldots, \hat{w}_{N_1+M_1,k}$ are inputted to the inputs of the M fta adders 746 $\mathrm{fta}_1, \ldots, \mathrm{fta}_M$ that subtract the complex conjugate 751 of the 726 $\hat{h}_{-M_1,k}, \ldots, \hat{h}_{0,k}, \ldots, \hat{h}_{M_1,k}$ respectively provided by the conjugate block 750 from the inputs 744 provided by the IFFT block 740 by the adders 746. The outputs 726 $\hat{h}_{M_1,k}, \ldots, \hat{h}_{0,k}, \ldots \hat{h}_{M_1,k}$ of the vector to scalar converter 734 are provided to the conjugate block 750. Referring to FIG. 9, the outputs of the M fta adders are inputted to the scalar to vector converter 760 that provides the vector 761

$$\hat{\bar{w}}_k^{pc*} = \mathrm{Tr}\left\{F^{-1}\left[\hat{\bar{w}}_k^{eF} \square |\hat{\bar{h}}_k^{eF}|^2\right]\right\} - \hat{\bar{h}}_k^{le*}$$

to the conjugate block 762. The output 764 $\bar{w}_k^{pc}$ of the conjugate block 762 is input to the adder 780 that adds $(\mu_0/\mu)\bar{w}_k$ provided by the multiplier 766 to 764 $\bar{w}_k^{pc}$ with the result of the addition equal to the second correction signal vector 452 $\bar{w}_k^{c2}$. The conjugate of the equalizer parameter vector 432 $\bar{w}_k$ is inputted to the multiplier 765. The second correction signal vector 452 $\bar{w}_k^{c2}$ is inputted to the adaptation block 16 of FIG. 6. As in (79) $\mu$ and $\mu_0$ are small positive scalars and determine the relative weights assigned to the noise and ISI as in ((62)-(65)).

In one of the various alternative embodiments of the invention, the equalizer filter 9 in the BMAEHS 60 of FIG. 1 may be selected as the decision feedback equalizer (DFE) filter. In the decision feedback equalizer some of the components of the equalizer state vector $\bar{\psi}_k$ are replaced by the detected symbols that are available at the instance of detecting the present symbol $a_{k+M_1}^d$. The equalizer parameter vector update algorithm is given by $$\bar{w}_{k+1} = \bar{w}_k + \mu_d \bar{w}_k^{c1} - \mu \bar{w}_k^{c2}; \quad (80a)$$

$$\bar{w}_k^{c1} = \bar{\psi}_k(a_{k+M_1}^d - \bar{w}_k^H \bar{\psi}_k)^*; \quad (80b)$$

$$\bar{\psi}_k = [z_{k+K_1}, \ldots, z_{k+M_1}, a_{k+M_1-1}^d, \ldots, a_{k+M_1-N_2}^d];$$
$$k = 0, 1, \ldots \quad (80c)$$

In (80) the dimension N of the equalizer parameter vector $\bar{w}_k$ is given by $N = N_1 + N_2 + 1$ with $N_2$ denoting the number of components of the equalizer parameter state vector that are equal to the previous detected symbols. The second correction signal vector $\bar{w}_k^{c2}$ in (80a) is generated so as to minimize the modeling error in the equalizer and minimizes the norm of the vector that is equal to the difference between the impulse response vector of the cascade of the channel and the equalizer $\bar{g}_k^m$ and the vector $\bar{\delta}=[0 \ldots 010 \ldots 0]^T$ of appropriate dimension. An expression for the impulse response $\bar{g}_k^m$ is obtained by first splitting the equalizer parameter vector $\bar{w}_k$ as $$\bar{w}_k = [\bar{w}_k^{+T} \bar{w}_k^{-T}]^T \tag{81a}$$

$$\bar{w}_k^+ = [\hat{w}_{-N_1,k}, \ldots, \hat{w}_{0,k}]^T; \bar{w}_k^- = [\hat{w}_{1,k}, \ldots, \hat{w}_{N_2,k}]^T \tag{81b}$$

For relatively low probability of error in the detection of $a_k$, $a_k^d = a_k$ for most of the times and the impulse response vector of the cascade of the channel and the equalizer $\bar{g}_k^m$ may be approximated by $$\hat{\bar{g}}_k^m = \hat{\bar{g}}_k^+ + \hat{\bar{w}}_k^{-e}; \tag{82a}$$
$$\hat{\bar{g}}_k^+ = \hat{H}_k^+ \hat{\bar{w}}_k^+;$$

$$\hat{\bar{w}}_k^{-e} = \left[\underbrace{0 \ldots 0}_{K_1+1} \hat{\bar{w}}_k^{-T}\right]^T \tag{82b}$$

In (82a) $\hat{H}_k^+$ is an $(M+N_1) \times (N_1+1)$ matrix and is obtained from the matrix $H^+$ with the elements h, of the matrix $H^+$ replaced by the estimates $\hat{h}_{i,k}$ for $i = -M_1, \ldots, 0, \ldots, M_1$ and with the matrix $H^+$ given by (83).

$$H^+ = \begin{bmatrix} H_1^+ \\ H_2^+ \\ H_3^+ \end{bmatrix} \tag{83a}$$

$$H_1^+ = \begin{bmatrix} h_{-M_1} & 0 & 0 & \ldots\ldots & 0 \\ h_{-M_1+1} & h_{-M_1} & 0 & \ldots & 0 \\ & \ldots & \ldots & \ldots & \\ h_{-M_1+N_1} & \ldots & \ldots & \ldots & h_{-M_1} \end{bmatrix}; \tag{83b}$$

$$H_2^+ = \begin{bmatrix} h_{-M_1+N_1+1} & 0 & 0 & \ldots & h_{-M_1+1} \\ & \ldots & \ldots & \ldots & \\ h_{M_1} & \ldots & \ldots & \ldots & h_{M_1-N_1} \end{bmatrix}$$

$$H_3^+ = \begin{bmatrix} 0 & h_{M_1} & 0 & \ldots\ldots & h_{M_1-N_1+1} \\ 0 & 0 & h_{M_1} & \ldots\ldots & h_{M_1-N_1+2} \\ & & & \ldots\ldots & \\ 0 & 0 & \ldots\ldots & \ldots\ldots & h_{M_1} \end{bmatrix} \tag{83c}$$

In (83b, c) $2M_1$ is assumed to be greater than $N_1$. More generally the matrix $H^+$ is obtained by $N+M_1$ shifted versions of the channel impulse response vector $\bar{h}$, appended with appropriate number of 0s on both sides of $\bar{h}$, staring with the first row equal to the first row of the matrix $H_1^+$ in (83b). In (81)-(82) $N_2$ is selected equal to $M_1$. The second correction signal vector $\bar{w}_k^{c2}$ in (80a) is obtained by minimizing the norm of the vector with $(\bar{g}_k^m - \bar{\delta})$ with respect to the vectors $\bar{w}_k^+$ and $\bar{w}_k^-$. Equivalently the result is obtained by minimizing the objective function $J_{L_2}$ in (84a)

$$J_{L_2} = (H_k^c \bar{w} - \bar{\delta}_{K_1,N_2})^H (H_k^c \bar{w} - \bar{\delta}_{K_1,N_2}) \tag{84a}$$

with respect to the equalizer parameter vector $\bar{w}$. In (84a) $H_k^c$ is the matrix given by (84b).

$$H_k^c = \begin{bmatrix} H_k^+ : O_{(K_1+1) \times M_1} \\ I_{M_1} \end{bmatrix} \tag{84b}$$

In (84b) $O_{(K_1+1) \times M_1}$ is the $(K_1+1) \times M_1$ matrix with all the elements equal to 0 and $I_{M_1}$ is the $(M_1 \times M_1)$ identity matrix. The second correction signal vector $\bar{w}_k^{c2}$ is given by $$\bar{w}_k^{c2} = \hat{H}_k^{cH}(\hat{H}_k^c \bar{w}_k - \hat{\delta}_{K_1,N_2})^* \tag{85}$$

With the application of (84b), the second correction signal vector $\bar{w}_k^{c2}$ may be written in the equivalent form in (86).

$$\bar{w}_k^{c2} = \begin{bmatrix} H_k^{+H} \\ \ldots\ldots\ldots\ldots\ldots \\ O_{M_1 \times (K_1+1)} I_{M_1} \end{bmatrix} (\hat{\bar{g}}_k^m - \bar{\delta}_{K_1,N_2})^* \tag{86a}$$

$$\hat{\bar{g}}_k^m = H_k^+ \hat{\bar{w}}_k^+ + \hat{\bar{w}}_k^{-e} \tag{86b}$$

With $\bar{g}_k^m$ split as $$\hat{\bar{g}}_k^m = \left[(\hat{\bar{g}}_k^{1m})^T (\hat{\bar{g}}_k^{2m})^T\right]^T \tag{86c}$$

$$\bar{w}_k^{c2} = \begin{bmatrix} H_k^{+T}(\hat{\bar{g}}_k^m - \bar{\delta}_{K_1,N_2}) \\ \hat{\bar{g}}_k^{2m} \end{bmatrix}^* \tag{86d}$$

In (86c) $\bar{g}_k^{1m}$ and $\bar{g}_k^{2m}$ are vectors of dimension $(K_1+1)$ and $N_2$ respectively.

Figure 10:
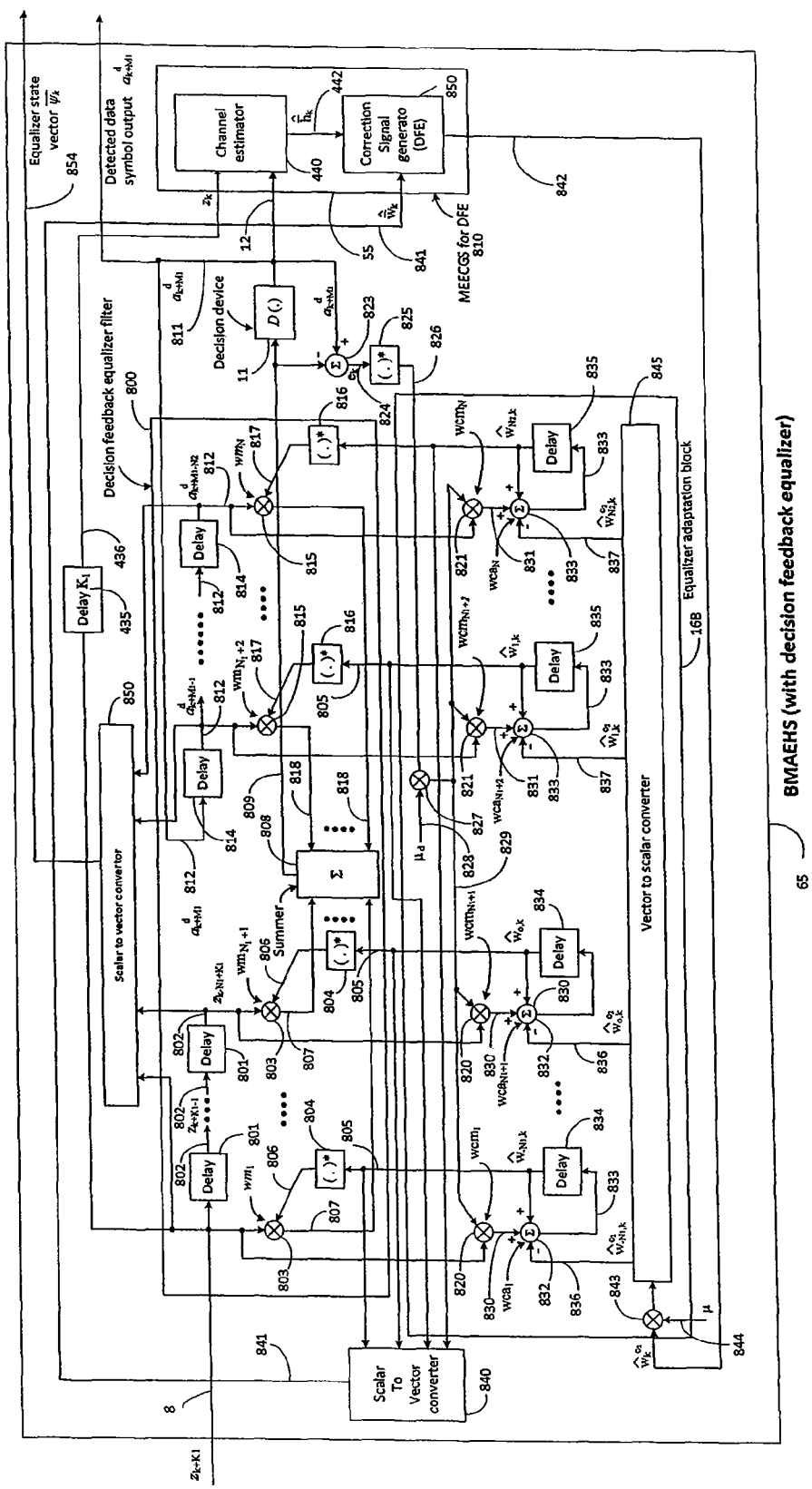
FIG. 10 shows a block diagram of one embodiment of blind mode adaptive equalizer with hierarchical structure with decision feedback equalizer.

FIG. 10 shows the block diagram of the BMAEHS block 60 of FIG. 1 for one of the embodiments of the invention incorporating the case of the decision feedback equalizer. Referring to FIG. 10, the normalized channel output 8 $z_{k+K_1}$ is input to a cascade of $N_1$ delay elements 801 providing the delayed versions 802 of $z_{k+K_1}$ denoted by $z_{k+K_1-1}, \ldots, z_{k+K_1-N_1}$ at their respective outputs. The normalized channel output 8 and its $N_1$ various delayed versions 802 are input to the $(N_1+1)$ wm multipliers 803 $wm_1, \ldots wm_{N_1+1}$. The N wm multipliers 803, 815 are inputted by the conjugates of the components of the equalizer parameter vector $\hat{w}_{-N_1,k}, \ldots, \hat{w}_{0,k}, \ldots, \hat{w}_{N_2,k}$ provided by the conjugate blocks 804, 816 that are inputted with the components 805 of the equalizer parameter vector $\bar{w}_k$. The $(N_1+1)$ wm multipliers 803 multiply the normalized channel output and its $N_1$ delayed versions 802 by the conjugates 806 of the first $N_1$ components of the equalizer parameter vector $\bar{w}_k$ generating the respective products 807 at the outputs of the wm multipliers 803. The outputs 807 of the $(N_1+1)$ wm multipliers are input to the summer 808 that provides a linear estimate 809 $\hat{a}_{k+M_1}$ of the data symbol at the output of the summer 808. The linear estimate 809 $\hat{a}_{k+M_1}$ is input to the decision device 11 that generates the detected symbol 12 $a_{k+M_1}^d$ based on the decision function $\Delta(\,)$ given by (20)-(25).

Referring to FIG. 10, the detected symbol 12 $a_{k+M_1}^d$ is input to the cascade of $N_2$ delays 814 providing the $N_2$ delayed versions 812 of $a_{k+M_1}^d$ denoted by $a_{k+M_1-1}^d, \ldots, a_{k+M_1-N_2}^d$ at their respective outputs. The $N_2$ delayed versions 812 of $a_{k+M_1}^d$ are input to the $N_2$ wm multipliers 815 $wm_{N_1+2}, \ldots, wm_N$ and are multiplied by complex conjugates 817 of the last $N_2$ components 805 of the equalizer parameter vector $\hat{w}_{1,k}, \ldots, \hat{w}_{N_2,k}$ in the $N_2$ wm multipliers 815 generating the respective products 818 at the outputs of the $N_2$ wm multipliers. The outputs 818 of the $N_2$ wm multipliers 815 are input to the summer 808 that provides the linear estimate 809 $\hat{a}_{k+M_1}$ of the data symbol at the output. The components 802, 812 $z_{k+K_1}, \ldots, z_{k+K_1-N_1}, a_{k+M_1-1}^d, \ldots, a_{k+M_1-N_2}^d$ of the state vector $\overline{\psi}_k$ are inputted to the wcm multipliers 820 wcm$_1, \ldots,$ wcm$_N$ that multiply the components of $\overline{\psi}_k$ by $\mu_d e_k^*$ with the outputs of the multipliers constituting the components 830 of the vector $\mu_d \overline{w}_k^{c1}$ made available to the N wca adders 832 wca$_1, \ldots,$ wca$_N$. Referring to FIG. 10, the linear estimate 809 $\hat{a}_{k+M_1}$ and the detected symbol 12 $a_{k+M_1}^d$ are inputted to the adder 823 that provides the error signal 824 $e_k = (a_{k+M_1}^d - \hat{a}_{k+M_1})$ to the input of the conjugate block 825. The output 826 of the conjugate block 825 is multiplied by the scalar $\mu_d$ in the multiplier 827 with the output 826 inputted to the N wcm multipliers 820 wcm$_1, \ldots,$ wcm$_N$.

Referring to FIG. 10, the detected symbol 12 $a_{k+M_1}^d$ is inputted to the channel estimator 440. The normalized channel output 8 $z_{k+K_1}$ is input to the delay block 435 that introduces a delay of $K_1$ samples providing the delayed version 436 $z_k$ to the input of the channel estimator 440. The channel estimator 440 provides the estimate of the channel impulse response vector 442 $\hat{h}_k$ at the output of the channel estimator. The equalizer parameters 805 $\hat{w}_{-N_1,k}, \ldots, \hat{w}_{0,k}, \ldots, \hat{w}_{N_2,k}$ are input to the scalar to vector converter 840 that provides the equalizer vector 841 $\overline{w}_k$ to the correction signal generator for DFE block 850. The estimate of the channel impulse response vector 442 $\hat{h}_k$ is input to the correction signal generator for DFE block 850 that provides the second correction signal vector 842 $\overline{w}_k^{c2}$ to the multiplier 843. The correction signal generator for DFE 850 estimates the impulse response $\overline{g}_k^{mT}$ of the cascade of the channel and the equalizer. The difference between the vector $\overline{g}_k^{mT}$ and the ideal impulse response vector $$\overline{\delta}_{K_1,N_2}^T = [\underbrace{00 \ldots 0}_{K_1} \; 1 \; \underbrace{00 \ldots 0}_{N_2}]$$

may provide a measure of the modeling error incurred by the equalizer. A large deviation of the convolved response $\overline{g}_k^T$ from the ideal impulse response implies a relatively large modeling error.

The correction signal generator block 850 generates the second correction signal 842 $\overline{w}_k$ on the basis of the modeling error vector $[\overline{\delta}_{K_1,N_2} - \overline{g}_k]$ and is given by (85)-(86). The second correction signal 842 $\overline{w}_k^{c2}$ is inputted to the adaptation block 16B for adjusting the equalizer parameter vector $\overline{w}_{k+1}$ at time k+1. The decision feedback equalizer parameter algorithm implemented by the adaptation block 16B of FIG. 10 is described by (80). Referring to FIG. 10, the second correction signal 842 $\overline{w}_k^{c2}$ is multiplied by a positive scalar $\mu$ providing the product to the vector to serial converter 845. The outputs $\hat{w}_{-N_1,k}^{c2}, \ldots, \hat{w}_{N_2,k}^{c2}$ are inputted to the N wca adders 832. The outputs of the N wca adders 832 constituting the components of the updated equalizer parameter vector $\overline{w}_{k+1}$ are inputted to the N delays 834. The outputs of the N delays 834 are inputted to the N conjugate blocks 804.

Figure 11:
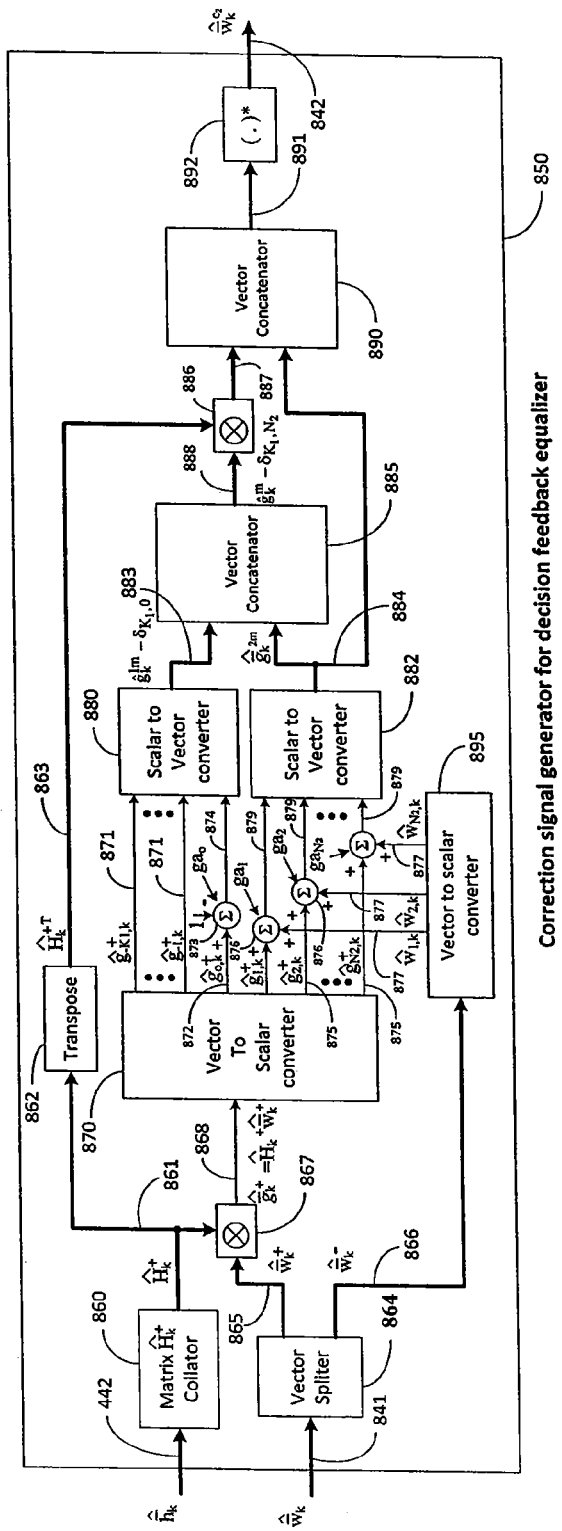
FIG. 11 shows one embodiment of the correction signal generator for decision feedback equalizer.

FIG. 11 shows the block diagram of the correction signal generator for the decision feedback equalizer 850 of FIG. 10. Referring to FIG. 11, the estimate of the channel impulse response vector 442 $\hat{h}_k$ is input to the matrix $\hat{H}_k^+$ collator 860 that forms matrix 861 $\hat{H}_k^+$ according to equation (83a) with $h_i$ in (83) replaced by $\hat{h}_i$ for i=M$_1, \ldots$ 0 $\ldots,$ M$_1$. The equalizer parameter vector 841 $\overline{w}_k$ is input to the vector splitter 864 that provides two vectors 865 $\overline{w}_k^+ = [\hat{w}_{-N_1,k}, \ldots, \hat{w}_{0,k}]^T$ and 866 $\overline{w}_k = [\hat{w}_{1,k}, \ldots \hat{w}_{N_2,k}]^T$ defined in (81b) at the output where N$_2$ may be equal to M$_1$. Referring to FIG. 11, the matrix 861 $\hat{H}_k^+$ and the vector 865 $\overline{w}_k^+$ are inputted to the matrix multiplier 867 that provides the product 868 $\overline{g}_k^+ = \hat{H}_k^+ \overline{w}_k^+$ at the matrix multiplier 867 output. The vector 868 $\overline{g}_k^+$ is input to the vector to scalar converter 870 that provides the components 871, 872, 875 $\hat{g}_{-K_1,k}^+, \ldots, \hat{g}_{0,k}^+, \ldots, \hat{g}_{N_2,k}^+$ at the output of the vector to scalar converter 870. The first K$_1$ components 871 $\hat{g}_{-K_1,k}^+, \ldots, \hat{g}_{-1,k}^+$ of the vector $\overline{g}_k^+$ (are input to the scalar to vector converter 880. The component 872 $\overline{g}_k^+$ subtracts the constant 1 in the adder 873 with the result of the subtraction 874 ($\overline{g}_{0,k}^+ - 1$) inputted to the scalar to vector converter 880 as shown in FIG. 11. The scalar to vector converter 880 provides the vector 883 ($\overline{g}_k^{1m} - \delta_{K_1,0}$) at the output where $\overline{g}_k^{1m} = [\hat{g}_{-K_1,k}, \ldots, \hat{g}_{0,k}^+]^T$ and $\delta_{K_1,0}$ is the discrete impulse vector with K$_1$ zeros followed by 1 as its components.

Referring to FIG. 11, the vector 841 $\overline{w}_k^-$ is inputted to the vector to scalar converter 2 that provides the components 877 $\hat{w}_{1,k}, \ldots, \hat{w}_{N_2,k}$ at the output of the vector to scalar converter 895. The components 877 $\hat{w}_{1,k}, \ldots, \hat{w}_{N_2,k}$ and the components 875 $\hat{g}_{1,k}^+, \ldots \hat{g}_{N_2,k}^+$ of the vector $\overline{g}_k^+$ are inputted to the adders 876 ga$_1, \ldots,$ ga$_{N2}$. The N$_2$ ga$_i$ adder 876, i=1, 2, $\ldots,$ N$_2$ provides the sum 879 ($\hat{g}_{i,k}^+ + \hat{w}_{i,k}$) at the adder output. The outputs 879 of the N$_2$ ga adders 876 are input to the scalar to vector converter 882 that provides the vector 884 $\overline{g}_k^{2m}$ at the output. Referring to FIG. 11, the vectors ($\overline{g}_k^{1m} - \delta_{K_1,0}$) and $\overline{g}_k^{2m}$ are inputted to the vector concatenator 885 that concatenates the input vectors in to the vector 888 ($\overline{g}_k^m - \delta_{K_1,N_2}$)= $[(\overline{g}_k^{1m} - \delta_{K_1,0})^T (\overline{g}_k^{2m})^T]^T$ of size (K$_1$+N$_2$+1) at the output of the vector concatenator 885 and provides the result to the matrix multiplier 886. The matrix 861 $\hat{H}_k^+$ from the matrix $\hat{H}_k^+$ collator block is input to the transpose block 862 that provides the matrix 863 $\hat{H}_k^+$ to the input of the matrix multiplier 886. The matrix multiplier 886 provides the product 887 $\hat{H}_k^{+T}(\overline{g}_k^m - \delta_{K_1,N_2})$ at the matrix multiplier 886 output and makes the result available to the vector concatenator 2. The vector $\overline{g}_k^m$ is inputted to the vector concatenator 2 that concatenates it with the vector $\hat{H}_k^{+T}(\overline{g}_k^m - \delta_{K_1,N_2})$ providing the concatenated vector 891 to the conjugate block 892. The output 842 of the conjugate block 892 is equal to the second correction signal $\overline{w}_k^{c2}$ according to (86).

The convergence rate of the equalizer parameter vector update algorithm in (27) to (31) may be significantly increased by the application of the orthogonalization procedure In the orthogonalization procedure, the sequence of the correction signal vectors is modified such that in the modified sequence, the correction signal vectors at successive time instances k are nearly orthogonal resulting in increased convergence rate. In one of the various embodiments of the invention, the BMAEHS block of FIG. 1 is modified by an orthogonalizer.

Figure 12:
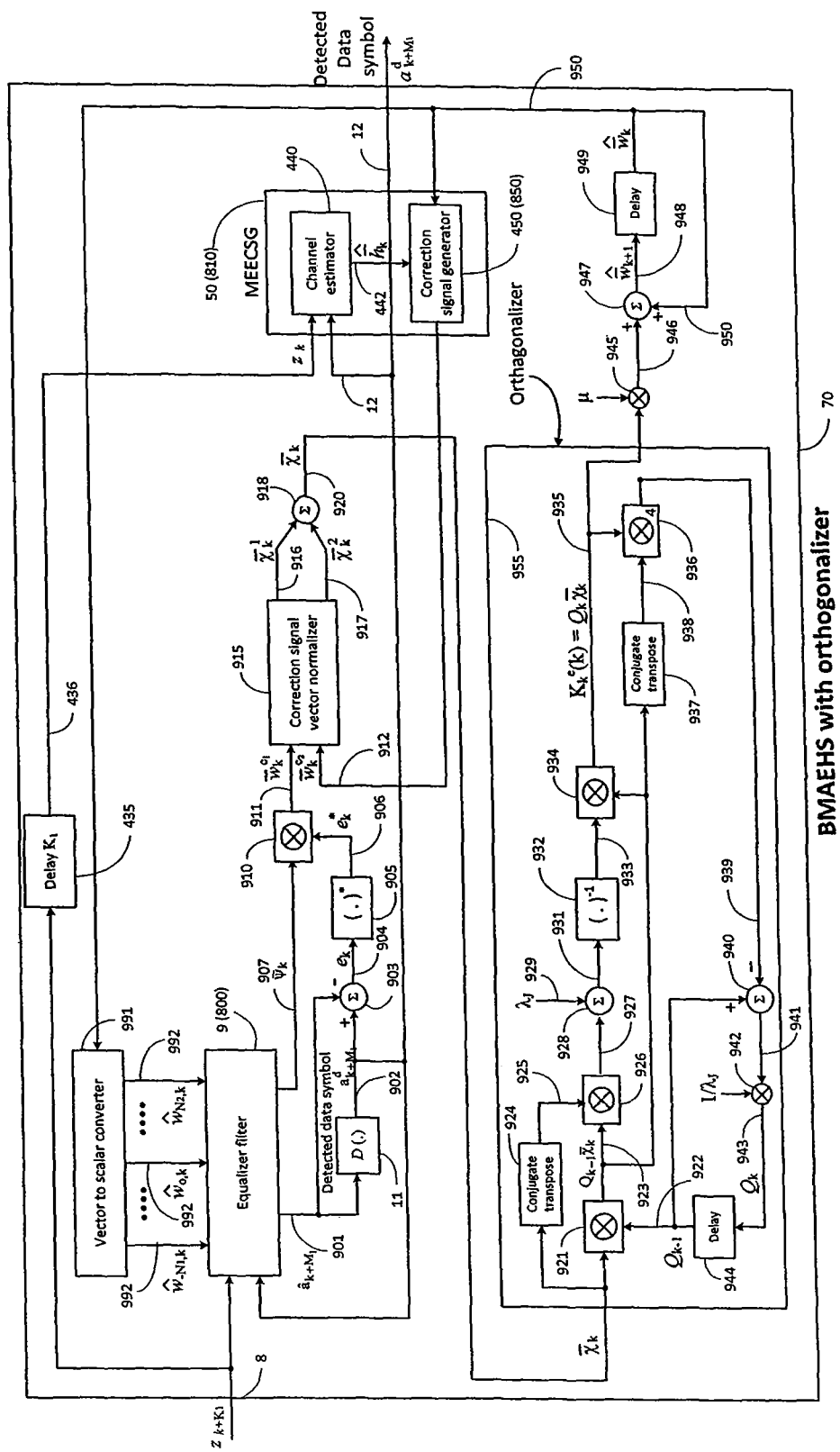
FIG. 12 shows a block diagram of one embodiment of blind mode adaptive equalizer with hierarchical structure and with orthogonalizer.

FIG. 12 shows the block diagram of the BMAEHS block 70 incorporating the correction signal vector orthogonalizer that may replace the BMAEHS block 60 in FIG. 1. Referring to FIG. 12, the normalized channel output 8 $z_{k+K_1}$ is input to the equalizer block 9(800), the number in the parenthesis refers to the case of the embodiment of the invention with the decision feedback equalizer. The linear estimate $\hat{a}_{k+M_1}$ at the output of the equalizer filter is input to the decision device 11 that generates the detected symbol 902 $a_{k+M_1}^d$ based on the decision function $\Delta()$. The linear estimate 901 $\hat{a}_{k+M_1}$ is subtracted from the detected symbol 902 $a_{k+M_1}^d$ by the adder 903 providing the error signal 904 $e_k = (a_{k+M_1}^d - \hat{a}_{k+M_1})$. The complex conjugate of the error signal 904 $e_k$ made available by the conjugate block 905 and the equalizer state vector 907 $\overline{\psi}_k$ provided by the equalizer 9(800) are inputted to the matrix multiplier 910. The matrix multiplier 901 generates the first correction signal vector 911 $\overline{w}_k^{c1}$ that that is made available to the correction signal vectors normalizer 915. Referring to FIG. 12, the MEECGS block 50(810) provides the second correction signal vector 912 $\overline{w}_k^{c2}$ to the correction signal vectors normalizer 915. The correction signal vectors normalize 915 normalizes the two correction signal vectors 911, 912 by the square roots of the mean squared norms of the respective correction signal vectors and inputs the normalized correction signal vectors 916 $\overline{\chi}_k^1$ and 917 $\overline{\chi}_k^2$ to the adder 918. The adder 918 subtracts the vector $\overline{\chi}_k^2$ from $\overline{\chi}_k^1$ providing the difference 920 $\overline{\chi}_k = \mu_1 \overline{\chi}_k^1 - \mu_2 \overline{\chi}_k^2$ to the input of the orthogonalizer block 955. In various alternative embodiments of the invention, the difference 920 $\overline{\chi}_k = \overline{\chi}_k^1 - \overline{\chi}_k^2$ may be replaced by a weighted difference $\overline{\chi}_k = \mu_1 \overline{\chi}_k^1 - \mu_2 \overline{\chi}_k^2$ for some positive weighting coefficients $\mu_1$ and $\mu_2$.

Referring to FIG. 12, the orthogonalizer 955 provides the orthogonalized correction signal vector 955 $K_k^e$ at the output of the orthogonalizer evaluated according to equation (87a, b),)

$$K_k^e = Q_k \overline{\chi}_k = Q_{k-1} \overline{\chi}_k (\overline{\chi}_k^H Q_{k-1} \overline{\chi}_k + \lambda_J)^{-1} \quad (87a)$$

$$Q_k = \lambda_J^{-1} [Q_{k-1} - Q_{k-1} \overline{\chi}_k (\overline{\chi}_k^H Q_{k-1} \overline{\chi}_k + \lambda_J)^{-1} \overline{\chi}_k^H Q_{k-1}]; k = 0, 1, \ldots \quad (87b)$$

In (87b) the matrix $Q_{-1}$ may be set equal to $\epsilon I_N$ with E equal to some positive scalar and $I_N$ denting the N×N identity matrix. In (87b) $\lambda_J$ is an exponential data weighting coefficient with $0 < \lambda_J \leq 1$ and determines the rate at which the past values of 920 $\overline{\chi}_k$ are discarded in the estimation of the matrix $Q_k$ as with the application of the matrix inversion lemma, the matrix $Q_k^{-1}$ for relatively large value of k may be interpreted as a positive scalar times an estimate of the covariance of $\overline{\chi}_k$, with $Q_k^{-1} \cong ((1-\lambda_J^k)/(1-\lambda_J)) E[\overline{\chi}_k \overline{\chi}_k^H]$ where E denotes the expected value operator.

Referring to FIG. 12, the normalized correction signal vector 920 $\overline{\chi}_k$ is input to the matrix multiplier 921 wherein 920 $\overline{\chi}_k$ is pre multiplied by the matrix 922 $Q_{k-1}$. The matrix 922 $Q_{k-1}$ is made available to the matrix multiplier 921 by the output of the delay 944. The output of the matrix multiplier 921 is input to the matrix multiplier 926. The normalized correction signal vector 920 $\overline{\chi}_k$ is input to the conjugate transpose block 924 that provides the row vector 929 $\overline{\chi}_k^H$ to the input of the matrix multiplier 926. The matrix multiplier 921 output 923 equal to $Q_{k-1} \overline{\chi}_k$ is inputted to the matrix multiplier 934 and to the conjugate transpose block 937. The matrix multiplier 926 output 927 equal to $\overline{\chi}_k^H Q_{k-1} \overline{\chi}_k$ is input to the adder 928 that adds the constant $\lambda_J$ to the input 927. The output 931 of the adder 928 equal to $(\overline{\chi}_k^H Q_{k-1} \overline{\chi}_k + \lambda_J)$ is input to the inverter 932 that makes the result 933 equal to $1/(\overline{\chi}_k^H Q_{k-1} \overline{\chi}_k + \lambda_J)$ available to the input of the matrix multiplier 934. The matrix multiplier 934 output 935 equal to $K_k^e = Q_{k-1} \overline{\chi}_k/(\overline{\chi}_k^H Q_{k-1} \overline{\chi}_k + \lambda_J) = Q_k \overline{\chi}_k$ constitutes the orthogonalized correction signal vector $K_k^e$. The output 935 of the matrix multiplier 934 and the output of transpose block 937 equal to $\overline{\chi}_k^H Q_{k-1}$ are inputted to the matrix multiplier 936 that provides the matrix product 939 $Q_{k-1} \overline{\chi}_k \overline{\chi}_k^H Q_{k-1}/(\overline{\chi}_k^H Q_{k-1} \overline{\chi}_k + \lambda_J)$ at the output of the matrix multiplier 936. The outputs of the delay 944 and that of the matrix multiplier 936 are input to the adder 940 that provides the difference between the two inputs at the output of the adder. The output 941 of the adder 940 is normalized by the constant $\lambda_J$ in the multiplier 941. The output 943 of the multiplier 941 constitutes the updated matrix 943 $Q_k$ that is input to the delay 944. The output of the delay 944 equal to 922 $Q_{k-1}$ is input to the multiplier 921.

Referring to FIG. 12, the normalized channel output 8 $z_{k+K_1}$ is input to the delay block 435 that introduces a delay of $K_1$ samples providing the delayed version 436 $z_k$ to the input of the channel estimator 440. The detected symbol 902 $a_{k+M_1d}$ from the output of the decision device 11 is made available to the channel estimator 440. The channel estimator 440 provides the estimate of the channel impulse response vector 442 $\hat{h}_k$ at the output of the channel estimator and to the input of the correction signal generator 450(850). In one of the various embodiments of the invention the equalizer filter 9(800) in FIG. 12 is the linear equalizer filter and the correction signal generator block is the same as the correction signal generator block for LEQ 450 of FIG. 6 for the BMAEHS with the linear equalizer. The correction signal generator 450 convolves the estimate of the channel impulse response vector 442 $\hat{h}_k$ with the equalizer parameter vector 950 $\overline{w}_k^T$ to obtain the convolved vector $\tilde{g}_k^T$. The difference between the vector $\tilde{g}_k^T$ obtained by convolving the estimate of the channel impulse response vector with the equalizer parameter vector $\overline{w}_k$, and the ideal impulse response vector $\overline{\delta}_{K_1,K_2}^T$ may provide a measure of the modeling error incurred by the equalizer. A large deviation of the convolved response $\tilde{g}_k^T$ from the ideal impulse response implies a relatively large modeling error. The correction signal generator block 450 generates the second correction signal vector 912 $\overline{w}_k^{c2}$ on the basis of the modeling error vector $[\overline{\delta}_{K_1,K_2} - \tilde{g}_k]$. The second correction signal vector 912 $\overline{w}_k^{c2}$ is inputted to the correction signal vectors normalizer block 915.

In an alternative embodiment of the invention, the equalizer filter 9(800) in FIG. 12 is the decision feedback equalizer filter 800 and the correction signal generator block 450(850) is the same as the correction signal generator block DFE 850 of FIG. 10 for the BMAEHS with the decision feedback equalizer. The correction signal generator block 850 evaluates the second correction signal vector 912 $\overline{w}_k^{c2}$ and makes it available to the correction signal vectors normalize 915.

Referring to FIG. 12, the orthogonalized correction signal vector 935 $K_k^e$ available at the output of the orthogonalizer 955 is inputted to the multiplier 945 that multiplies the vector 935 $K_k^e$ by a positive scalar $\mu$. The scalar $\mu$ may be selected to be either a constant or may be a function of k. For example, $\mu$ may be equal to $\mu = \mu_0 (1-\lambda_J^k)/(1-\lambda_J)$ for some positive scalar $\mu_0$ and with $0 < \lambda_J < 1$. Such a time-varying $\mu$ normalizes the matrix 943 $Q_k$ in (87a) effectively replacing $Q_k^{-1}$ by $((1-\lambda_J)/(1-\lambda_J^k)) Q_k^{-1} \cong E[\overline{\chi}_k \overline{\chi}_k^T]$. Referring to FIG. 12, the output 946 of the multiplier 945 equal to $\mu K_k^e$ is inputted to the adder 947 that adds the input 947 $\mu K_k^e$ to the other input 950 of the adder equal to $\overline{w}_k$ made available from the output of the delay 949. The output 948 of the adder 947 constitutes the updated equalizer parameter vector given $\overline{w}_{k+1}$ by $$\overline{w}_{k+1} = \overline{w}_k + \mu K_k^e \quad (88)$$

The vector 948 $\overline{w}_{k+1}$ is input to the delay 949 providing the delayed version of the input $\overline{w}_k$ at the output of the delay. Referring to FIG. 12, the equalizer parameter vector 950 $\overline{w}_k$ is input to the correction signal generator 450(850) and the vector to scale converter 991. The vector to scalar converter 991 provides the components 992 $\hat{w}_{-N_1,k}^{c2}, \ldots, \hat{w}_{0,k}^{c2}, \ldots, \hat{w}_{N_2,k}^{c2}$ with $N_2$ possibly equal to $N_1$, of the equalizer parameter vector 950 $\hat{w}_k$ to the equalizer block that provides the linear estimate of the data symbol 901 $\hat{a}_{k+M_1}$ at the equalizer filter output.

Figure 13:
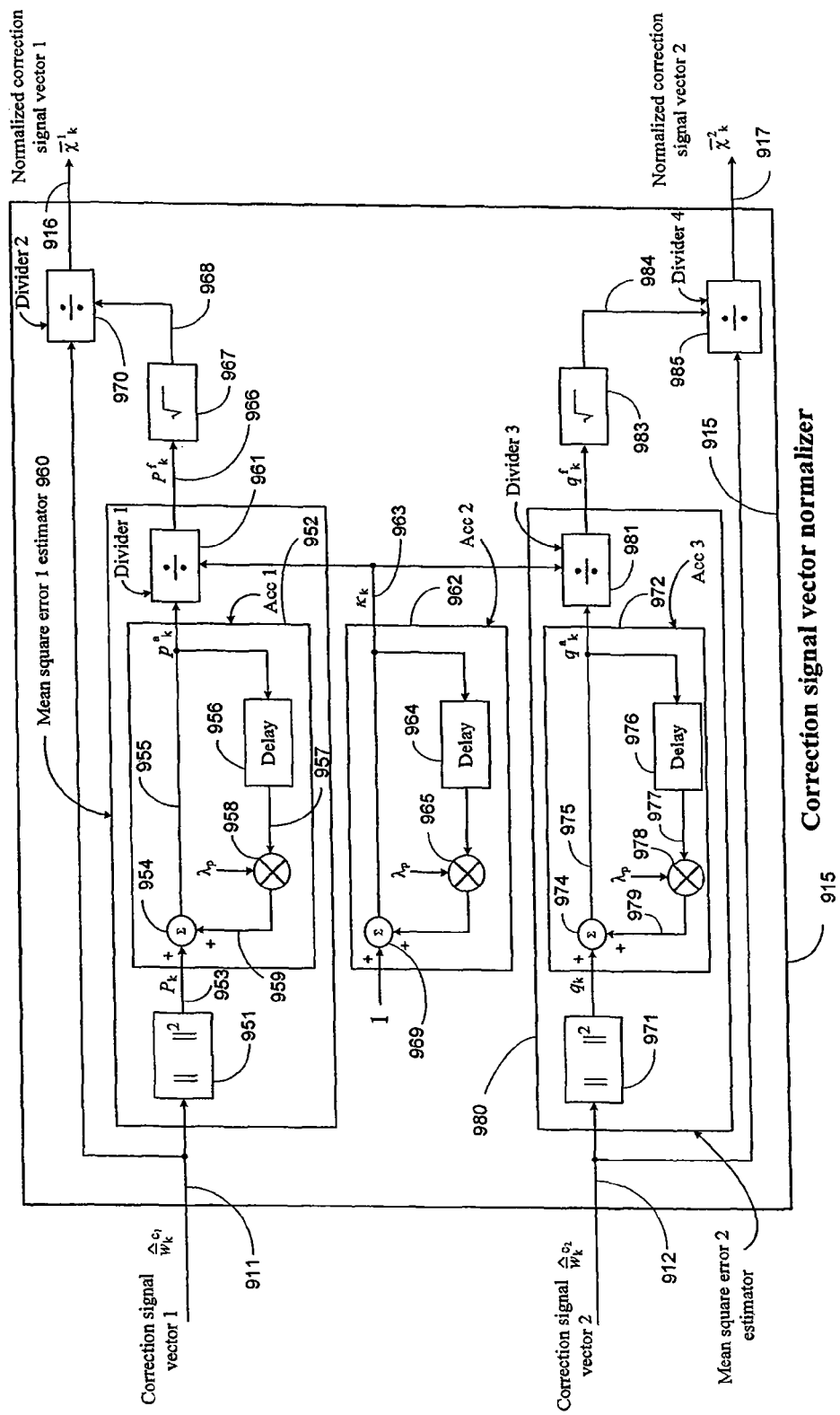
FIG. 13 shows one embodiment of correction signal vector normalizer.

FIG. 13 shows the correction signal vectors normalizer 915. Referring to FIG. 13, the first correction signal vector 911 $\overline{w}^{c1}$ is input to the norm square block 951 that provides the output 953 $p_k = \|\overline{w}^{c1}\|^2$. The signal 953 $p_k$ is input to the accumulator 952 Acc1 that accumulates the input 953 $p_k$ according to the equation $$p_k^a = \lambda_c p_{k-1}^a + p_k; p_{-1}^a = c_1; p_k = \|\overline{w}_k^{c1}\|^2; k=0,1,\ldots \quad (89a)$$

where $\lambda_c$ with $0 < \lambda_c \leq 1$ is the exponential data weighting coefficient. The accumulator Acc1 952 is comprised of an adder 954, a delay 956, and a multiplier 958. The delay 956 is inputted with the accumulator output 955 $p_k^a$ and provides the delayed version 957 $p_{k-1}^a$ to the input of the multiplier 958 that multiplies the input 957 by $\lambda_p$ and provides the product 959 to the adder 954. The adder 954 sums the input 953 $p_k$ and the multiplier output 959 $\lambda_c p_{k-1}^a$ providing the sum 955 $p_k^a$ at the output of the adder. Referring to FIG. 13, the constant 1 is input to the accumulator Acc2 962 that results in the output of the accumulator Acc2 962 given by equation (89b)

$$\kappa_k = \lambda_c \kappa_{k-1} + 1; \kappa_k = (1-\lambda_c)/(1-\lambda_c^k) \quad (89b)$$

The outputs of the accumulators Acc1 960 and Acc2 962 are input to the divider 961 that makes the result of the division 966 $p_k^f = p_k^a/\kappa_k$ available at the output of the divider. The signal 966 $p_k^f$ is input the square root block 967 that makes the result 968 $\sqrt{p_k^f}$ available to the divider 970. The first correction signal vector 911 $\overline{w}^{c1}$ is input to the divider 970 and is divided by the other input of the divider equal to 968 $\sqrt{p_k^f}$ and makes the normalized correction signal 1 vector 916 $\overline{\chi}_k^1 = \overline{w}_k^{c1}/\sqrt{p_k^f}$ available at the output of the divider 970.

Referring to FIG. 13, the second correction signal vector 912 $\overline{w}_k^{c2}$ is input the mean square 2 estimator 980 that is comprised of the norm square block 971, the adder 974, the delay 976, the multiplier 978, and the divider 981. The operation of the mean square 2 estimator 980 is similar to that of the mean square 1 estimator 960 and provides the result 982 $q_k^f$ evaluated according to (89c, d) to the square root block 983 that provides the output 984 $\sqrt{q_k^f}$ to the divider 985. The second correction signal vector 912 $\overline{w}^{c2}$ is input to the divider 985 that normalized the second correction signal vector 912 $\overline{w}_k^{c2}$ providing the second normalized correction signal vector 917 $\overline{\chi}_k^2 = \overline{w}_k^{c2}/\sqrt{q_k^f}$ at the output of the divider 985.

$$q_k^a = \lambda_c q_{k-1}^a + q_k; q_{-1}^a = c_2; q_k = \|\overline{w}_k^{c2}\|^2; k=0,1,\ldots \quad (89c)$$

$$p_k^f = p_k^a(1-\lambda_c)/(1-\lambda_c^k); q_k^f = q_k^a(1-\lambda_c)/(1-\lambda_c^k) \quad (89d)$$

Referring to FIGS. 6 and 10, in various embodiments of the invention, positive scalars $\mu_d$ and $\mu$ therein may alternatively be selected according to $$\mu_d = \mu_0/\sqrt{p_k^f}; \mu = \mu_0/\sqrt{q_k^f} \quad (90)$$

with $p_k^f$ and $q_k^f$ evaluated according to (89). In (90) $\mu_0$ is some positive scalar.

The equalizer total error variance equal to $E[|a_k - a_k^d|^2]$ with E denoting the expected value operator is in general dependent upon the size N of the equalizer parameter vector. Increasing N may result in the reduction of the equalizer total error variance, however it requires a higher computational complexity. For the BMAEHS of the invention, the dominant term in the number of computations per iteration of the equalizer parameter update algorithm is proportional to $N^2$. Thus doubling the size N of the equalizer parameter vector, for example, results in an increase in the number of computations by factor of four. The BMAEHS reduces the equalizer total error variance to a relatively small value even for a relatively small value of N, for example with N in the range of 10-20.

The equalizer total error variance can be further reduced while keeping the total number of computations required per iteration to a minimum by adding a second equalizer in cascade with the BMAEHS. The equalizer total error variance $E[|a_k - a_k^d|^2]$ achieved by the BMAEHS after the initial convergence period is relatively small implying the convolution $\overline{g}_k$ of the channel impulse response vector $\overline{h}$ with the equalizer parameter vector $\overline{w}_k$ is close to the discrete impulse vector $\overline{\delta} = [0 \ldots 010 \ldots 0]^T$. The linear estimate $\hat{a}_k$ of the data symbol may be considered to be the output of an unknown equivalent channel with impulse response vector $\overline{g}_k$ with the input to the equivalent channel equal to $a_k$.

Figure 14:
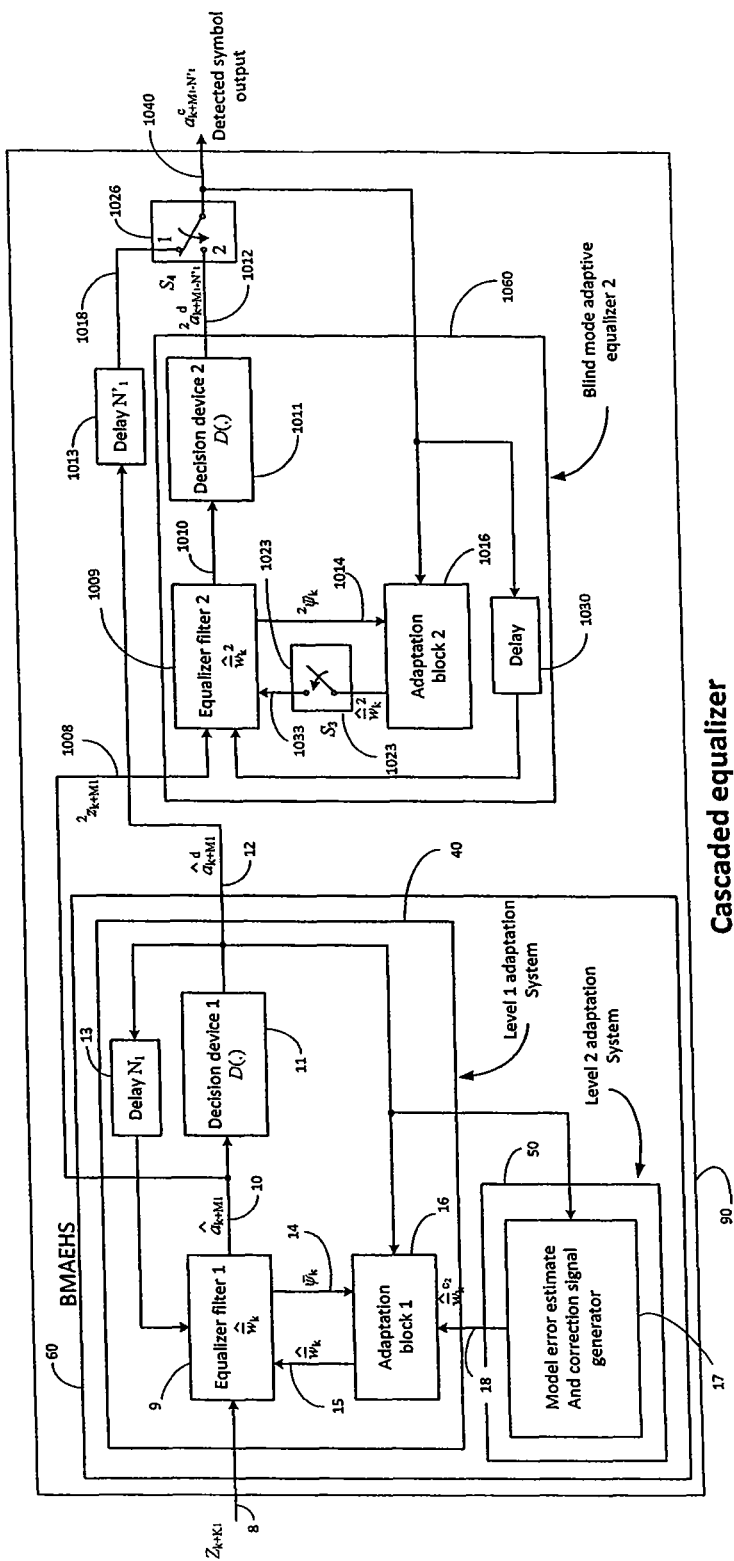
FIG. 14 shows a block diagram of one embodiment of the cascaded equalizer.

FIG. 14 shows the block diagram of the cascaded equalizer 90. The blind mode adaptive equalizer equalizer (BMAE) 2 1060 in the cascaded equalizer of FIG. 14 estimates the data $a_k$ on the basis of the input $^2z_k$ to the equalizer 2 made equal to the linear estimate $a_k$ provided by the BMAEHS with equalizer 2 1060 parameter vector of length $N' = N'_1 + N'_2 + 1$. During the initial stage of the convergence of equalizer 2 1060, the symbol $a_k$ required in the adaptation algorithm for the equalizer 2 1060 is replaced by the detected data symbol $a_k^d$ provided by the BMAEHS. After the initial convergence period of the equalizer 2, the symbol $a_k$ required in the adaptation algorithm for the equalizer 2 is replaced by the detected data symbol $^2a_k^d$ at the output of equalizer 2. The detected data $^2a_k^d$ at the output of the equalizer 2 is expected to be more accurate than $a_k^d$. The performance of the cascaded equalizer may be considered to be equivalent to that of the single BMAEHS equalizer with equalizer parameter vector size N+N' but with significantly much smaller computational requirements. In view of the impulse response vector $\overline{g}_k$ of the equivalent channel being close to the discrete impulse vector $\overline{\delta}$, the adaptation algorithm for the equalizer 2 may, for example, be selected to be the LMS, RLS or QS algorithm without the need for hierarchical structure of the algorithm. In some embodiments of the invention, the stage 2 equalizer may also be a BMAEHS operating on the unknown channel with impulse response vector $\overline{g}_k$.

Referring to FIG. 14, the normalized channel output 8 $z_{k+K_1}$ is input to the BMAEHS block 60 that provides the detected symbol 12 $a_{k+M_1}^d$ at the output. Referring to FIG. 14, the detected data symbol 12 $a_{k+M_1}^d$ and the linear estimate of the data symbol 10 $\hat{a}_{k+M_1}$ that is equal to 1008 $^2z_{k+K_1}$, are inputted to the blind mode adaptive equalizer 2 1060. Referring to FIG. 14, the linear estimate of the data symbol 10 $\hat{a}_{k+M_1}$ is input to the equalizer filter 2 1009 with the equalizer parameter vector $\overline{w}_k^2 = [\hat{w}_{-N'_1}^2, \ldots, \hat{w}_0^2, \ldots \hat{w}_{N'_2}^2]^T$ and with the length of the equalizer 2 1009 equal to $N' = N'_1 + N'_2 + 1$. In one of the various embodiments of the invention, the equalizer 2 1009 in the blind mode adaptive equalizer 2 block 1060 is a linear equalizer with $N'_1 = N'_2$ with its block diagram same as that given in FIG. 6. In various other embodiments of the invention, the equalizer 2 1009 may be a decision feedback equalizer. The equalizer 2 1009 is initialized with the initial parameter vector estimate $\overline{w}_0^2 = \delta_{N'_1, N'_2} = [0 \ldots 010 \ldots 0]^T$. The state vector 1014 of equalizer 2 1009 given by $^2\overline{\psi}_k = [^2z_{k+M_1}, \ldots, ^2z_{k+M_1-N'_1}, \ldots, ^2z_{k+M_1-N'+1}]^T$ is input to the adaptation block 2 1016 of the blind mode adaptive equalizer 2 1060.

Referring to FIG. 14, the block diagram of the adaptation block 2 1016 of the blind mode adaptive equalizer 2 1060 is similar to that of adaptation block 16 given by FIG. 6 with the second correction signal vector $\overline{w}^{c2}$ in the figure possibly set to 0. The parameter update equation for the adaptation block 2 1016 is given by $$\overline{w}_{k+1}^2 = \overline{w}_k^2 + \mu_2 \, ^2\overline{\psi}_k(a_{k+M_1 N'_1} - ^2a_{k+M_1-N'_1})^*; k=0,1,\ldots; \quad (91a)$$

$$\overline{w}_0^2 = \delta_{N'_1, N'_2} = [0 \ldots 010 \ldots 0]^T \quad (92b)$$

The iteration in (91a) is performed by the adaptation block 1016 for $k \geq 0$. However, the equalizer 2 1009 parameter vector in the blind mode adaptive equalizer 2 is frozen at the initial condition $\overline{w}_0^2$ during the first $N'_d$ iterations of (91a) and is updated after the initial $N'_d$ iteration of (91a) by the output 1033 of switch S3 by closing the switch $S_3$ 1023 after the initial $N'_d$ iteration of (91a), at $k+M_1 = N_d + N'_1 + N'_d$ where $N_d$ and $N'_d$ are the convergence periods of the BMAEHS 60 and the blind mode adaptive equalizer 2 1060 respectively. The convergence period $N_d$ is the time taken by the equalizer in the BMAEHS 60 to achieve some relatively small mean square error after the first $N_1$ samples of the normalized channel output is inputted into the equalizer and may be selected to be about 100-200 samples. The convergence period $N'_d$ of the blind mode adaptive equalizer 2 1060 is similarly defined.

Referring to FIG. 14, the linear estimate 1010 of the data symbol $\hat{a}_{k+M_1-N'_1}$ is input to the decision device 1011 that provides the second detected data symbol 1012 $^2 a_{k+M_1-N'_1}^d$ at the output of the device according to the decision function D( ) that may be given by (20)-(25). The detected data symbol 1012 $^2 a_{k+M_1-N'_1}$ is connected to the input 2 of the switch $S_4$ 1026. The detected data symbol 12 $a_{k+M_1}^d$ from the BMAEHS 60 is inputted to the delay 1013 that provides a delayed version 1018 of the detected data symbol $a_{k+M_1 N'_1}^d$ to the position 1 of the switch $S_4$ 1026. The output 1040 of the switch $S_4$ 1026 is connected to the position 1 of the switch $S_4$ 1026 for $k+M_1 < N_d+N'_1+N'_d$ and is in position 2 for $k+M_1 \geq N_d+N'_1+N'_d$. The output 1040 $a_{k+M_1-N'_1}^c$ of the switch $S_4$ 1026 is the final detected output of the cascaded equalizer. The final detected symbol 1040 of the cascaded equalizer is equal to the delayed version 1018 of the detected symbol $a_{k+M_1-N'_1}^d$ from the BMAEHS 60 for $k+M_1 < N_d+N'_1+N'_d$ and is equal to the second detected data symbol 1012 $^2 a_{k+M_1-N'_1}^d$ for $k+M_1 \geq N_d+N'_1+N'_d$ and is based on the combined equalization from both the stage 1 BMAEHS 60 and the stage 2 blind mode adaptive equalizer 2 1060 of the cascaded equalizer. Referring to FIG. 14, the final detected symbol 1040 is inputted to the adaptation block 2 1016 and to the delay 1030. The output 1032 of the delay is inputted to the equalizer filter 2 1009.

Figure 15:
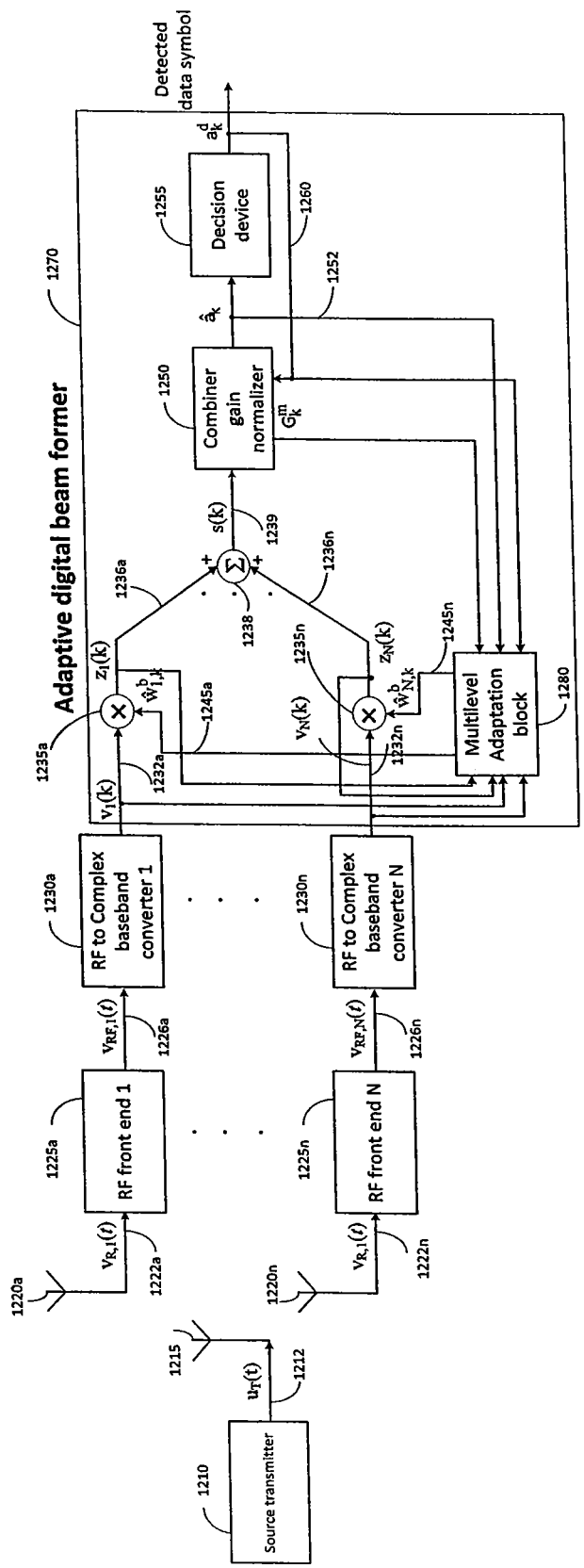
FIG. 15 shows a block diagram of one embodiment of block diagram of the adaptive digital beam former system

One of the various embodiments of the invention relates to the problem of adaptive beam former for recovering data symbol transmitted form a source in a blind mode. FIG. 15 shows the embodiment of the invention for the problem of adaptive digital beam former. As shown in the Figure, a source transmitter 1210 inputs an RF signal obtained by the baseband to RF conversion, not shown, of the source data symbols $a_k$ to the transmit antenna 1215 for transmission. The transmitted RF signal is received by an array of N antennas 1202 a ... n. The outputs 1222 of the antennas 1220 $v_{R,1}(t), \ldots, v_{R,N}(t)$ are input to the N RF front end blocks 1225, a, ..., n. The outputs 1226 of the N front end blocks $V_{RF,1}(t), \ldots, V_{RF,N}(t)$ are inputted to the respective N RF to baseband complex converters 1230 a, ..., n. The complex baseband signals 1232 $v_{1,k}, \ldots, v_{N,k}$ are inputted to the adaptive digital beam former 1270 that provides the detected source data symbols $a_k^d$ at the output. Referring to FIG. 15, the complex baseband signals 1232 $v_{1,k}, \ldots, v_{N,k}$ are inputted to the N multipliers 1235 a ... n. The N multipliers 1235 a ... n multiply the inputs by the respective weights $\hat{w}_{1,k}^m, \ldots, \hat{w}_{N,k}^m$ made available by the multilevel adaptation block 1280. The outputs 1236 of the multipliers $z_{1,k}, \ldots, z_{N,k}$ are summed by the adder 1238 providing the signal 1239 $s_k$ at the output. The adder output 1239 $s_k$ is inputted to the combiner gain normalizer block 1250 providing the linear estimate of the data symbol 1252 $\hat{a}_k$ to the decision device. The block diagram of the combiner gain normalizer block 1250 is similar to that of the channel gain normalizer 7 of FIG. 1, except that the input $z_k$ to the block 7 is replaced by the input 1239 $s_k$. The decision device is similar to that given by the block 11 of FIG. 1.

Referring to FIG. 15, the multilevel adaptation block 1280 generates the first correction signal vector $w_k^{c1}$ to minimize the error between $\hat{a}_k$ and $a_k^d$ by minimizing the function $$I_1 = E[|a_k^d - \hat{a}_k|^2] \tag{92}$$

$$\hat{a}_k = s_k / G_k^m = \frac{1}{G_k^m} \hat{\bar{w}}_k^{bT} \bar{v}_k \tag{93}$$

where $G_k^m$ is the modified gain estimate obtained by the combiner gain normalizer 1250, $\bar{v}_k = [v_{1,k}, v_{2,k}, \ldots, v_{N,k}]^T$ and $\bar{\hat{w}}_k^b = [\hat{w}_{1,k}^b, \ldots, \hat{w}_{N,k}^b]^T$ is the beam former weight vector. Substitution of $\hat{a}_k$ form (93) in (92) results in $$I_1 = E[|a_k^d - \bar{\tilde{w}}_k^T \bar{v}_k|^2] \tag{94}$$

where $\bar{\tilde{w}}_k = \bar{\hat{w}}_k^b / G_k^m$ is the normalized beam former weight vector. The gradient of $I_1$ with respect to $\bar{\tilde{w}}_k$ is given by $$\frac{\partial I_1}{\partial \hat{\tilde{w}}_k} = -E\left[\bar{v}_k \left(a_k^d - \hat{\tilde{w}}_k^T \bar{v}_k\right)^*\right] \tag{95}$$

From (95) the first correction signal vector $w_k^{c1}$ is given by $$w_k^{c1} = \bar{v}_k (a_k^d - \bar{\tilde{w}}_k^T \bar{v}_k)^* \tag{96}$$

The second correction signal vector $w_k^{c2}$ is derived on the basis of the model error. Referring to FIG. 15, the complex baseband signal vector $\bar{v}_k$ is given by $$\bar{v}_k = a_k \bar{g} + \bar{n}_k \tag{97}$$

In (97) $\bar{g}_k = [g_{1,k}, g_{2,k}, \ldots, g_{N,k}]^T$ is a scalar gain times the antenna array direction vector and $\bar{n}_k$ is the noise vector. From (93) and (97) one obtains $$\hat{a}_k = \bar{\tilde{w}}_k^T \bar{g} a_k + \bar{\tilde{w}}_k^T \bar{n}_k \tag{98}$$

Thus ignoring the noise term in (8) the linear estimate of the data symbol $\hat{a}_k$ will be equal to $a_k$ if $\bar{w}_k^T \bar{g} = 1$ and the difference is the model error. Thus the model error is minimized by the minimization of the function $$I_2 = E[|1 - \bar{\tilde{w}}_k^T \bar{g}|^2] \tag{99}$$

The gradient of $I_2$ with respect to $\bar{\tilde{w}}_k$ is given by $$\frac{\partial I_2}{\partial \hat{\tilde{w}}_k} = -E[\bar{g}(1 - \bar{w}_k^T \bar{g})^*] \tag{100}$$

Replacing $a_k$ by $a_k^d$ in (97) results in the following exponentially data weighted Kaman filter algorithm for the estimate of $\bar{g}$, $$\bar{g}_k = \bar{g}_{k-1} + K_k (\bar{v}_k - a_k^d \bar{g}_{k-1})^*; k=1,2,\ldots \tag{101a}$$

$$K_k = P_{k-1} a_k (|a_k|^2 P_{k-1} + \lambda R_k)^{-1} = P_k a_k R_k^{-1} \tag{101b}$$

$$P_k = \lambda^{-1} [P_{k-1} - |a_k|^2 P_{k-1} (|a_k|^2 P_{k-1} + \lambda R_k)^{-1} P_{k-1}] \tag{101c}$$

In (101) $\bar{g}_0$ may be selected to be some a-priori estimate of $\bar{g}$ and $P_0$ set equal to $\epsilon I$ for some scalar $\epsilon > 0$ with I denoting the N×N identity matrix. In (101) $K_k$ is the Kaman gain matrix, $P_k$ is the filter error covariance matrix, $R_k$ denotes the covariance matrix of the noise vector $\bar{n}_k$ appearing in (97), and $\lambda$ is the exponential data weighting coefficient with $0 < \lambda < 1$. In general $R_k$ is an (N×N) matrix with possibly nonzero off diagonal elements when the noise $\bar{n}_k$ is spatially correlated.

For the special case of uncorrelated spatial noise, $R_k$ is a diagonal matrix with $R_k = r_k I$ and with $r_k$ denoting the variance of each component of $\bar{n}_k$. With the matrix $P_0$ selected to be a diagonal matrix, and $R_k$ a diagonal matrix, $P_k$ from (101c) is also diagonal for all k>0. With $P_k$ diagonal with $P_k=p_k I$ for some scalar $p_k>0$, equation (101c) may be simplified to $$p_k = \frac{r_k}{\lambda r_k + |a_k|^2} p_{k-1}; k > 0 \qquad (101d)$$

Replacing $\bar{g}$ by its estimate $\bar{\hat{g}}_k$ in (100) results in the second correction signal vector given by $$\bar{w}_k^{c2} = \bar{\hat{g}}_k (1 - \bar{w}_k^T \bar{\hat{g}}_k)^* \qquad (102)$$

The robustness of the adaptive beam former may be further increased by simultaneously maximizing the signal to noise power ratio at the combiner output by maximizing the signal power at the output of the combiner while keeping the norm of the combiner weight vector $\bar{w}_k$ close to 1. Equivalently the objective function $I_3$ given by (103) is minimized with respect to $\bar{w}_k$.

$$I_3 = \tfrac{1}{2} \kappa (1 - \|\bar{w}_k\|^2)^2 - E[|\bar{w}^T \bar{v}_k|^2] \qquad (103)$$

In (103) $\kappa$ is some positive weighting scalar. The gradient of $I_3$ in (103) with respect to $\bar{w}_k$ is given by $$\partial I_3 / \partial \bar{w}_k = \kappa (1 - \|\bar{w}_k\|^2) \bar{w}_k^* - E[\bar{v}_k \hat{a}^*] \qquad (104)$$

From (104), a third correction signal vector is given by $$\bar{w}_k^{c3} = \bar{v}_k \hat{a}^* - \kappa (1 - \|\bar{w}_k\|^2) \bar{w}_k^* \qquad (105)$$

The update algorithm implemented by the multilevel adaptation block 1280 is given by $$\bar{w}_{k+1} = \bar{w}_k + \mu_1 \bar{v}_k (a_k^d - \bar{w}_k^T \bar{v}_k)^* + \mu_2 \bar{\hat{g}}_k (1 - \bar{w}_k^T \bar{\hat{g}}_k)^* + \mu_3 \bar{v}_k \hat{a}^* - \mu_4 (1 - \|\bar{w}_k\|^2) \bar{w}_k^* \qquad (106a)$$

$$\bar{w}_{k+1}^b = \bar{w}_{k+1} / G_k^m; k=0,1,\ldots \qquad (106b)$$

with the combiner gain $G_k^m$ inputted by block 1250, $\bar{\hat{g}}_k$ updated according to (101) and $\mu_1, \mu_2, \mu_3$ and $\mu_4$ equal to some small positive scalars to achieve convergence of (106). The initial estimate $\bar{w}_0$ in (106a) may be some a priori estimate of $\bar{w}$.

Various modifications and other embodiments of the invention applicable to various problems in Engineering and other fields will be readily apparent to those skilled in the art in the field of invention. For example, the architecture of the beam former can also be applied to the problem of diversity combining. In various other possible modifications, the level 1 adaptive system of FIG. 1 can be modified to include the constant modulus algorithm in those cases where the data symbol have constant modulus to provide additional robustness to the CMA based equalizers. As another example, the adaptive digital beam former architecture can be generalized to the case of broadband source wherein the various antenna gains and combiner weights are replaced by digital filters similar to the equalizer filter 9 of FIG. 1. The equalizer architectures of the invention can be readily modified and applied to various fields where an equalizer or combiner architecture is applicable but without the requirements of any training sequences. Examples of such fields include radio astronomy, seismology, digital audio signal processing and so on.

It is to be understood that the figures and descriptions of the present invention have been simplified to illustrate elements that are relevant for a clear understanding of the present invention, while eliminating other elements, for purposes of clarity. Those of ordinary skill in the art will recognize that these and other elements may be desirable. However, because such elements are well known in the art and because they do not facilitate a better understanding of the present invention, a discussion of such elements is not provided herein.

In general, it will be apparent to one of ordinary skill in the art that at least some of the embodiments described herein, including, for example, all of the modules of FIG. 1, may be implemented in many different embodiments of software, firmware, and/or hardware, for example, based on Field Programmable Gate Array (FPGA) chips or implemented in Application Specific Integrated Circuits (ASICS). The software and firmware code may be executed by a computer or computing device comprising a processor (e.g., a DSP or any other similar processing circuit) including, for example, the computing device 1600 described below. The processor may be in communication with memory or another computer readable medium comprising the software code. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. According to various embodiments, the software may be firmware stored at an EEPROM and/or other non-volatile memory associated a DSP or other similar processing circuit. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Figure 16:
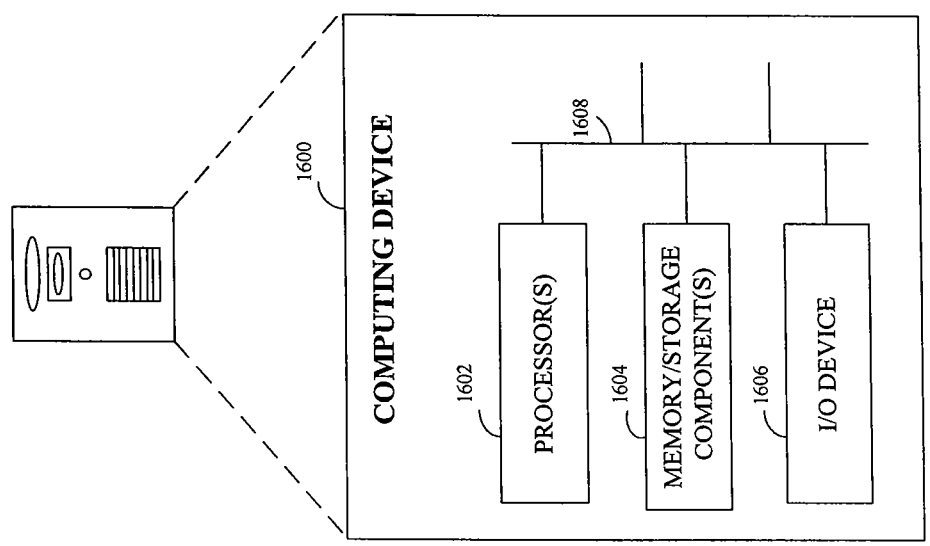
FIG. 16 shows one embodiment of an example computer device.

FIG. 16 shows an example of a computing device 1600 according to one embodiment. For the sake of clarity, the computing device 1600 is illustrated and described here in the context of a single computing device. However, it is to be appreciated and understood that any number of suitably configured computing devices can be used to implement a described embodiment. For example, in at least some implementations, multiple communicatively linked computing devices may be used. One or more of these devices can be communicatively linked in any suitable way such as via one or more networks. One or more networks can include, without limitation: the Internet, one or more local area networks (LANs), one or more wide area networks (WANs) or any combination thereof.

In the example of FIG. 16, the computing device 1600 comprises one or more processor circuits or processing units 1602, one or more memory circuits and/or storage circuit component(s) 1604 and one or more input/output (I/O) circuit devices 1606. Additionally, the computing device 1600 comprises a bus 1608 that allows the various circuit components and devices to communicate with one another. The bus 1608 represents one or more of any of several types of bus structures, including a memory bus or memory controller, a peripheral bus, an accelerated graphics port, and a processor or local bus using any of a variety of bus architectures. The bus 1608 may comprise wired and/or wireless buses. The processing unit 1602 may be responsible for executing various software programs such as system programs, applications programs, and/or program modules/blocks to provide computing and processing operations for the computing device 1600. The processing unit 1602 may be responsible for performing various voice and data communications operations for the computing device 1600 such as transmitting and receiving voice and data information over one or more wired or wireless communications channels. Although the processing unit 1602 of the computing device 1600 is shown in the context of a single processor architecture, it may be appreciated that the computing device 1600 may use any suitable processor architecture and/or any suitable number of processors in accordance with the described embodiments. In one embodiment, the processing unit 1602 may be implemented using a single integrated processor. The processing unit 1602 may be implemented as a host central processing unit (CPU) using any suitable processor circuit or logic device (circuit), such as a as a general purpose processor. The processing unit 1602 also may be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the processing unit 1602 may be coupled to the memory and/or storage component(s) 1604 through the bus 1608. The bus 1608 may comprise any suitable interface and/or bus architecture for allowing the processing unit 1602 to access the memory and/or storage component(s) 1604. Although the memory and/or storage component(s) 1604 may be shown as being separate from the processing unit 1602 for purposes of illustration, it is worthy to note that in various embodiments some portion or the entire memory and/or storage component(s) 1604 may be included on the same integrated circuit as the processing unit 1602. Alternatively, some portion or the entire memory and/or storage component(s) 1604 may be disposed on an integrated circuit or other medium (e.g., hard disk drive) external to the integrated circuit of the processing unit 1602. In various embodiments, the computing device 1600 may comprise an expansion slot to support a multimedia and/or memory card, for example. The memory and/or storage component(s) 1604 represent one or more computer-readable media. The memory and/or storage component(s) 1604 may be implemented using any computer-readable media capable of storing data such as volatile or non-volatile memory, removable or non-removable memory, erasable or non-erasable memory, writeable or re-writeable memory, and so forth. The memory and/or storage component(s) 1604 may comprise volatile media (e.g., random access memory (RAM)) and/or nonvolatile media (e.g., read only memory (ROM), Flash memory, optical disks, magnetic disks and the like). The memory and/ or storage component(s) 1604 may comprise fixed media (e.g., RAM, ROM, a fixed hard drive, etc.) as well as removable media (e.g., a Flash memory drive, a removable hard drive, an optical disk). Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The one or more I/O devices 1606 allow a user to enter commands and information to the computing device 1600, and also allow information to be presented to the user and/or other components or devices. Examples of input devices include data ports, analog to digital converters (ADCs), digital to analog converters (DACs), a keyboard, a cursor control device (e.g., a mouse), a microphone, a scanner and the like. Examples of output devices include data ports, ADC's, DAC's, a display device (e.g., a monitor or projector, speakers, a printer, a network card). The computing device 1600 may comprise an alphanumeric keypad coupled to the processing unit 1602. The keypad may comprise, for example, a QWERTY key layout and an integrated number dial pad. The computing device 1600 may comprise a display coupled to the processing unit 1602. The display may comprise any suitable visual interface for displaying content to a user of the computing device 1600. In one embodiment, for example, the display may be implemented by a liquid crystal display (LCD) such as a touch-sensitive color (e.g., 76-bit color) thin-film transistor (TFT) LCD screen. The touch-sensitive LCD may be used with a stylus and/or a handwriting recognizer program.

The processing unit 1602 may be arranged to provide processing or computing resources to the computing device 1600. For example, the processing unit 1602 may be responsible for executing various software programs including system programs such as operating system (OS) and application programs. System programs generally may assist in the running of the computing device 1600 and may be directly responsible for controlling, integrating, and managing the individual hardware components of the computer system. The OS may be implemented, for example, as a Microsoft® Windows OS, Symbian OS™, Embedix OS, Linux OS, Binary Run-time Environment for Wireless (BREW) OS, JavaOS, or other suitable OS in accordance with the described embodiments. The computing device 1600 may comprise other system programs such as device drivers, programming tools, utility programs, software libraries, application programming interfaces (APIs), and so forth.

In various embodiments disclosed herein, a single component may be replaced by multiple components and multiple components may be replaced by a single component to perform a given function or functions. Except where such substitution would not be operative, such substitution is within the intended scope of the embodiments.

I claim:

1. An adaptive communication receiver for the demodulation and detection of digitally modulated signals received over wireless communication channels exhibiting multipath and fading, the receiver comprised of:
   an RF front end;
   an RF to complex baseband converter;
   a band limiting matched filter;
   a channel gain normalizer comprised of a channel signal power estimator, a channel gain estimator, and a parameter $\alpha$ estimator for providing the normalized channel output;
   a blind mode adaptive equalizer with hierarchical structure (BMAEHS) comprised of a level 1 adaptive system and a level 2 adaptive system for the equalization of the normalized channel output wherein the level 2 adaptive system is further comprised of a channel estimator and a model error correction signal generator;
   an initial data segment recovery circuit comprised of a fixed equalizer for recovery of the data symbols received during the initial convergence period of the BMAEHS;
   a differential decoder;
   a complex baseband to data bit mapper; and
   an error correction code decoder and de-interleaver.

2. An adaptive digital beam former system for the demodulation and detection of digitally modulated signals in blind mode received over an antenna array of N elements, the system comprised of:

an RF front end for each of the N array elements;

an RF to complex baseband converter for each of the N array elements;

a weighted signal combiner with adaptive weights;

a combiner gain normalizer comprised of a channel signal power estimator, a channel gain estimator and a parameter $\alpha$ estimator for providing the normalized output signal;

a decision device; and a multilevel adaptation subsystem for the adaptation of the combiner weights comprised of a first correction signal vector generator for minimizing the error between the input and output of the decision device, a second correction signal vector generator for minimizing the model error, and a third correction signal vector generator for maximizing the signal to noise power ratio at the combiner output.

3. A receiver method comprised of receiving an input signal by an RF front end; and a computer-implemented method for adaptive demodulation and detection of digitally modulated signals received over wireless communication channels exhibiting multipath and fading, the computer-implemented method further comprised of:

conversion to baseband by an RF to complex baseband converter implemented by a computer device, wherein the computer device comprises at least one processor and associated memory;

band limiting matched filtering by the computer device;

implementing by the computer device a channel gain normalizer comprised of a channel signal power estimator, a channel gain estimator, and a parameter cc estimator for providing the normalized channel output;

implementing by the computer device a blind mode adaptive equalizer with hierarchical structure (BMAEHS) comprised of a level 1 adaptive system and a level 2 adaptive system for the equalization of the normalized channel output wherein the level 2 adaptive system is further comprised of a channel estimator and a model error correction signal generator;

initial implementing, by the computer device, an initial data segment recovery circuit comprised of a fixed equalizer for recovery of the data symbols received during the initial convergence period of the BMAEHS;

differential decoding, by the computer device;

complex baseband to data bit mapping, by the computer device; and error correction code decoding and de-interleaving, implemented by the computer device providing the detected information data at the output of the computer device.

4. An adaptive digital beam former method comprised of receiving RF source signal by an antenna array of N elements, N RF front end receiver blocks and a computer-implemented method for the demodulation and detection of digitally modulated signals in blind mode, the method comprised of:

conversion to N baseband signals by N RF to complex baseband converters implemented by a computer device;

combining N complex baseband signals by a combiner with adaptive weights implemented by a computer device;

implementing by a computer device a combiner gain normalizer comprised of a channel signal power estimator, a channel gain estimator and a parameter $\alpha$ estimator for providing normalized signal output;

detection of the data symbols with decision device implemented by a computer device; and implementing by a computer device a multilevel adaptation subsystem for the adaptation of the combiner weights comprised of a first correction signal vector generator for minimizing the error between the input and output of the decision device, a second correction signal vector generator for minimizing the model error, and a third correction signal vector generator for maximizing the signal to noise power ratio at the combiner output.

* * * * *